United States Patent
Morrison

(10) Patent No.: US 11,560,234 B2
(45) Date of Patent: Jan. 24, 2023

(54) LIGHTWEIGHT HIGH POWER DENSITY FAULT-TOLERANT FUEL CELL SYSTEM, METHOD AND APPARATUS FOR CLEAN FUEL ELECTRIC AIRCRAFT

(71) Applicant: Alakai Technologies Corporation, Hopkinton, MA (US)

(72) Inventor: Brian D. Morrison, Hopkinton, MA (US)

(73) Assignee: Alakai Technologies Corporation, Stow, MA (US)

(*) Notice: Subject to any disclaimer, the term of this patent is extended or adjusted under 35 U.S.C. 154(b) by 19 days.

(21) Appl. No.: 16/906,739

(22) Filed: Jun. 19, 2020

(65) Prior Publication Data

US 2020/0398992 A1 Dec. 24, 2020

Related U.S. Application Data

(60) Provisional application No. 62/864,751, filed on Jun. 21, 2019.

(51) Int. Cl.
*H01M 8/00* (2016.01)
*B64D 27/24* (2006.01)
(Continued)

(52) U.S. Cl.
CPC .............. *B64D 27/24* (2013.01); *B60L 58/32* (2019.02); *H01M 8/04029* (2013.01);
(Continued)

(58) Field of Classification Search
CPC ............. B64D 27/24; B64D 2041/005; H01M 8/04029; H01M 8/04074; H01M 8/2457;
(Continued)

(56) References Cited

U.S. PATENT DOCUMENTS

| 5,605,770 A * | 2/1997 | Andreoli | H01M 8/04029 |
| | | | 429/413 |
| 9,764,822 B2 * | 9/2017 | Morrison | B64C 13/18 |
| 10,370,088 B2 * | 8/2019 | Morrison | B64D 27/24 |
| 2004/0038102 A1 * | 2/2004 | Beckmann | H01M 8/0254 |
| | | | 429/465 |

(Continued)

OTHER PUBLICATIONS

International Search Report from PCT/US2020/038730, dated Oct. 23, 2020.

*Primary Examiner* — Nicholas P D'Aniello
(74) *Attorney, Agent, or Firm* — Morse, Barnes-Brown & Pendleton, P.C.; Sean D. Detweiler, Esq.

(57) ABSTRACT

A lightweight, high power density, fault-tolerant fuel cell system, method, and apparatus for full-scale clean fuel electric-powered aircraft having a fuel cell module including a plurality of fuel cells working together to process gaseous oxygen from air compressed by turbochargers, superchargers, blowers or local oxygen supply and gaseous hydrogen from liquid hydrogen transformed by heat exchangers, with an electrical circuit configured to collect electrons from the plurality of hydrogen fuel cells to supply voltage and current to motor controllers commanded by autopilot control units configured to select and control an amount and distribution of electrical voltage and torque or current for each of the plurality of motor and propeller assemblies, wherein electrons returning from the electrical circuit combine with oxygen in the compressed air to form oxygen ions, then the protons combine with oxygen ions to form $H_2O$ molecules and heat.

5 Claims, 28 Drawing Sheets

(51) Int. Cl.
*H01M 8/04029* (2016.01)
*H01M 8/04007* (2016.01)
*H01M 8/2457* (2016.01)
*B60L 58/32* (2019.01)
*H01M 8/04858* (2016.01)

(52) U.S. Cl.
CPC ..... *H01M 8/04074* (2013.01); *H01M 8/0488* (2013.01); *H01M 8/2457* (2016.02); *B60L 2200/10* (2013.01); *H01M 2250/20* (2013.01)

(58) Field of Classification Search
CPC . H01M 8/0488; H01M 2250/20; B60L 58/32; B60L 2200/10; B60L 50/72; B60L 50/70; Y02E 60/50; Y02T 90/40
See application file for complete search history.

(56) References Cited

U.S. PATENT DOCUMENTS

| | | | |
|---|---|---|---|
| 2004/0069897 A1* | 4/2004 | Corcoran | B64C 39/12 244/10 |
| 2008/0171255 A1* | 7/2008 | Brantley | H01M 8/241 429/480 |
| 2009/0021106 A1 | 1/2009 | Baughman et al. | |
| 2013/0084474 A1 | 4/2013 | Mills | |
| 2015/0171455 A1 | 6/2015 | Mills | |
| 2015/0318562 A1* | 11/2015 | Hausmann | H01M 8/1004 429/415 |
| 2016/0006049 A1* | 1/2016 | Kwon | H01M 8/04992 429/446 |
| 2016/0087300 A1 | 3/2016 | Gould et al. | |
| 2016/0200421 A1* | 7/2016 | Morrison | B64C 13/18 244/17.23 |
| 2018/0001994 A1 | 1/2018 | Morrison | |

* cited by examiner

LIGHTWEIGHT HIGH POWER DENSITY FAULT-TOLERANT FUEL CELL SYSTEM, METHOD AND APPARATUS FOR CLEAN FUEL ELECTRIC AIRCRAFT

CROSS-REFERENCE TO RELATED APPLICATION(S)

This application claims priority to, and the benefit of, U.S. Provisional Application 62/864,751, filed Jun. 21, 2019, for all subject matter common to both applications. The disclosure of said provisional application is hereby incorporated by reference in its entirety.

FIELD OF THE INVENTION

The present invention is directed to lightweight, high power density, fault-tolerant fuel cell system, method and apparatus for a full-scale, clean fuel, electric-powered vertical takeoff and landing (eVTOL) or multirotor aircraft. It finds particular, although not exclusive, application to on-board fuel cell powered electric (low or no emission) multirotor aircraft, including Advanced Air Mobility (AAM) aircraft, where the fuel cell module or other on-board source of power transforms fuel into electricity that is then used to operate multiple electric motors. By using the results of the measurements to inform computer monitoring, the methods and systems can use data related to both fuel supply systems and power generating systems to improve aircraft function and efficiency. The multirotor aircraft may be operated in unmanned aerial vehicle (UAV) or drone mode following either remote commands or a pre-programmed route to its destination, or it may be operated by a pilot in operator mode.

BACKGROUND

Although reduced scale multirotor aircraft (sometimes called multi-copters) are not new, they have been reduced scale models not intended for the rigors or requirements of carrying human passengers, and are mostly used either as toys, or for limited-duration surveillance or aerial photography missions with motion being controlled by radio-control remotes, or for flying pre-planned routes. Most if not all are battery powered. For example, US Patent Application 20120083945 relates specifically to a reduced scale multi-copter, but does not address the safety, structural, or redundancy features necessary for an FAA-certified passenger-carrying implementation, nor any of the systems required to implement a practical, passenger-carrying vehicle with fault-tolerance and state-variable analysis, nor any way of generating its own power from fuel carried on-board. The dynamics and integrity requirements of providing a full-scale aircraft capable of safely and reliably carrying human passengers and operating within US and foreign airspace are significantly different that those of previous reduced scale models.

A large volume of personal travel today occurs by air. For destinations of more than 500 miles, it has historically been the fastest travel mode and, in terms of injuries per passenger mile, the safest. However, only about 200 hub and spoke airports exist within the US, placing much of the population more than 30 minutes away from an airport. Yet there are over 5,300 small control-towered regional airports, and over 19,000 small airfields with limited or no control towers throughout the US, placing more than 97% of the population within 15 to 30 minutes of an airfield. As many have noted before, this is a vastly under-utilized capability.

In the 21st Century, the opportunity is available to apply advanced technologies of the evolving National Airspace System (NAS) to enable more-distributed, decentralized travel in the three-dimensional airspace, leaving behind many of the constraints of the existing hub-and-spoke airport system, and the congestion of the 2-dimensional interstate and commuter highway systems.

Many large cities and metropolitan areas are virtually gridlocked by commuter traffic, with major arteries already at or above capacity, and with housing and existing businesses posing serious obstacles to widening or further construction. NASA, in its 'Life After Airliners' series of presentations (see Life After Airliners VI, EAA AirVenture 2003, Oshkosh, Wis. Aug. 3, 2003, and Life After Airliners VII, EAA AirVenture 2004, Oshkosh, Wis. Jul. 30 2004) and NASA's Dr. Bruce Holmes (see Small Aircraft Transportation System—A Vision for 21st Century Transportation Alternatives, Dr. Bruce J. Holmes, NASA Langley Research Center. 2002) make the case for a future of aviation that is based on the hierarchical integration of Personal Air Vehicles (PAV), operating in an on-demand, disaggregated, distributed, point-to-point and scalable manner, to provide short haul air mobility. Such a system would rely heavily on the $21^{st}$ century integrated airspace, automation and technology rather than today's centralized, aggregated, hub-and-spoke system. The first, or lowest tier in this hierarchical vision are small, personal Air Mobility Vehicles or aircraft, allowing people to move efficiently and simply from point-to-any-point, without being restricted by ground transportation congestion or the availability of high-capability airports. Key requirements include vehicle automation, operations in non-radar-equipped airspace and at non-towered facilities, green technologies for propulsion, increased safety and reliability, and en-route procedures and systems for integrated operation within the National Airspace System (NAS) or foreign equivalents. Ultimate goals cited by NASA include an automated self-operated aircraft, and a non-hydrocarbon-powered aircraft for intra-urban transportation. NASA predicts that, in time, up to 45% of all future miles traveled will be in Personal Air Vehicles.

Therefore, a full scale multi-copter implementation that finds applications for commuting, for recreation, for inter-city transportation, for industrial, for delivery, or for security and surveillance applications among others with or without human passengers on board, based on state-of-the-art electric motor and electronics and computer technology with high reliability, safety, simplicity, and redundant control features, with on-board capability to generate its own electrical power (as opposed to simply consuming energy previously stored in electro-chemical batteries), coupled with advanced avionics and flight control techniques is described.

Generally, although reduced scale multirotor aircraft (sometimes called multi-copters) are not new, they have been reduced scale models not intended for the rigors or requirements of carrying human passengers. As a result, these devices generally rely upon simplistic power production systems that include basic batteries, heat sinks, and electric motors but lack the radiators, fluids (often referred to as coolant), cooling fans, or monitoring devices for cooling systems that passenger carrying powered vehicles commonly provide.

The dynamics and integrity requirements of providing a full-scale aircraft capable of safely and reliably carrying human passengers are significantly different that those of reduced scale models. Such a vehicle requires state-of-theart electric motors, electronics and computer technology with high reliability, safety, simplicity, and redundant control features, with on-board capability to generate electrical power, coupled with advanced avionics and flight control techniques. Generating and distributing electrical power aboard the aircraft presents several challenges including inefficient performance and consumption of resources, pollution, greater cost, greater weight or space consumption, restrictions on vehicle configuration, and unwanted vehicle component complexity and redundancy.

Generating electrical power using a fuel cell is an attractive alternative, but the demands of aircraft make current fuel cell technology difficult to implement in a practical manner. Generally, a fuel cell is an electrochemical cell of a variety of types that converts the chemical energy of a fuel and an oxidizing agent into electricity directly through chemical reactions, most often, a pair of redox reactions. Two chemical reactions in a fuel cell occur at the interfaces of three different segments or components: the electrolyte and two electrodes, the negative anode and the positive cathode respectively. A fuel cell consumes the fuel with the net result of the two redox reactions producing electric current which can be used to power electrical devices, normally referred to as the load, as well as creating water or carbon dioxide and heat as the only other products. A fuel, for example hydrogen, is supplied to the anode, and air is supplied to the cathode. A catalyst at the anode causes the fuel to undergo oxidation reactions that generate ions (often positively charged hydrogen ions or protons) and negatively charged electrons, which take different paths to the cathode. The anode catalyst, usually fine platinum powder, breaks down the fuel into electrons and ions, where the electrons travel from the anode to the cathode through an external circuit, creating a flow of electricity across a voltage drop, producing direct current electricity. The ions move from the anode to the cathode through the electrolyte. An electrolyte that allows ions, often positively charged hydrogen ions (protons), to move between the two sides of the fuel cell. The electrolyte substance, which usually defines the type of fuel cell, and can be made from a number of substances like potassium hydroxide, salt carbonates, and phosphoric acid. The ions or protons migrate through the electrolyte to the cathode. At the cathode, another catalyst causes ions, electrons, and oxygen to react. The cathode catalyst, often nickel, converts ions into waste, forming water as the principal by-product. Thus, for hydrogen fuel, electrons combine with oxygen and the protons to produce only generated electricity, water and heat.

Fuel cells are versatile and scalable and can provide power for systems as large as power stations or locomotives, and as small as personal electronic devices or hobby drones. The fuel and the electrolyte substance define the type of fuel cell. A fuel cell uses the chemical energy of hydrogen or another fuel to cleanly and efficiently produce electricity. Fuel cells create electricity chemically, rather than by combustion, so they are not subject to certain thermodynamic laws that limit a conventional power plant (e.g. Carnot Limit). Therefore, fuel cells are most often more efficient in extracting energy from a fuel than conventional fuel combustion. Waste heat from some cells can also be harnessed, boosting system efficiency still further.

Some fuel cells need pure hydrogen, and other fuel cells can tolerate some impurities, but might need higher temperatures to run efficiently. Liquid electrolytes circulate in some cells, which require pumps and other additional equipment that decreases the viability of using such cells in dynamic, space restricted environments. Ion-exchange membrane electrolytes possess enhanced efficiency and durability at reduced cost. The solid, flexible electrolyte of Proton Exchange Membrane (PEM) fuel cells will not leak or crack, and these cells operate at a low enough temperature to make them suitable for vehicles. But these fuels must be purified, therefore demanding pre-processing equipment such as a "reformer" or electrolyzer to purify the fuel, increasing complexity while decreasing available space in a system. A platinum catalyst is often used on both sides of the membrane, raising costs. Individual fuel cells produce only modest amounts of direct current (DC) electricity, and in practice, require many fuel cells assembled into a stack. This poses difficulties in aircraft implementations where significant power generation is required but space and particularly weight must be minimized, requiring a more efficient method to implement the relevant chemical reaction, electromagnetic, and thermodynamic principles in a variety of settings and conditions to achieve viable flight performance.

SUMMARY

There is a need for an improved lightweight, high power density, fault-tolerant fuel cell system, method and apparatus for a full-scale, clean fuel, electric-powered VTOL aircraft that leverages advantageous characteristics of turbochargers or superchargers and heat exchangers in its design to improve efficiency and effectiveness in generating and distributing electrical power (voltage and current) to dynamically meet needs of an aircraft (including Advanced Air Mobility aircraft) while using available resources instead of consuming or requiring additional resources to function at preferred operating conditions (e.g. temperatures) for efficient vehicle performance. Further there is a need to simultaneously dissipate waste heat from power generating systems and prevent power and electrical systems from overheating, efficiently convert stored liquid hydrogen fuel to gaseous hydrogen fuel for supplying to fuel cells and other power generation components, while limiting the number, mass, and size of systems used within an aircraft due to restrictions on the volume and mass of the vehicle required by flight parameters that must be adhered to in order to successfully maintain aircraft flight. The present invention is directed toward further solutions to address this need, in addition to having other desirable characteristics. Specifically, the present invention relates to a system, method and apparatus for managing generation and distribution of electrical power using fuel cell modules in a full-scale vertical takeoff and landing manned or unmanned aircraft, including Advanced Air Mobility (AAM) aircraft, having a lightweight airframe fuselage or multirotor airframe fuselage containing a system to generate electricity from fuels such as gaseous hydrogen, liquid hydrogen, or other common fuels (including compressed, liquid or gaseous fuels); an electric lift and propulsion system mounted to a lightweight multirotor airframe fuselage or other frame structure; counter-rotating pairs of AC or DC brushless electric motors each driving a propeller or rotor; an integrated avionics system for navigation; a redundant autopilot system to manage motors, maintain vehicle stability, maintain flight vectors and parameters, control power and fuel supply and distribution, operate mechanisms and control thermodynamic operating conditions or other vehicle performance as understood by one of ordinary skill in the art; a tablet-computer-based mission planning and vehicle control system to provide the operator with the ability to pre-plan a route and have the system fly to the destination via autopilot or to directly control thrust, pitch, roll and yaw through movement of the tablet computer or a set of operator joysticks; and ADSB or ADSB-like capability (including Remote ID) to provide traffic and situational awareness, weather display and warnings. Remote ID, as utilized herein, refers to the ability of an unmanned aircraft system (UAS) in flight to provide identification information that can be received by other parties consistent with rules and protocols promulgated by the Federal Aviation Administration (FAA). The vehicle has no tail rotor, and lift is provided by sets of electric motors, that in example embodiments comprise one or more pairs of small electric motors driving directly-connected pairs of counter-rotating propellers, or planetary or other gearbox-reduced pairs of counter-rotating propellers, also referred to as rotors. The use of counter-rotating propellers on each pair of motors cancels out the torque that would otherwise be generated by the rotational inertia. Control system and computer monitoring, including automatic computer monitoring by programmed single or redundant digital autopilot control units (autopilot computers), or motor management computers, controls each motor-controller and motor to produce pitch, bank, yaw and elevation, while simultaneously using on-board inertial sensors to maintain vehicle stability and restrict the flight regime that the pilot or route planning software can command, to protect the vehicle from inadvertent steep bank or pitch, or other potentially harmful acts that might lead to loss of control, while also simultaneously controlling cooling system and heating system parameters, valves and pumps while measuring, calculating, and adjusting temperature and heat transfer of aircraft components and zones, to protect motors, fuel cells, and other critical components from exceeding operating parameters and to provide a safe, comfortable environment for occupants during flight. Sensed parameter values about vehicle state are used to detect when recommended vehicle operating parameters are about to be exceeded. By using the feedback from vehicle state measurements to inform motor control commands, and by voting among redundant autopilot computers, the methods and systems contribute to the operational simplicity, stability, reliability, safety and low cost of the vehicle. In the event operating parameters are exceeded or are exceeded past set acceptable limits or safety factors, the emergency systems may be engaged. Power is provided by one or more on-board fuel cell modules for generating electrical voltage and current, electronics to monitor and control electrical generation and excess heat or thermal energy production, and motor controllers to control the commanded voltage and current to each motor and to measure its performance (which may include such metrics as resulting RPM, current, torque and temperature among others). Fuel cell modules, motors, motor controllers, batteries, circuit boards, and other electronics must have excess or waste heat removed or dissipated. The liquid hydrogen is warmed through a heat exchanger in order to convert it to gaseous state (or in the alternative the pressure of the fluid is altered to cause a phase transition to gaseous hydrogen from liquid $H_2$ and the heat exchanger can be employed to warm gaseous hydrogen), which is then supplied to the fuel cells. That heat exchanger, in turn, can help to cool the waste heat from the fuel cells or be employed to contribute to cooling the aircraft cabin for occupant comfort. Thermal energy that is a by-product of generating power, or storing liquid fuel and converting it into gaseous state, is used to provide heating and cooling in the passenger area of the vehicle.

This invention addresses part of the core design of a full-scale, clean-fueled, electric multirotor vehicle, particularly a full-scale multirotor aircraft, also referred to herein as a multirotor aircraft, a Personal Air Vehicle (PAV), an Air Mobility Vehicle (AMV), or Advanced Air Mobility (AAM) aircraft, as one part of the On-Demand, Widely Distributed Point-to-Any Point $21^{st}$ Century Air Mobility system. For clarity, any reference to a multirotor aircraft herein, includes any or all of the above noted vehicles, including but not limited to AAM aircraft. Operation of the vehicle is simple and attractive to many operators when operating under visual flight rules (VFR) in Class E or Class G airspace as identified by the Federal Aviation Administration, thus in most commuter situations not requiring any radio interactions with air traffic control towers. In other cases, the vehicle may be operated in other airspace classes, in VFR and IFR (Instrument Flight Rules) and Part 135 (aircraft for hire) operations, in the US or the equivalent regulations of other countries including, but not limited to, those with whom the US maintains a bilateral agreement governing aircraft certifications and operations.

Among the many uses for this class of vehicle are the next generation of personal transportation including commuting, local travel, air taxi services, emergency medical services, disaster-relief operations, and recreation (as well as other uses) where operators need not have the level of piloting skills necessary for more complex, traditional aircraft or helicopters. This evolution is referred to as Personal Air Vehicles (PAV) or Air Mobility Vehicles (AMV). The vehicle also has autonomous or unmanned application to aerial surveillance, security and reconnaissance, policing, and package or supplies delivery that will be of utility to law enforcement, border patrol, military surveillance, emergency relief aid, and commercial users.

The vehicle is equipped with redundant Autopilot Computers to accept control inputs by the operator (using controls commonly referred to as "joysticks" or sidearm controllers, or using the tablet computer's motion to mimic throttle and joystick commands) and manage commands to the electric motor controllers, advanced avionics and GPS equipment to provide location, terrain and highway in the sky displays, and a simplified, game-like control system that allows even casual users to master the system after a brief demonstration flight. A tablet-computer provides mission planning and vehicle control system capabilities to give the operator the ability to pre-plan a route and have the system fly to the destination via autopilot, or manually control thrust, pitch, roll and yaw through movement of the tablet computer itself. Control inputs can alternatively be made using a throttle for vertical lift (propeller RPM or torque) control, and a joystick for pitch (nose up/down angle) and bank (angle to left or right) control, or a multi-axis joystick to combine elements of pitch, bank and thrust in one or more control elements, depending on user preferences. The autopilot control unit or motor management computer measures control inputs by the operator or autopilot directions, translates this into commands to the controllers for the individual electric motors according to a known performance table or relevant calculation, then supervises motor reaction to said commands, and monitors vehicle state data (pitch, bank, yaw, pitch rate, bank rate, yaw rate, vertical acceleration, lateral acceleration, longitudinal acceleration, GPS speed, vertical speed, air speed and other factors) to ensure operation of the vehicle remains within the desired envelope.

In accordance with example embodiments of the present invention, a lightweight, high power density, fault-tolerant fuel cell module for a clean fuel aircraft, the fuel cell module comprises a plurality of hydrogen fuel cells in fluid communication with one or more heat exchangers and one or more one or more oxygen delivery mechanisms comprising turbochargers or superchargers, blowers, compressors, local air or oxygen supply or combinations thereof, each hydrogen fuel cell each hydrogen fuel cell of the plurality of hydrogen fuel cells comprising a hydrogen flowfield plate, disposed in each hydrogen fuel cell, and comprising a first channel array configured to divert gaseous hydrogen ($GH_2$) inside each hydrogen fuel cell through an anode backing layer connected thereto and comprising an anode gas diffusion layer (AGDL) connected to an anode side catalyst layer that is further connected to an anode side of a proton exchange membrane (PEM), the anode side catalyst layer configured to contact the $GH_2$ and divide the $GH_2$ into protons and electrons. The fuel cell module comprises an oxygen flowfield plate, disposed in each hydrogen fuel cell, and comprising a second channel array configured to divert compressed air inside each hydrogen fuel cell through a cathode backing layer connected thereto and comprising a cathode gas diffusion layer (CGDL) connected to a cathode side catalyst layer that is further connected to a cathode side of the PEM, wherein the PEM comprises a polymer and is configured to allow protons to permeate from the anode side to the cathode side but restricts the electrons. The fuel cell module comprises an electrical circuit configured to collect electrons from the anode side catalyst layer and supply voltage and current to aircraft components, wherein electrons returning from the electrical circuit combine with oxygen in the compressed air to form oxygen ions, then the protons combine with oxygen ions to form $H_2O$ molecules. The fuel cell module includes an outflow end of the oxygen flowfield plate configured to use the second channel array to remove the $H_2O$ and the compressed air from each hydrogen fuel cell and an outflow end of the hydrogen flowfield plate configured to use the first channel array to remove exhaust gas from each hydrogen fuel cell, thereby disposing subcomponents inside each of the plurality of hydrogen fuel cells with flow vectors enabling the plurality of hydrogen fuel cells to be assembled into one or more fuel cell stacks aligned within the fuel cell module forming a modularly combinable fault-tolerant unit of reduced part count and producing a ratio of electric power produced by the fuel cell module to fuel cell module weight of at least one kilowatt per kilogram adapted for an aviation powertrain. In application, an embodiment of a power generation subsystem can comprise one or more fuel cell modules supplying voltage and current to a plurality of motor controllers configured to control a plurality of motor and propeller assemblies; zero, one or more battery arrays; one or more circuit boards; one or more processors; one or more memory; one or more electronic components, electrical connections, electrical wires; and one or more diode or field-effect transistors (FET or IGBT or SiC) providing isolation between each electrical source and an electrical main bus. The one or more fuel cell modules can further comprise one or more hydrogen-powered fuel-cells, where each hydrogen-powered fuel-cell is fueled by gaseous hydrogen (GH2) extracted from liquid hydrogen (LH2) that has been warmed up to the gaseous state using a heat exchanger and wherein the one or more fuel cell modules combines hydrogen from the fuel tank with air to supply electrical voltage and current according to electrochemical processes known to one skilled in the art. A fuel tank can further comprise an inner tank and an outer tank, an insulating wrap, a vacuum between the inner tank and the outer tank, thereby creating an operating pressure of approximately 10 bars, or 140 psi. A battery subsystem can comprise a high-voltage battery array, battery monitoring and charging subsystem that are in fluid communication with coolant conduits transporting coolant.

In accordance with aspects of the present invention, the fuel cell module can further comprise a module housing, a fuel delivery assembly, a recirculation pump, a coolant pump, fuel cell controls, sensors, an end plate, coolant conduits, connections, a hydrogen inlet, a coolant inlet, an air inlet, air filters, blowers, airflow meters, a hydrogen outlet, an air outlet, a coolant outlet, and coolant conduits connected to and in fluid communication with the one or more fuel cell modules and transporting coolant.

In accordance with aspects of the present invention, one or more oxygen delivery mechanisms comprising one or more turbochargers or pumps or superchargers can be air-driven or use a portion of the generated electrical power to drive a small motor which in turn spins a compressing means, in fluid communication with an intake and configured to gather and compress ambient air into compressed air that is supplied to an air inlet and an inflow end of the oxygen flowfield plate of each hydrogen fuel cell of the plurality of hydrogen fuel cells, and wherein the one or more oxygen delivery mechanisms comprising one or more one or more turbochargers or superchargers blowers, compressors, local air or oxygen supply, or combinations thereof, and the fuel cell module are in fluid communication with one or more air filters and airflow meters to meter and control the compressed air at each air inlet to match inlet oxygen requirements of the fuel cell module based on a level of power being generated, atmospheric pressure and temperature.

In accordance with aspects of the present invention, the oxygen flowfield plate can be disposed within each hydrogen fuel cell of the plurality of hydrogen fuel cells opposite the hydrogen flowfield plate with the PEM intervening between the oxygen flowfield plate and the hydrogen flowfield plate.

In accordance with aspects of the present invention, the one or more heat exchangers can be configured to be in fluid communication with a fuel tank configured to store and transport liquid hydrogen ($LH_2$) as a fuel, and the one or more heat exchangers are further configured to extract gaseous hydrogen ($GH_2$) from $LH_2$ using thermal energy transfer or, after the system performs that phase transition, including by other methods such as using a change in pressure to convert $LH_2$ to gaseous hydrogen ($GH_2$), to then warm the hydrogen (e.g. increase a temperature of already extracted gaseous hydrogen ($GH_2$)) to be within the acceptable fuel cell stack input temperature window or parameters (which varies according to specific fuel cell specifications). The fuel tank can further comprise a titanium, polymer, stainless steel or carbon fiber epoxy shell, a plastic, polymer, or stainless steel liner, a titanium, polymer, carbon-fiber or stainless steel inner tank, insulation material between both tanks, an expansion means to expand liquid to gaseous form, (optional) tank mounting provisions, plumbing provisions, drop protection, and provisions for maintaining a reduced pressure (partial or near-total vacuum) between inner and outer tanks, and is configured to use a working fluid of hydrogen as the fuel. Alternatively, the fuel tank can further comprise a boss and outer tank comprising 316L stainless steel or other suitable material, with a liner material comprising high-density polyethylene (HDPE), and the fuel tank is configured to use a working fluid of gaseous hydrogen at an operating pressure that varies by application but in certain embodies operates in the approximate range of 70 MPa, and a proof pressure in an approximate range of 105 Mpa. Considering embodiments with liquid hydrogen as a fuel, the one or more heat exchangers can be configured to transfer heat or thermal energy across heat exchanger walls and heat exchanger surfaces, to the fuel supplied by fuel lines in fluid communication with the one or more heat exchangers and the fuel tank, using thermodynamics including conduction, wherein a working fluid and the fuel remain physically isolated from one another.

In accordance with aspects of the present invention, the integrated system including the electrical circuit can comprise an electrical collector disposed within each hydrogen fuel cell supplying voltage and current to the electrical circuit powering aircraft components comprising a power distribution monitoring and control subsystem comprising a plurality of motor controllers configured to control a plurality of motor and propeller assemblies in the clean fuel aircraft.

In accordance with example embodiments of the present invention, a lightweight, high power density, fault-tolerant fuel cell system for a clean fuel aircraft comprises a power generation subsystem comprising at least one fuel cell module comprising a plurality of hydrogen fuel cells configured to supply electrical voltage and current to a plurality of motor and propeller assemblies controlled by a plurality of motor controllers, a fuel supply subsystem comprising a fuel tank in fluid communication with the at least one fuel cell module and configured to store and transport a fuel, and a thermal energy interface subsystem comprising a heat exchanger in fluid communication with the fuel tank and the at least one fuel cell module including each hydrogen fuel cell of the plurality of hydrogen fuel cells, a plurality of fluid conduits, and at least one radiator in fluid communication with the at least one fuel cell module, configured to store and transport a coolant. The system also comprises an external interface subsystem comprising one or more one or more oxygen delivery mechanisms comprising one or more of turbochargers or superchargers, blowers, compressors, local supply of air or oxygen, or combinations thereof, configured to compress ambient air and in fluid communication with at least one air intake and the at least one fuel cell module. The system also comprises a power distribution monitoring and control subsystem for monitoring and controlling distribution of supplied electrical voltage and current to the plurality of motor controllers and an avionics subsystem, comprising one or more sensing devices configured to measure operating conditions, and an electrical circuit configured to collect electrons from each hydrogen fuel cell of the plurality of hydrogen fuel cells and supply voltage and current to the plurality of motor controllers and aircraft components, wherein electrons returning from the electrical circuit combine with oxygen in the compressed air to form oxygen ions, then the protons combine with oxygen ions to form $H_2O$ molecules, wherein the plurality of motor controllers are commanded by one or more autopilot control units or computer units comprising a computer processor configured to compute algorithms based on measured operating conditions, and configured to select and control an amount and distribution of electrical voltage and torque or current for each of the plurality of motor and propeller assemblies.

In accordance with aspects of the present invention, the heat exchanger of the thermal energy interface subsystem can be in fluid communication with the plurality of fluid conduits and the fuel tank configured to store and transport liquid hydrogen ($LH_2$) as a fuel, and the heat exchanger can be further configured to warm gaseous hydrogen ($GH_2$) to operating temperature (e.g. to increase a temperature of already extracted gaseous hydrogen ($GH_2$)) or to extract gaseous hydrogen ($GH_2$) from $LH_2$ using thermal energy transfer by transferring heat or thermal energy across heat exchanger walls and heat exchanger surfaces, to the fuel supplied by fuel lines in fluid communication with the one or more heat exchangers and the fuel tank, using thermodynamics including conduction, wherein a working fluid and the fuel remain physically isolated from one another.

In accordance with aspects of the present invention, the system can further comprise a hydrogen flowfield plate, disposed in each hydrogen fuel cell of the plurality of hydrogen fuel cells, and comprising a first channel array configured to divert gaseous hydrogen ($GH_2$) inside each hydrogen fuel cell through an anode backing layer connected thereto and comprising an anode gas diffusion layer (AGDL) connected to an anode side catalyst layer that is further connected to an anode side of a proton exchange membrane (PEM), the anode side catalyst layer configured to contact the $GH_2$ and divide the $GH_2$ into protons and electrons. The system can further comprise an oxygen flowfield plate, disposed in each hydrogen fuel cell, and comprising a second channel array configured to divert compressed air inside each hydrogen fuel cell through a cathode backing layer connected thereto and comprising a cathode gas diffusion layer (CGDL) connected to a cathode side catalyst layer that is further connected to a cathode side of the PEM, wherein the PEM comprises a polymer and is configured to allow protons to permeate from the anode side to the cathode side but restricts the electrons. The system can include an electrical circuit configured to collect electrons from the anode side catalyst layer and supply voltage and current to a power generation subsystem a power distribution monitoring and control subsystem, wherein electrons returning from the electrical circuit combine with oxygen in the compressed air to form oxygen ions, then the protons combine with oxygen ions to form $H_2O$ molecules. The system can also include an outflow end of the oxygen flowfield plate configured to use the second channel array to remove the $H_2O$ and the compressed air from each hydrogen fuel cell and an outflow end of the hydrogen flowfield plate configured to use the first channel array to remove exhaust gas from each hydrogen fuel cell.

In accordance with aspects of the present invention, the system can further comprise: one or more battery arrays; one or more circuit boards; one or more processors; one or more memory; one or more electronic components, electrical connections, electrical wires; and one or more diode or field-effect transistors (FET, IGBT or SiC) providing isolation between an electrical main bus and one or more electrical sources comprising the at least one fuel cell module.

In accordance with aspects of the present invention, the fuel supply subsystem can further comprise fuel lines, water or fuel pumps, refueling connections for charging or fuel connectors, one or more vents, one or more valves, one or more pressure regulators, and unions, each in fluid communication with the fuel tank that is configured to store and transport a fuel comprising gaseous hydrogen ($GH_2$), liquid hydrogen ($LH_2$), or Cryo-Compressed Hydrogen (CCH) or other suitable substances compatible with fuel cells.

In accordance with aspects of the present invention, one or more temperature sensing devices or thermal safety sensors can monitor temperatures and concentrations of gases in the fuel supply subsystem, and also comprise one or more pressure gauges, one or more level sensors, one or more vacuum gauges, one or more temperature sensors, and can further comprise the at least one fuel cell module and the plurality of motor controllers, each configured to self-measure and report temperature and other parameters using a Controller Area Network (CAN) bus, or similar network or bus, to inform the one or more autopilot control units or computer units as to a valve, pump or combination thereof to enable to increase or decrease of fuel supply or cooling using fluids wherein thermal energy is transferred from the coolant, wherein the one or more autopilot control units comprise at least two redundant autopilot control units that command the plurality of motor controllers, the fuel supply subsystem, the at least one fuel cell module, and fluid control units with commands operating valves and pumps altering flows of fuel, air and coolant to different locations, and wherein the at least two redundant autopilot control units communicate the voting process over a redundant network. In accordance with aspects of the present invention, the at least one fuel cell module further comprises a fuel delivery assembly, air filters, blowers, airflow meters, a recirculation pump, a coolant pump, fuel cell controls, sensors, an end plate, coolant conduits, connections, a hydrogen inlet, a coolant inlet, an oxygen inlet, a hydrogen outlet, an oxygen outlets, a coolant outlet, and coolant conduits connected to and in fluid communication with the at least one fuel cell module and transporting coolant.

In accordance with aspects of the present invention, the one or more autopilot control units or computer units comprising a computer processor can be further configured to compute, select and control, based on one or more algorithms, using one or more oxygen delivery mechanisms comprising one or more air-driven turbochargers or superchargers, a blower, an air compressor or an on-board supplemental supply of oxygen, each supplying air or oxygen to the at least one fuel cell module, an amount and distribution of voltage and current from the plurality of hydrogen fuel cells of the power generation subsystem to each of the plurality of motor and propeller assemblies being controlled by the plurality of motor controllers, and dissipate waste heat using the thermal energy interface subsystem comprising the heat exchanger or a vaporizer used to warm $LH_2$ or $GH2$, and/or using at least one radiator or one or more exhaust ports to expel waste heat with exhaust gas, wherein the $H_2O$ molecules are removed using the one or more exhaust ports or a vent.

In accordance with aspects of the present invention, the system can be mounted within a full-scale, electric vertical takeoff and landing (eVTOL), electric or traditional fixed wing aircraft system sized, dimensioned, and configured for transporting one or more human occupants and/or a payload, comprising a multirotor airframe fuselage supporting vehicle weight, human occupants and/or payload, attached to and supporting the plurality of motor and propeller assemblies ("rotor" assemblies), each comprising a plurality of pairs of propeller blades or a plurality of rotor blades, and each being electrically connected to and controlled by the plurality of motor controllers and a power distribution monitoring and control subsystem distributing voltage and current from the plurality of hydrogen (or other suitable substance) fuel cells.

In accordance with aspects of the present invention, the plurality of motor controllers can be high-voltage, high-current liquid-cooled or air-cooled controllers. The system can further comprise a mission planning computer comprising software, with wired or wireless (RF) or fiber optic connections to the one or more autopilot control units, and a wirelessly connected or wire-connected or fiber-optic connected Automatic Dependent Surveillance-Broadcast (ADSB) or Remote ID unit providing the software with collision avoidance, traffic, emergency detection and weather information to and from the clean fuel aircraft. The one or more autopilot control units comprising a computer processor and input/output interfaces can comprise at least one of interface selected from serial (RS232, SPI, I2C and others known in the art), Controller Area Network (CAN), Ethernet, USB, ARINC 429, Discrete Digital inputs, Discrete Digital outputs, analog voltage inputs, analog voltage outputs, pulse-width-modulated outputs for motor control, an embedded or stand-alone air data computer, an embedded or stand-alone inertial measurement device, and one or more cross-communication channels or networks, and can include a simplified computer and display with an arrangement of standard avionics used to monitor and display operating conditions, control panels, gauges and sensor output for the clean fuel aircraft; a DC-DC converter or starter/alternator configured to down-shift at least a portion of a primary voltage of a multirotor aircraft system to a standard voltage comprising one or more of the group consisting of 12V, 24V, 28V, or other standard voltage for avionics, radiator fan motors, compressor motors, water pump motors and non-propulsion purposes, with a battery of corresponding voltage to provide local current storage; and a means of combining pitch, roll, yaw, throttle, and other desired information onto a serial communications interface (interconnects including but not limited to CAN, Ethernet, and serial line), in such a way that multiple channels of command data pass to the one or more autopilot control units over the serial line, where control information is packaged in a plurality of frames that repeat at a periodic or aperiodic rate. The one or more autopilot control units can operate control algorithms to generate commands to each of the plurality of motor controllers, managing and maintaining multirotor aircraft stability for the clean fuel aircraft, and monitoring feedback.

In accordance with aspects of the present invention, the fuel tank can further comprise a carbon fiber epoxy shell, a plastic liner, a metal interface, drop protection, and is configured to use a working fluid of hydrogen as the fuel. The fuel tank can further comprise a cryogenic inner tank and an outer tank, an insulating wrap, a vacuum between the inner tank and the outer tank, thereby creating an operating pressure containing liquid hydrogen (LH2) at approximately 10 bar, or 140 psi (or other suitable pressure understood by one of ordinary skill in the art). The fuel tank can also comprise a Cryo-Compressed storage tank, wherein the cryogenic liquid is further compressed to 300 bar to 350 bar (or other suitable pressure understood by one of ordinary skill in the art). Alternatively, or additionally, the fuel tank further comprises a liner material comprising high-density polyethylene (HDPE), and the fuel tank is configured to use a working fluid of gaseous hydrogen at an operating pressure of 70 MPa as an example, and a proof pressure of 105 Mpa or greater (or other suitable pressure understood by one of ordinary skill in the art).

In accordance with example embodiments of the present invention, a method for operating lightweight, high power density, fault-tolerant fuel cell systems in a clean fuel VTOL aircraft comprises transporting liquid hydrogen ($LH_2$) fuel from a fuel tank to one or more heat exchangers in fluid communication with the fuel tank, and transforming a state of the $LH_2$ into gaseous hydrogen ($GH_2$), or warming $GH_2$, using the one or more heat exchangers to perform thermal energy transfer to the $LH_2$, then transporting the $GH_2$ from the one or more heat exchangers into one or more fuel cell modules comprising a plurality of hydrogen fuel cells in fluid communication with the one or more heat exchangers; gathering and compressing ambient air into compressed air using one or more oxygen delivery mechanisms comprising turbochargers or superchargers in fluid communication with an intake; transporting compressed air from the one or more oxygen delivery mechanisms comprising turbochargers or superchargers into the one or more fuel cell modules comprising the plurality of hydrogen fuel cells in fluid communication with the one or more the one or more oxygen delivery mechanisms comprising turbochargers or superchargers; diverting the $GH_2$ inside the plurality of hydrogen fuel cells into a first channel array embedded in an inflow end of a hydrogen flowfield plate in each of the plurality of hydrogen fuel cells, forcing the $GH_2$ through the first channel array, diffusing the $GH_2$ through an anode backing layer comprising an anode Gas diffusion layer (AGDL) in surface area contact with, and connected to, the first channel array of the hydrogen flowfield plate, into an anode side catalyst layer connected to the AGDL and an anode side of a proton exchange membrane (PEM) of a membrane electrolyte assembly; diverting compressed air inside the plurality of hydrogen fuel cells into a second channel array embedded in an inflow end of an oxygen flowfield plate in each of the plurality of hydrogen fuel cells disposed opposite the hydrogen flowfield plate, forcing the $GH_2$ through the second channel array, diffusing the compressed air through a cathode backing layer comprising a cathode gas diffusion layer (CGDL) in surface area contact with, and connected to, the second channel array of the oxygen flowfield plate, into a cathode side catalyst layer connected to the CGDL and a cathode side of the PEM of the membrane electrolyte assembly; dividing the $GH_2$ into protons or hydrogen ions of positive charge and electrons of negative charge through contact with the anode side catalyst layer, wherein the PEM allows protons to permeate from the anode side to the cathode side through charge attraction but restricts other particles comprising the electrons; supplying voltage and current to an electrical circuit powering a power generation subsystem comprising a plurality of motor controllers configured to control a plurality of motor and propeller assemblies in the clean fuel multirotor VTOL aircraft, and combining electrons returning from the electrical circuit with oxygen in the compressed air to form oxygen ions, then combining the protons with oxygen ions to form $H_2O$ molecules; and passing the $H_2O$ molecules through the CGDL into the second channel array to remove the $H_2O$ and the compressed air from the fuel cell using the second channel array and an outflow end of the oxygen flowfield plate, and removing exhaust gas from the fuel cell using the first channel array and an outflow end of the hydrogen flowfield plate.

In accordance with aspects of the present invention, the method can further comprise a fuel supply subsystem that comprises fuel lines, water or fuel pumps, refueling connections for charging or fuel connectors, one or more vents, one or more valves, one or more pressure regulators, and unions, each in fluid communication with the fuel tank that is configured to store and transport a fuel comprising gaseous hydrogen ($GH_2$) or liquid hydrogen ($LH_2$).

In accordance with aspects of the present invention, $H_2O$ molecules can be removed using an exhaust port or a vent and fluid conduits direct $GH_2$ exiting the one or more fuel cell modules back into the fuel supply subsystem and oxygen or air exiting the one or more fuel cell modules back into an external interface subsystem comprising the one or more heat exchangers, to be reused in subsequent reactions performed within the plurality of hydrogen fuel cells and the one or more fuel cell modules as method steps are performed iteratively to produce electricity.

In accordance with aspects of the present invention, one or more heat exchangers of the thermal energy interface subsystem can be in fluid communication with the plurality of fluid conduits and the fuel tank configured to store and transport liquid hydrogen ($LH_2$) as a fuel, and the one or more heat exchangers are further configured to warm gaseous hydrogen ($GH_2$) to operating temperature or to extract gaseous hydrogen ($GH_2$) from $LH_2$ using thermal energy transfer by transferring heat or thermal energy across heat exchanger walls and heat exchanger surfaces, to the fuel supplied by fuel lines in fluid communication with the one or more heat exchangers and the fuel tank, using thermodynamics including conduction, wherein a working fluid and the fuel remain physically isolated from one another.

In accordance with aspects of the present invention, the method further comprises measuring operating conditions in the clean fuel VTOL aircraft, using temperature sensing devices or thermal safety sensors, comprising measuring one or more selected from the group consisting of fuel temperature, fuel tank temperature, fuel cell temperatures, battery temperature, motor controller temperatures, coolant temperature, radiator temperature, and concentrations of gases in the fuel supply subsystem, and the temperature sensing devices or thermal safety sensors comprising one or more pressure gauges, one or more level sensors, one or more vacuum gauges, one or more temperature sensors, and further comprising the at least one fuel cell module and the plurality of motor controllers, each configured to self-measure and report temperature and other parameters using a Controller Area Network (CAN) bus or similar multidevice networks or buses to inform the one or more autopilot control units or computer units as to a valve, pump or combination thereof to enable to increase or decrease of fuel supply or cooling using fluids wherein thermal energy is transferred from the coolant, wherein the one or more autopilot control units comprise at least one autopilot control unit that commands the plurality of motor controllers, the fuel supply subsystem, the at least one fuel cell module, and fluid control units with commands operating valves and pumps altering flows of fuel, air and coolant to different locations, and wherein the at least one autopilot control unit communicates the command and status information over a single or redundant network (where redundant networks employ a voting process).

In accordance with aspects of the present invention, the method can include a simplified computer and display with an arrangement of standard avionics used to monitor and display operating conditions, control panels, gauges and sensor output for the clean fuel VTOL aircraft.

In accordance with aspects of the present invention, the method can repeat measuring, using one or more temperature sensing devices or thermal energy sensing devices, operating conditions in a multirotor aircraft, and then performs comparing, computing, selecting and controlling, and executing steps using data for the one or more fuel cell modules to iteratively manage electric voltage and current or torque production and supply by the one or more fuel cell modules and operating conditions in the multirotor aircraft.

In an example embodiment of the present invention, a lightweight, high power density, fault-tolerant fuel cell module for a clean fuel aircraft includes a plurality of hydrogen fuel cells in fluid communication with one or more heat exchangers and one or more oxygen delivery mechanisms comprising turbochargers or superchargers. Each hydrogen fuel cell of the plurality of hydrogen fuel cells includes a hydrogen flowfield plate, an anode backing layer connected thereto and comprising an anode gas diffusion layer (AGDL) connected to an anode side catalyst layer that is further connected to an anode side of a proton exchange membrane (PEM) configured to contact and divide gaseous hydrogen (GH2) into protons and electrons; an oxygen flowfield plate, a cathode backing layer connected thereto and comprising a cathode gas diffusion layer (CGDL) connected to a cathode side catalyst layer that is further connected to a cathode side of the PEM; and an electrical circuit configured to collect electrons from the anode side catalyst layer and supply voltage and current to aircraft components.

BRIEF DESCRIPTION OF THE DRAWINGS

The invention description below refers to the accompanying drawings, of which.

DETAILED DESCRIPTION

Figure 1A:
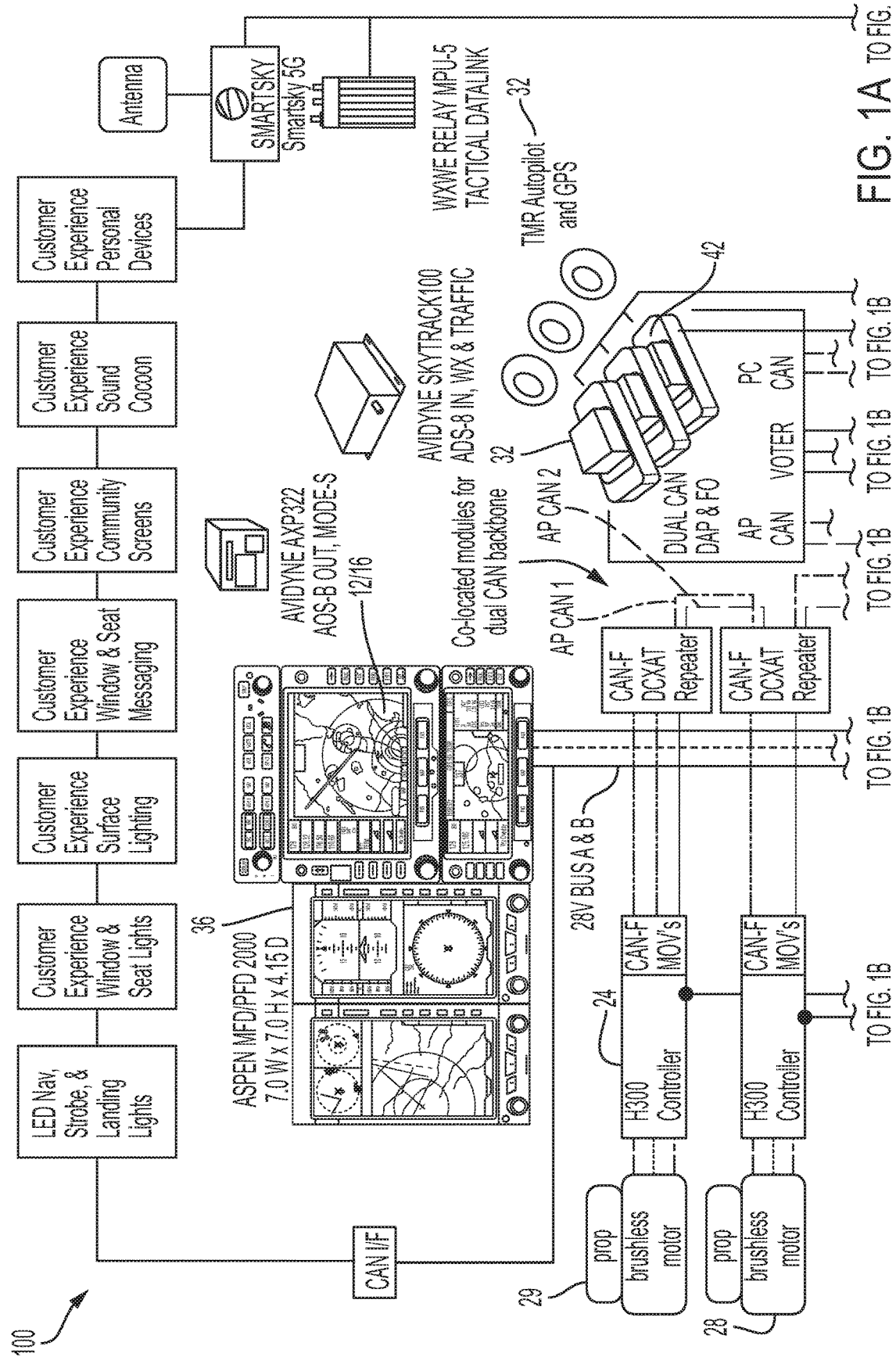
FIGS. 1A, 1B, 1C, and 1D depict an example system block diagram for practicing the present invention, including logic controlling the integrated system for multimode thermal energy transfer and related components.

To provide an overall understanding, certain illustrative embodiments will now be described; however, it will be understood by one of skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods.

An illustrative embodiment of the present invention relates to a lightweight, high power density, fault-tolerant fuel cell integrated system and related method and apparatus for full-scale clean fuel electric-powered multirotor aircraft, including AAM aircraft and all equivalents as discussed previously herein. One or more fuel cell modules comprise a plurality of fuel cells individually functioning in parallel or series but working together to process gaseous oxygen from ambient air compressed by turbochargers or superchargers (or blowers or supplemental stored oxygen supply O2 in place of those components) and process gaseous hydrogen extracted from liquid hydrogen by heat exchangers, or stored in gaseous form. Gaseous hydrogen is passed through fuel cell layers including a catalyst and a proton exchange membrane (PEM) of a membrane electrolyte assembly wherein protons, disassociated from electrons using an oxidation reaction, are passed through the membrane while electrons are prevented from traversing the membrane. The one or more fuel cell modules of the integrated system use an electrical circuit configured to collect electrons from the plurality of hydrogen fuel cells to supply voltage and current to motor controllers commanded by autopilot control units configured to select and control an amount and distribution of electrical voltage and torque or current for each of the plurality of motor and propeller assemblies. Electrons returning from the electrical circuit to a different region within the fuel cells containing a catalyst combine with oxygen within or separated from the compressed air to form oxygen ions. Then, through reactions involving the catalyst, the protons previously separated from electrons combine with oxygen ions to form $H_2O$ molecules and heat. The integrated system comprises at least a power generation subsystem comprising one or more radiators in fluid communication with the one or more fuel cell modules, configured to store and transport a coolant, and a thermal energy interface subsystem comprising a heat exchanger configured with a plurality of fluid conduits. The integrated system also comprises a fuel supply subsystem comprising a fuel tank in fluid communication with one or more fuel cell modules and configured to store and transport a fuel such as liquid hydrogen, gaseous hydrogen, or a similar fluid, one or more vents, one or more outlets, and one or more exhaust ports; one or more temperature sensing devices or thermal energy sensing devices, configured to measure thermodynamic operating conditions; and an autopilot control unit comprising a computer processor configured to compute a temperature adjustment protocol comprising one or more priorities for energy transfer using one or more thermal references and an algorithm based on a comparison result of measured operating conditions including thermodynamic operating conditions, and configured to select and control, based on the temperature adjustment protocol, an amount and distribution of thermal energy transfer from one or more sources to one or more thermal energy destinations.

FIGS. 1-21, wherein like parts are designated by like reference numerals throughout, illustrate an example embodiment or embodiments of a lightweight, high power density, fault-tolerant fuel cell system, method and apparatus for a full-scale, clean fuel, electric-powered multirotor aircraft, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 1B:
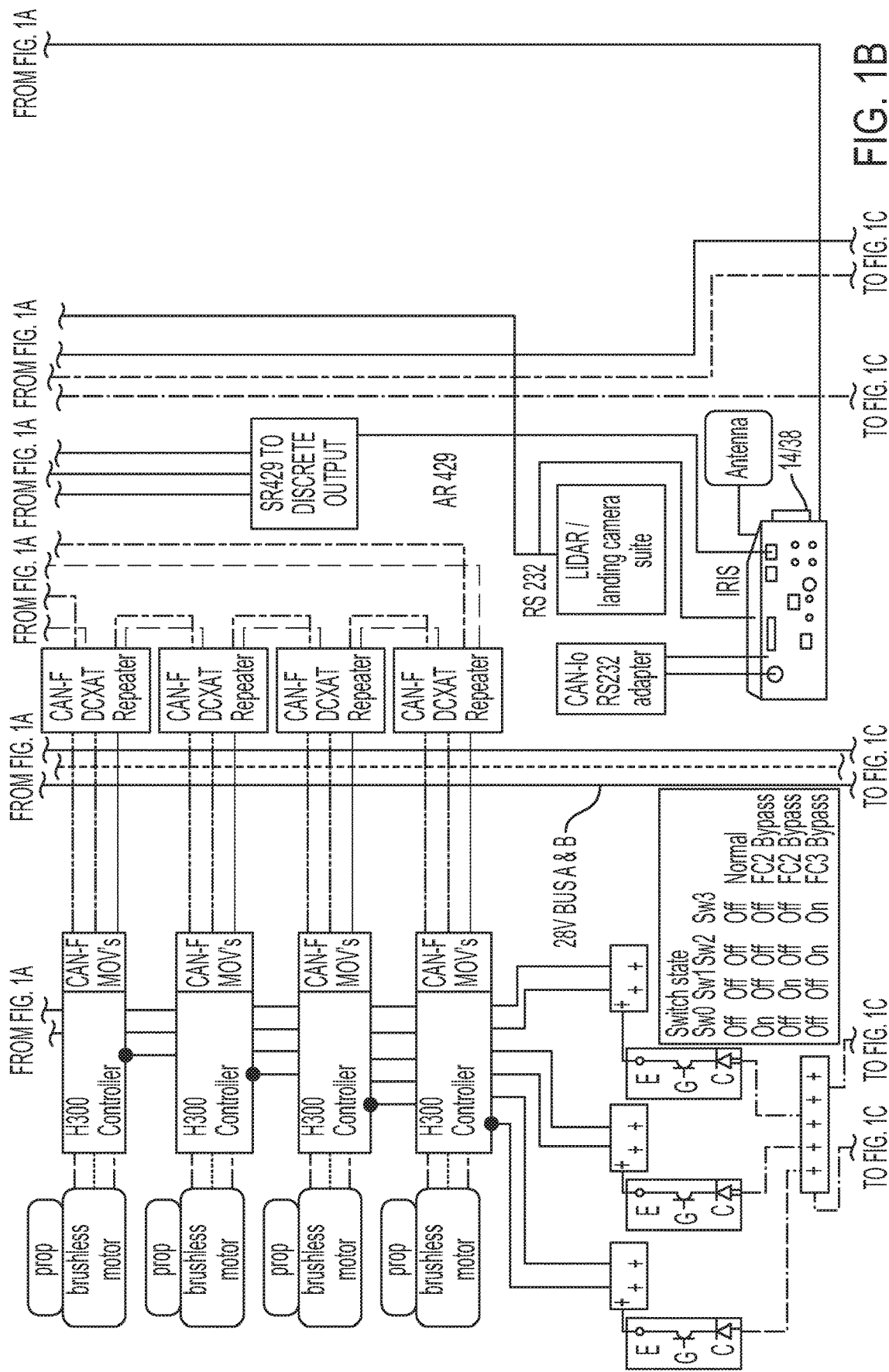
Figure 1C:
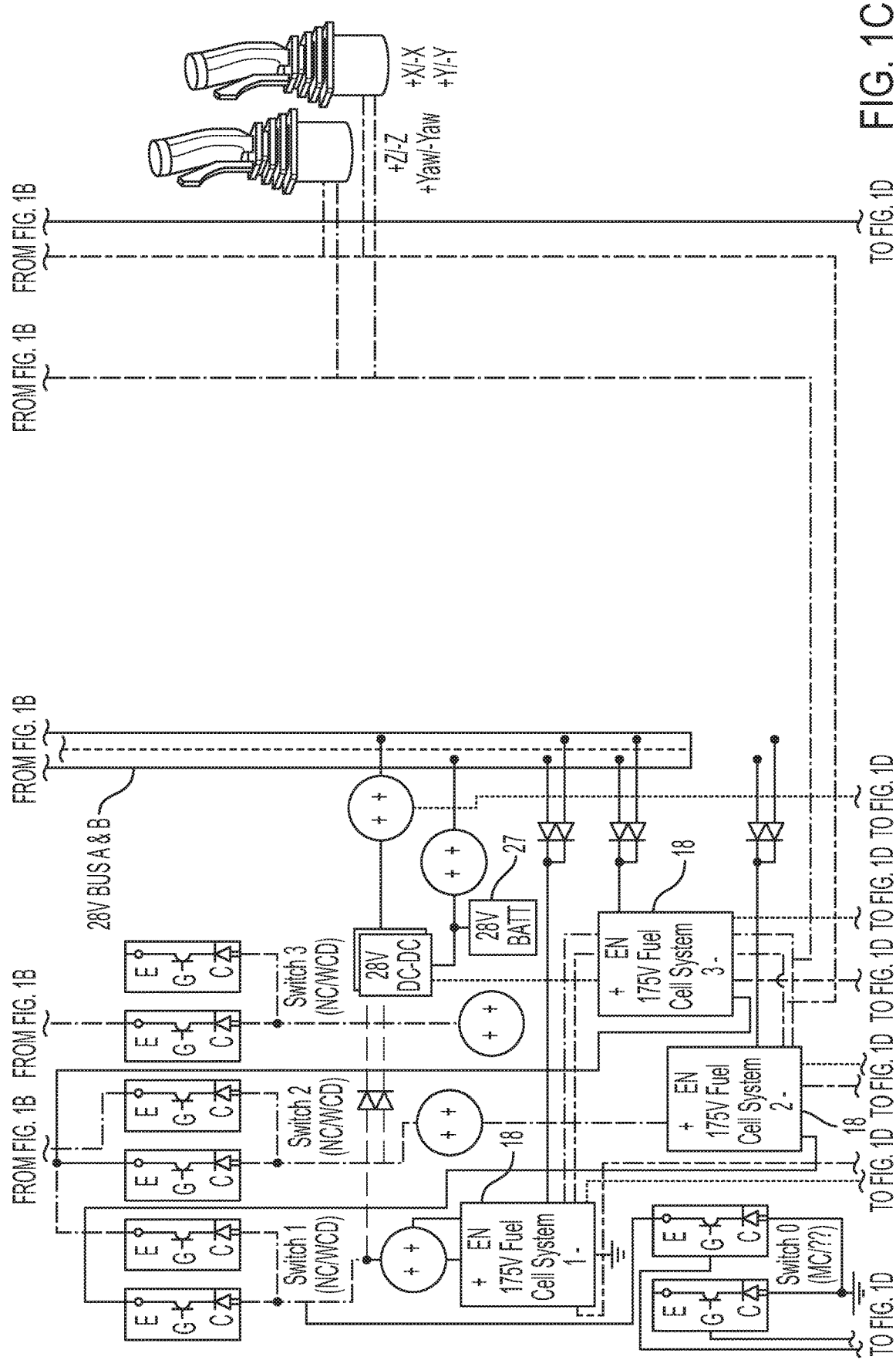
Figure 1D:
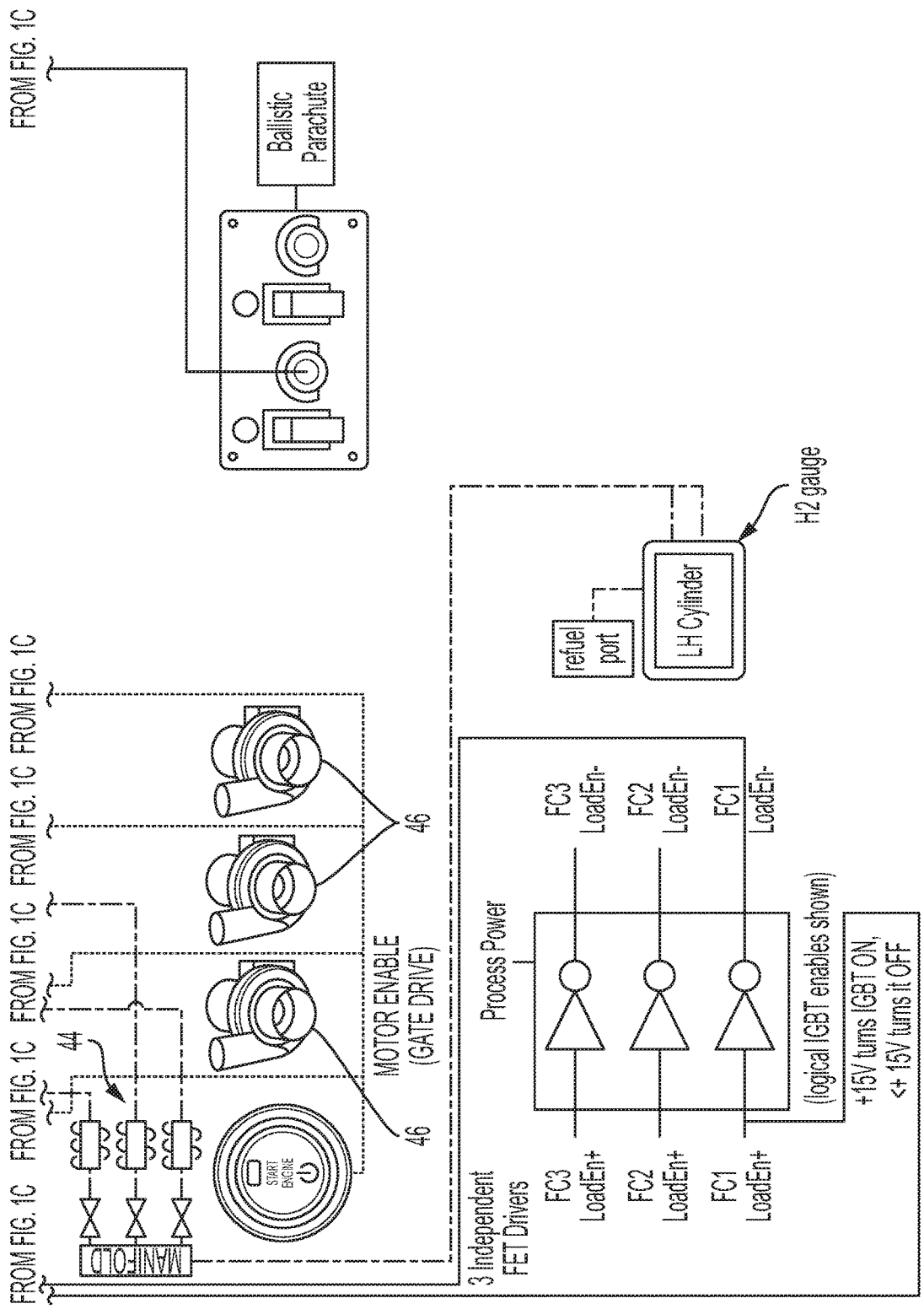

FIGS. 1A, 1B, 1C and 1D depict in block diagram form one type of system 100 that may be employed to carry out the present invention. Here, as depicted in FIG. 1A, managing power generation for a one- to five-person personal aerial vehicle (PAV) or unmanned aerial vehicle (UAV) includes on-board equipment such as a primary flight displays 12, an Automatic Dependent Surveillance-B (ADSB) or Remote ID transmitter/receiver 14, a global-positioning system (GPS) receiver typically embedded within 12, a fuel gauge 16, an air data computer to calculate airspeed and vertical speed 38, mission control tablet computers 36 and mission planning software 34, and redundant flight computers (also referred to as autopilot computers 32), all of which monitor either the operation and position of the aircraft 1000 or monitor and control the hydrogen-powered fuel cell based power generation subsystem 600 generating electricity and fuel supply subsystems 900 and provide display presentations that represent various aspects of those systems' operation and the aircraft's 1000 state data, such as altitude, attitude, ground speed, position, local terrain, recommended flight path, weather data, remaining fuel and flying time, motor voltage and current status, intended destination, and other information depicted in FIG. 1B necessary to a successful and safe flight. The fuel cell-based power generation subsystem 600 combines stored hydrogen with compressed air to generate electricity with a byproduct of only water and heat, thereby forming a fuel cell module 18, as depicted in FIG. 1C, that can also include pumps of various types and cooling system 44 and a turbocharger or supercharger 46 as depicted in FIG. 1D to optimize the efficiency and/or performance of the fuel cell module 18. As would be appreciated by one skilled in the art, the fuel cells may also be augmented by a battery (or supercapacitor, combination thereof or other energy storage system as understood by one of ordinary skill in the art) subsystem, consisting of high-voltage battery array, battery monitoring and charger subsystem or similar arrangements. This disclosure is meant to address both power generation systems and stored-energy battery systems, as well as hybrid systems incorporating both means of energy storage. For purposes of illustration, the present description focuses on a fuel cell form of electricity generation.

Figure 2A:
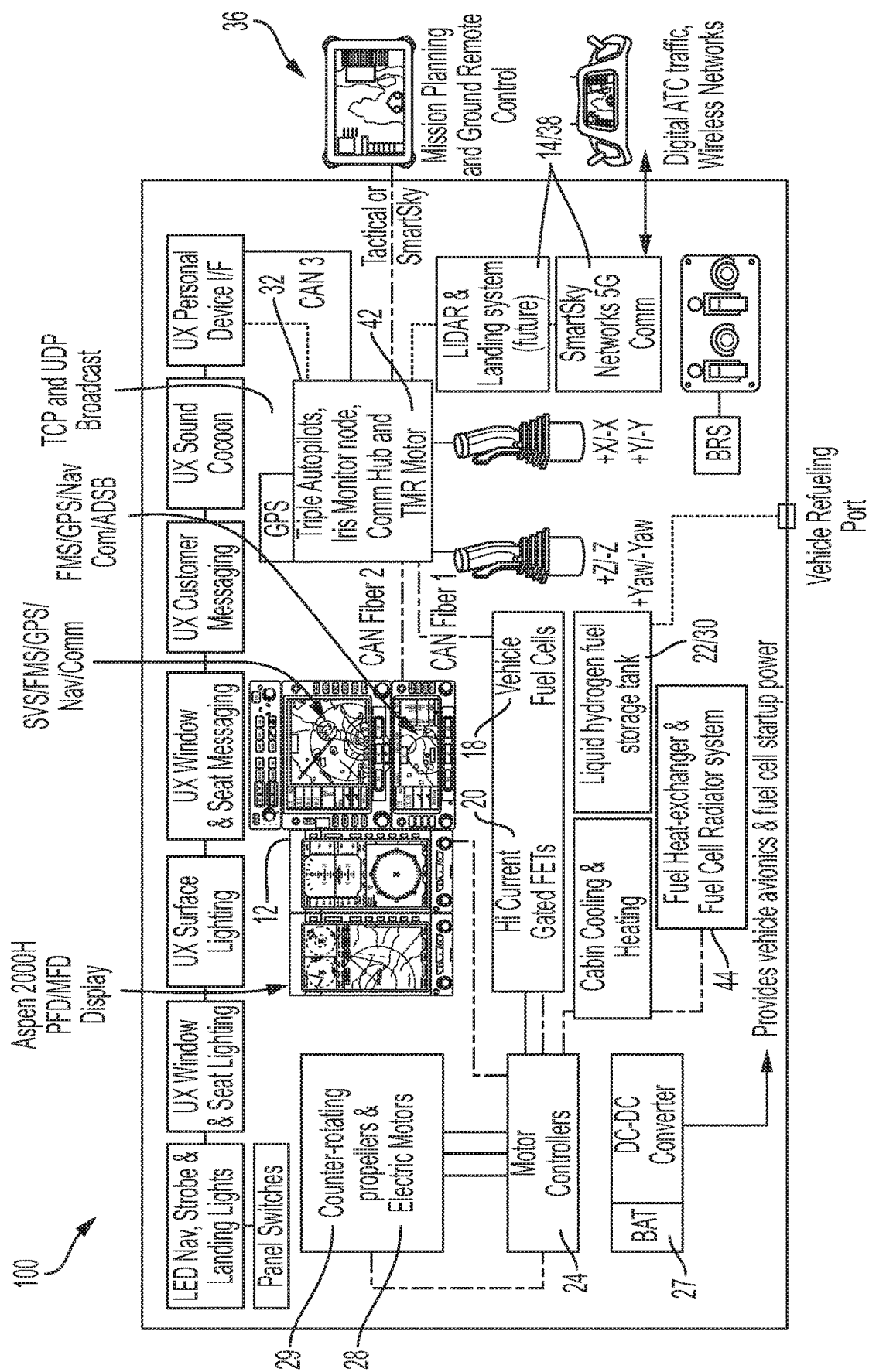
FIG. 2A depicts an example system diagram of electrical and systems connectivity for various control interface components of a system of the invention.
Figure 2B:
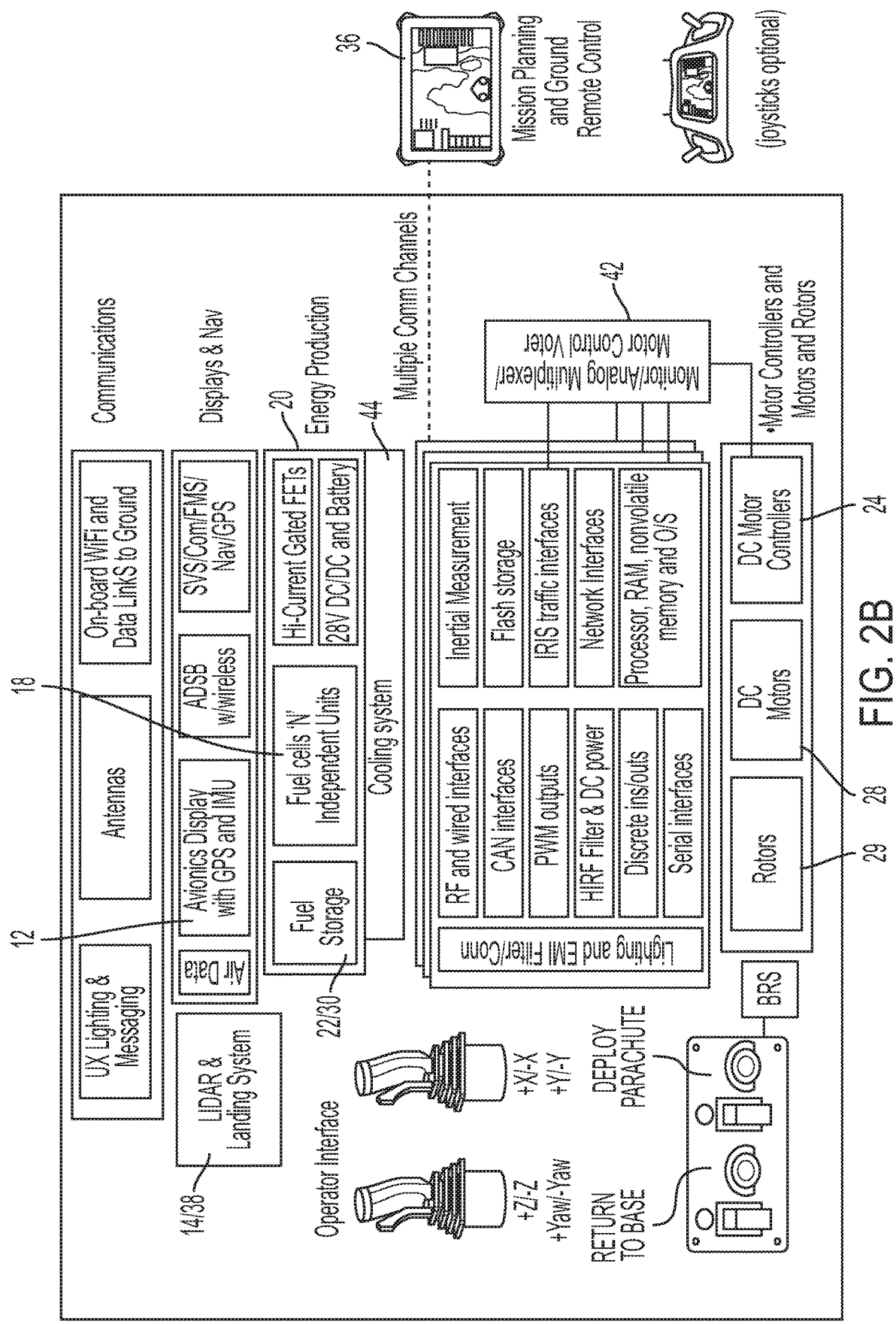
FIG. 2B depicts an example system diagram of electrical and systems connectivity for various control interface components of a system of the invention that can be configured for alternative types of control.

FIG. 2A and FIG. 2B depict a production version system diagrams of an example embodiment, including electrical and systems connectivity for various control interface components of a system 100 of the invention, including logic controlling the generation, distribution, adjustment and monitoring of electrical power (voltage and current). Vehicle state (pitch, bank, yaw, airspeed, vertical speed and altitude) are commanded a) by the operator using either a1) physical motions and commands made using the mission control tablet computers 36 as an input device; a2) physical motions and commands made using the sidearm controllers; or a3) physical motions and commands transmitted across secure digital or tactical datalinks or radio channels from a Ground-Remote Pilot; or a4) pre-planned mission routes selected and pre-programmed using the mission control tablet computers 36 and mission-planning software 34 in support of autonomous mode, or b) in UAV mode using pre-planned mission routes selected and pre-programmed using the mission control tablet computers 36 and mission-planning software 34 and uploaded to the onboard autopilot system prior to launch. The mission control tablet computer 36 may transmit the designated route or position command set to autopilot computers 32 and voter 42 over a serial, radio-control or similar datalink, and if so, the autopilot may then utilize that designated route or position command set (e.g. a set of altitudes and positions to form a route that is to be traveled from origin to destination). Depending on the equipment and protocols involved in the example embodiment, a sequence of commands may be sent using a repeating series of servo control pulses carrying the designated command information, represented by pulse-widths varying between 1.0 to 2.0 milliseconds contained within a 'frame' of, for example, 10 to 30 milliseconds). Multiple 'channels' of command data may be included within each 'frame', with the only caveat being that each maximum pulse width must have a period of no output (typically zero volts or logic zero) before the next channel's pulse can begin. In this way, multiple channels of command information are multiplexed onto a single serial pulse stream within each frame. The parameters for each pulse within the frame are that it has a minimum pulse width, a maximum pulse width, and a periodic repetition rate. The motor's RPM or torque is determined by the duration of the pulse that is applied to the control wire. Note that the motor's RPM is not determined by the duty cycle or repetition rate of the signal, but by the duration of the designated pulse. The autopilot might expect to see a pulse every 20 ms, although this can be shorter or longer, depending upon system 100 requirements. The width of each channel's pulse within the frame will determine how fast the corresponding motor turns. For example, anything less than a 1.2 ms pulse may be pre-programmed as 'Motor OFF' or 0 RPM (where a motor in the off state can be spun freely by a person, whereas a motor commanded to be at 0 RPM will be "locked" in that position), and pulse widths ranging from 1.2 ms up to 2.0 ms will proportionately command the motor from 20% RPM to 100% RPM. Given the physical constraints of the motor being controlled, the exact correlation between pulse width and resultant motor RPM will be a function of each system's programming. In another embodiment, motor commands may be transmitted digitally from the autopilot to the motor controllers 24 and status and/or feedback may be returned from the motor controllers 24 to the autopilot using a digital databus such as Ethernet or CAN (Controller Area Network), one of many available digital databusses capable of being applied, using RF or wire or fiber optics as the transmission medium. A modem (modulator—demodulator) may be implicitly present within the datalink device pair, so that the user sends Ethernet or CAN commands, the modem transforms said data into a format suitable for reliable transmission and reception across one or more channels, and the mating modem transforms that format back into the original Ethernet or CAN commands at the receiving node, for use within the autopilot system. As understood by a person of ordinary skill in the art, many possible embodiments are available to implement wireless data links between a tablet or ground pilot station and the vehicle, just as many possible embodiments are available to transmit and receive data and commands among the autopilot, the motor controllers 24, and the fuel cells and support devices that form the on-board power generation and motor controlling system.

The receiver at each autopilot then uses software algorithms to translate the received channel pulses correlating to channel commands from the tablet computer or alternate control means (in this example the set of pulse-widths representing the control inputs such as pitch, bank and yaw and rpm) into the necessary outputs to control each of the multiple (in this example six) motor controllers 24, motors, and propellers 29 to achieve the commanded vehicle motions. Commands may be transmitted by direct wire, or over a secure RF (wireless) signal between transmitter and receiver, and may use an RC format, or may use direct digital data in Ethernet, CAN or another suitable protocol. The autopilot is also responsible for measuring other vehicle state information, such as pitch, bank angle, yaw, accelerations, and for maintaining vehicle stability using its own internal sensors and available data.

The command interface between the autopilots and the multiple motor controllers 24 will vary from one equipment set to another, and might entail such signal options to each motor controller 24 as a variable DC voltage, a variable resistance, a CAN, Ethernet or other serial network command, an RS-232 or other serial data command, or a PWM (pulse-width modulated) serial pulse stream, or other interface standard obvious to one skilled in the art. Control algorithms operating within the autopilot computer 32 perform the necessary state analysis, comparisons, and generate resultant commands to the individual motor controllers 24 and monitor the resulting vehicle state and stability. A voting means 42 decides which two of three autopilot computers 32 are in agreement, and automatically performs the voting operation to connect the proper autopilot computer 32 outputs to the corresponding motor controllers 24. For a redundant system 100, triple-redundant is the most common means of voting among inputs to detect a possible failure, but other levels of redundancy are also possible subject to meeting safety of flight requirements and regulations, and are obvious to one skilled in the art.

In a preferred control embodiment, the commanded vehicle motion and motor rpm commands could also be embodied by a pair of joysticks and a throttle, similar to those used to control radio-controlled aircraft, or even by a pair of traditional sidearm controllers including a throttle, where the joysticks/sidearm controllers provide readings (which could be potentiometers, hall-effect sensors, or rotary-variable differential transformers (RVDT)) indicative of commanded motions which may then be translated into the appropriate message format and transmitted to the autopilot computers 32 by network commands or signals, and thereby used to control the multiple motor controllers 24, motors and propellers/rotors 29. The sidearm controller or joystick could also be embodied in a 'steering wheel' or control yoke capable of left-right and fore-aft motion, where the 2-axis joystick or control yoke provides two independent sets of single- or dual-redundant variable voltage or potentiometer settings indicative of pitch command (nose up or nose down) and bank command (left side up or left side down). Alternatively, instead of pitch and roll motions, the autopilot may also be capable of generating 'go left', 'go right' 'go forward' 'go backward', 'yaw left' or 'yaw right' commands, all while the autopilot is simultaneously maintaining the vehicle in a stable, level or approximately level state. This latter control means offers greater comfort for passenger(s) because it is similar to ground-based vehicle (e.g. automobile) motions than an air vehicle such as a winged aircraft.

Motors of the multiple motors and propellers 29 in the preferred embodiment are brushless synchronous three-phase AC or DC motors, capable of operating as an aircraft motor, and that are either air-cooled or liquid cooled (by coolants including water, anti-freeze, oil or other coolants understood by one of ordinary skill in the art) or both.

Throughout all of the system 100 operation, controlling and operating the vehicle is performed with the necessary safety, reliability, performance and redundancy measures required to protect human life to accepted flight-worthiness standards.

Electrical energy to operate the vehicle is derived from the fuel cell modules 18, which provide voltage and current to the motor controllers 24 through optional high-current diodes or Field Effect Transistors (FETs) 20 and circuit breakers 902. High current contactors 904 or similar devices are engaged and disengaged under control of the vehicle key switch 40, similar to a car's ignition switch, which applies voltage to the starter/generator 26 to start the fuel cell modules 18 and produce electrical power. For example, the high current contactors 904 may be essentially large vacuum relays that are controlled by the vehicle key switch 40 and enable the current to flow to the starter/generator 26. In accordance with an example embodiment of the present invention, the starter/generator 26 also supplies power to the avionic systems of the aircraft 1000. Once stable power is available, the motor controllers 24 each individually manage the necessary voltage and current to achieve the desired thrust by controlling the motor in either RPM mode or torque mode, to enable thrust to be produced by each motor and propeller/rotor combination 28. The number of motor controllers 24 and motor/propeller combinations 28 per vehicle may be as few as 4, and as many as 16 or more, depending upon vehicle architecture, desired payload (weight), fuel capacity, electric motor size, weight, and power, and vehicle structure. Advantageously, implementing a multirotor vehicle having a plurality of independent motor controllers 24 and motors, allows the use of smaller motors with lower current demands, such that fuel cells can produce the necessary voltage and current at a total weight for a functional aviation vehicle while achieving adequate flight durations, and allows the failure of one or more motors or motor controllers 24 to be compensated for by the autopilot to allow continued safe flight and landing in the event of said failure.

The fuel cells 18 are supplied by on-board fuel storage 22. The ability to refuel the multirotor aircraft 1000 fuel tanks 22 at the origin, at the destination, or at roadside refueling stations is fundamental to the vehicle's utility and acceptance by the commuting public. The ability to refuel the fuel tanks 22 to replace the energy source for the motors reduces the downtime required by conventional all electric vehicles (e.g., battery operated vehicles), which must be recharged from an external electricity source, which may be a time-consuming process. Fuel cells and fuel cell modules 18 can be powered by hydrogen. Accordingly, the fuel cell modules 18 can create electricity from fuel to provide power to the motors on the multirotor aircraft 1000. Advantageously, the use of fuel cell modules 18 are more weight efficient than batteries and provide a greater energy density than existing Li ion batteries, thereby reducing the work required by the motors to produce lift. Additionally, the use of hydrogen fuel cells reduces the amount of work required by the motors due to the reduced weight as the fuel 30 is consumed.

Due to the nature of the all-electric vehicle, it is also possible to carry an on-board high-voltage battery and recharging subsystem in addition to fuel cell modules 18, with an external receptacle to facilitate recharging the on-board batteries. In some instances, it may also be desirable to operate the vehicle at the end of an electrical and data tether, for long-duration unmanned airborne surveillance, security or other applications. In this situation, power would be replenished or provided via the tether cable, and control information could be provided either by onboard systems as described herein, or by bidirectional wired or broadband or wireless or RF networks operated by ground controllers.

Power to operate the vehicle's avionics 12, 14, 16, 32, 34, 36, 38 and support lighting is provided by either a) a low-voltage starter-generator 26 powered by the fuel cell modules 18 and providing power to avionics battery 27, or b) a DC to DC Converter providing energy to Avionics Battery 27. If the DC to DC Converter is used, it draws power from high-voltage produced by the fuel cell modules 18 and down-converts the higher voltage, typically 300V DC to 600 VDC in this embodiment, to either 12V, 24V or 28V or other voltage standards, any of which are voltages typically used in small aircraft systems. Navigation, Strobe and Landing lights draw power from 26 and 27 and provide necessary aircraft illumination for safety and operations at night under US and foreign airspace regulations. Suitable circuit breaker 902 and switch means are provided to control these ancillary lighting devices as part of the overall system 100. These devices are commonly implemented as Light Emitting Diode (LED) lights, and may be controlled either directly by one or more switches, or by a databus-controlled switch in response to a CAN or other digital databus command. If a CAN or databus command system is employed as shown in FIG. 1b, then multiple 'user experience' or UX devices may also be employed, to provide enhanced user experience with such things as cabin lighting, seat lighting, window lighting, window messaging, sound cancellation or sound cocoon control, exterior surface lighting, exterior surface messaging or advertising, seat messaging, cabin-wide passenger instruction or in-flight messaging, passenger weight sensing, personal device (e.g. iPhone, tablet, iPad, (or Android or other device equivalents or similar personal digital devices) connectivity and charging, and other integrated features as may be added within the cabin or vehicle.

Pairs of motors for the multiple motors and propellers 29 are commanded to operate at different RPM or torque settings (determined by whether the autopilot is controlling the motors in RPM or torque mode) to produce slightly differing amounts of thrust under autopilot control, thus imparting a pitch moment, or a bank moment, or a yaw moment, or a change in altitude, or a lateral movement, or a longitudinal movement, or simultaneously any combination of the above to the aircraft 1000, using position feedback from the autopilot's 6-axis built-in or remote inertial sensors to maintain stable flight attitude. Sensor data is read by each autopilot to assess its physical motion and rate of motion, which is then compared to commanded motion in all three dimensions to assess what new motion commands are required.

Of course, not all aircraft will employ the same mix of avionics, instrumentation or controllers or motors, and some aircraft will include equipment different from this mix or in addition to this mix. Not shown for example are radios as may be desirable for communications or other small ancillary avionics customary in general aviation aircraft of this size. Whatever the mix is, though, some set of equipment accepts input commands from an operator, translates those input commands into differing thrust amounts from the pairs of counter-rotating motors and propellers 29, and thus produces pitch, bank, yaw, and vertical motion of the aircraft 1000, or lateral and longitudinal as well as and vertical and yaw motion of the aircraft 1000, using differing commands to produce differential thrust from the electric motors operating propellers/rotors 29 in an assembly 28. When combined with avionics, instrumentation and display of the aircraft's 1000 current and intended location, the set of equipment enables the operator, whether inside the vehicle, on the ground via datalink, or operating autonomously through assignment of a pre-planned route, to easily and safely operate and guide the aircraft 1000 to its intended destination.

FIG. 2 includes motor and propeller combinations 28, propellers 29 primary flight displays 12, the Automatic Dependent Surveillance-B (ADSB) or Remote ID transmitter/receiver 14, autopilot computer 32, the mission control tablet computers 36 and mission-planning software 34. In each case, a mission control tablet computer or sidearm controllers may transmit the designated route or position command set or the intended motion to be achieved to autopilot computers 32 and voter 42 motor controllers 24, and air data computer to calculate airspeed and vertical speed 38. In some embodiments, fuel tank 22, the avionics battery 27, the pumps and cooling system 44, the turbocharger or supercharger 46, and a starter/alternator may also be included, monitored, and controlled. Any fuel cells 18 are fed by on-board fuel 30 tank 22 and use the fuel to produce a source of power for the multirotor aircraft 1000. These components are configured and integrated to work together with 4D Flight Management to auto generate and execute routes from minimal input, so a user doesn't need expertise to define proper route. Full Envelope Protection has been developed and implemented so neither users nor environments can push the vehicle out of safe flight envelope and operating conditions. Envelope Protection offers a Safer System for protecting occupants, developed using wake vortex modeling, weather data, and precisely designed redundant algorithms incorporating the highest standards available for performance and safety. The goal is that there is nothing the vehicle, the human operator/supervisor/passenger, or the environment can do that would push the vehicle out of its safety envelope unless or until there is a failure in some aspect of the system. The motors in the preferred embodiment are brushless synchronous three-phase AC or DC motors, capable of operating as an aircraft motor, and that are air-cooled, liquid cooled or both. Motors and fuel cell modules 18 generate excess or waste heat from forces including electrical resistance and friction, and so this heat may be subject to management and thermal energy transfer. In one embodiment, the motors are connected to a separate cooling loop or circuit from the fuel cell modules 18. In another embodiment, the motors are connected to a shared cooling loop or circuit with the fuel cell modules 18.

The system 1000 implements pre-designed fault tolerance or graceful degradation that creates predictable behavior during anomalous conditions with respect to at least the following systems and components: 1) flight control hardware; 2) flight control software; 3) flight control testing; 4) motor control and power distribution subsystem; 5) motors; and 6) fuel cell power generation subsystem.

Flight control hardware may comprise, for example, a redundant set of Pixhawk or other flight controllers with 32-bit, 64-bit or greater ARM processors (or other suitable processor known in the art, wherein certain embodiments may employ no processor and instead use an FPGA or similar devices known in the art). The vehicle may be configured with multiple flight controllers, where certain example embodiments employ at least three (3) Pixhawk autopilots disposed inside the vehicle for redundancy. Each autopilot comprises: three (3) Accelerometers, three (3) gyros, three (3) magnetometers, two (2) barometers, and at least one (1) GPS device, although the exact combinations and configurations of hardware and software devices may vary. Sensor combining and voting algorithms internal to each autopilot select the best value from each sensor type and handle switchovers/sensor failures within each autopilot. Flight control software may comprise at least one PID style algorithm that has been developed using: 1) CAD data; 2) FEA data; and 3) actual propeller/motor/motor controller/fuel cell performance data measurements.

An example embodiment is shown for the vehicle's 6 motors, with each motor controlled by a dedicated motor controller 24. Electrical operating characteristics/data for each motor are controlled and communicated to the voting system for analysis and decision making. Communication to the motor controllers 24 happens (in this embodiment) between autopilot and motor controller 24 via CAN, a digital network protocol, with fiber optic transceivers inline to protect signal integrity and provide electromagnetic and lightning immunity. In this embodiment, the use of fiber optics, sometimes known as 'Fly By Light' increases vehicle reliability and reduces any vulnerability to ground differentials, voltage differentials, electromagnetic interference, lighting, and external sources of electromagnetic interference, such as TV or radio broadcast towers, airport radars, airborne radars, and similar potential disturbances. Other instances of networks and electrical or optical or wireless media are possible as well, subject to meeting regulatory requirements. Measured parameters related to motor performance include motor temperature, IGBT temperature, voltage, current, torque, and revolutions per minute (RPM). Values for these parameters in turn correlate to the thrust expected under given atmospheric, power and pitch conditions.

The fuel cell control system may have various numbers of fuel cells based on the particular use configuration, for example a set of three hydrogen fuel cells configured for fault-tolerance. Operation and control of the cells is enabled and managed using the CAN protocol, although numerous other databus and control techniques are possible and will be obvious to one skilled in the art. One or more flight control algorithms stored within the autopilot will control and monitor the power delivered by the fuel cells via CAN. The triple-modular redundant auto-pilot can detect the loss of any one fuel cell and reconfigure the remaining fuel cells using a form of automatic switching or cross connection, thus ensuring that the fuel cell system is capable of continuing to operate the aircraft 1000 to perform a safe descent and landing. When the operating parameters are exceeded past a significant extent or preset limit, or emergency conditions exist such that a safe landing is jeopardized, the integrated emergency procedures are activated and the deployment of an inter-rotor ballistic airframe parachute will be triggered.

The autopilot computer 32 is embodied in a microprocessor-based circuit and includes the various interface circuits required to communicate with the aircraft's 1000 data busses, multi-channel servo or network controllers (inputs) 35 and 37, and motor controller (outputs) 24, and to take inertial and attitude measurements to maintain stability. This is further detailed in FIG. 3, which depicts a block diagram detailing the key features of the redundant, fault-tolerant, multiple-redundant voting control and communications means and autopilot control unit 32 in relation to the overall system. In addition, autopilot computer 32 may also be configured for automatic recording or reporting of aircraft position, aircraft state data, velocity, altitude, pitch angle, bank angle, thrust, location, and other parameters typical of capturing aircraft position and performance, for later analysis or playback. Additionally recorded data may be duplicated and sent to another computer or device that is fire and crash proof. To accomplish these requirements, said autopilot contains an embedded air data computer (ADC) and embedded inertial measurement sensors, although these data could also be derived from small, separate stand-alone units. The autopilot may be operated as a single, dual, quad, or other controller, but for reliability and safety purposes, the preferred embodiment uses a triple redundant autopilot, where the units share information, decisions and intended commands in a co-operative relationship using one or more networks (two are preferred, for reliability and availability). In the event of a serious disagreement outside of allowable guard-bands, and assuming three units are present, a 2-out-of-3 vote determines the command to be implemented by the motor controllers 24, and the appropriate commands are automatically selected and transmitted to the motor controllers 24. Similarly, a subset of hardware monitors the condition of the network, a CAN bus in an example embodiment, to determine whether a bus jam or other malfunction has occurred at the physical level, in which case automatic switchover to the reversionary CAN bus occurs. The operator is not typically notified of the controller disagreement during flight, but the result will be logged so that the units may be scheduled for further diagnostics post-flight.

The mission control tablet computer 36 is typically a single or a dual redundant implementation, where each mission control tablet computer 36 contains identical hardware and software, and a screen button designating that unit as 'Primary' or 'Backup'. The primary unit is used in all cases unless it has failed, whereby either the operator (if present) must select the 'Backup' unit through a touch icon, or an automatic fail-over will select the Backup unit when the autopilots detect a failure of the Primary. When operating without a formal pre-programmed route, the mission control tablet computer 36 uses its internal motion sensors to assess the operator's intent and transmits the desired motion commands to the autopilot. When operating without a mission planning computer or tablet, the autopilots receive their commands from the connected pair of joysticks or sidearm controllers. In UAV mode, or in manned automatic mode, the mission planning software 34 will be used pre-flight to designate a route, destination, and altitude profile for the aircraft 1000 to fly, forming the flight plan for that flight. Flight plans, if entered into the Primary mission control tablet computer 36, are automatically sent to the corresponding autopilot, and the autopilots automatically cross-fill the flight plan details between themselves and the Backup mission control tablet computer 36, so that each autopilot computer 32 and mission control tablet computer 36 carries the same mission commands and intended route. In the event that the Primary tablet fails, the Backup tablet already contains the same flight details, and assumes control of the flight once selected either by operator action or automatic fail-over.

For motor control of the multiple motors and propellers 29, there are three phases that connect from each high-current controller to each motor for a synchronous AC or DC brushless motor. Reversing the position of any two of the 3 phases will cause the motor to run the opposite direction. There is alternately a software setting within the motor controller 24 that allows the same effect, but it is preferred to hard-wire it, since the designated motors running in the opposite direction must also have propellers with a reversed pitch (these are sometimes referred to as left-hand vs right-hand pitch, or puller (normal) vs pusher (reversed) pitch propellers, thereby forming the multiple motors and propellers 29. Operating the motors in counter-rotating pairs cancels out the rotational torque that would otherwise be trying to spin the vehicle.

In the illustrated embodiment, the operational analyses and control algorithms described herein are performed by the on-board autopilot computer 32, and flight path and other useful data are presented on the avionics displays 12. Various aspects of the invention can be practiced with a different division of labor; some or all of the position and control instructions can in principle be performed outside the aircraft 1000, in ground-based equipment, by using a broadband or 802.11 Wi-Fi network or Radio Frequency (RF) datalink or tactical datalink mesh network or similar between the aircraft 1000 and the ground-based equipment.

The combination of the avionics display system coupled with the ADSB capability enables the multirotor aircraft 1000 to receive broadcast data from other nearby aircraft, and to thereby allow the multirotor aircraft 1000 to avoid close encounters with other aircraft; to broadcast own-aircraft position data to avoid close encounters with other cooperating aircraft; to receive weather data for display to the pilot and for use by the avionics display system within the multirotor aircraft 1000; to allow operation of the multirotor aircraft 1000 with little or no requirement to interact with or communicate with air traffic controllers; and to perform calculations for flight path optimization, based upon own-aircraft state, cooperating aircraft state, and available flight path dynamics under the National Airspace System, and thus achieve optimal or near-optimal flight path from origin to destination.

Figure 3:
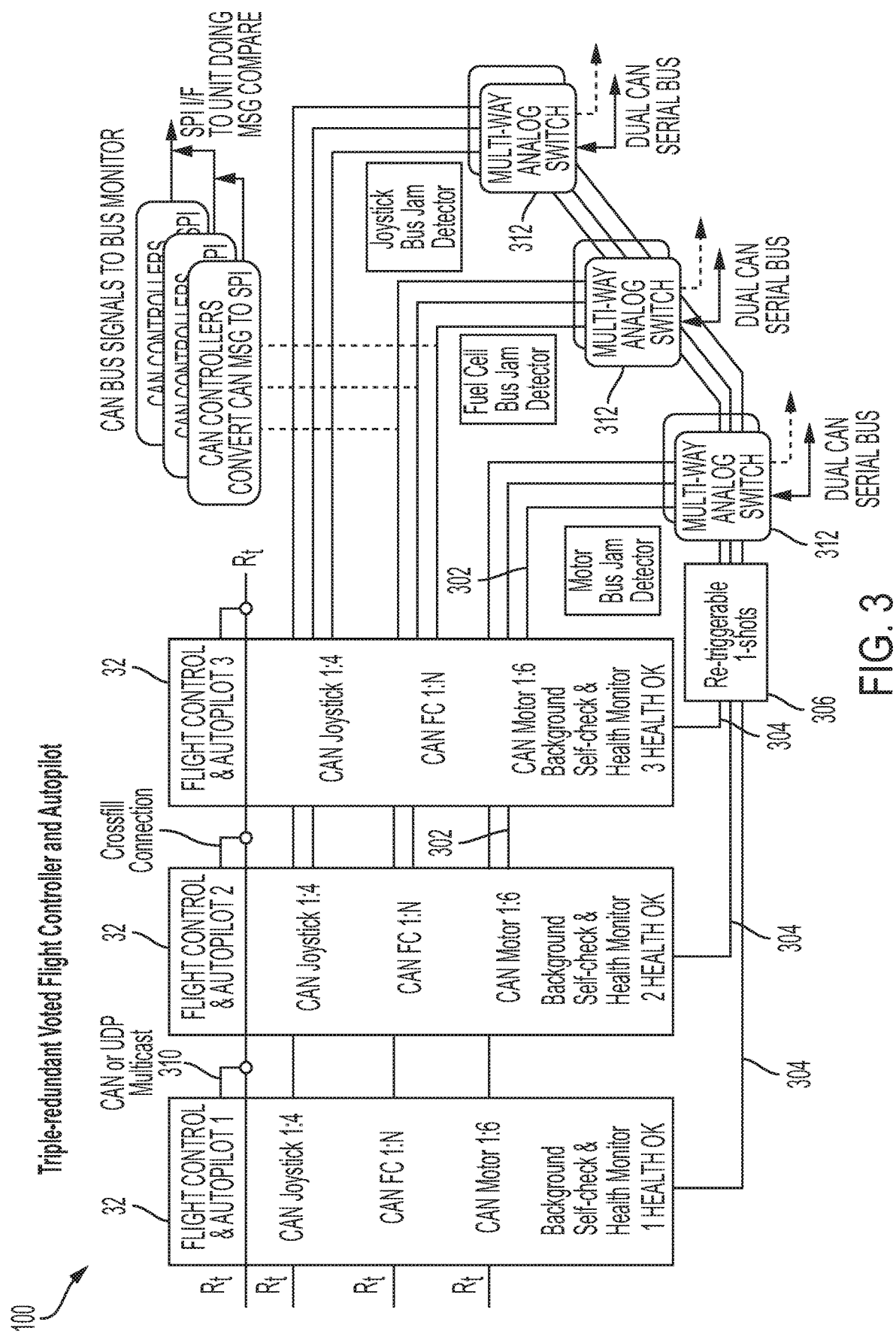
FIG. 3 depicts an example more detailed block diagram, focused on an example fault-tolerant, triple-redundant voting control and communications means.
Figure 4A:
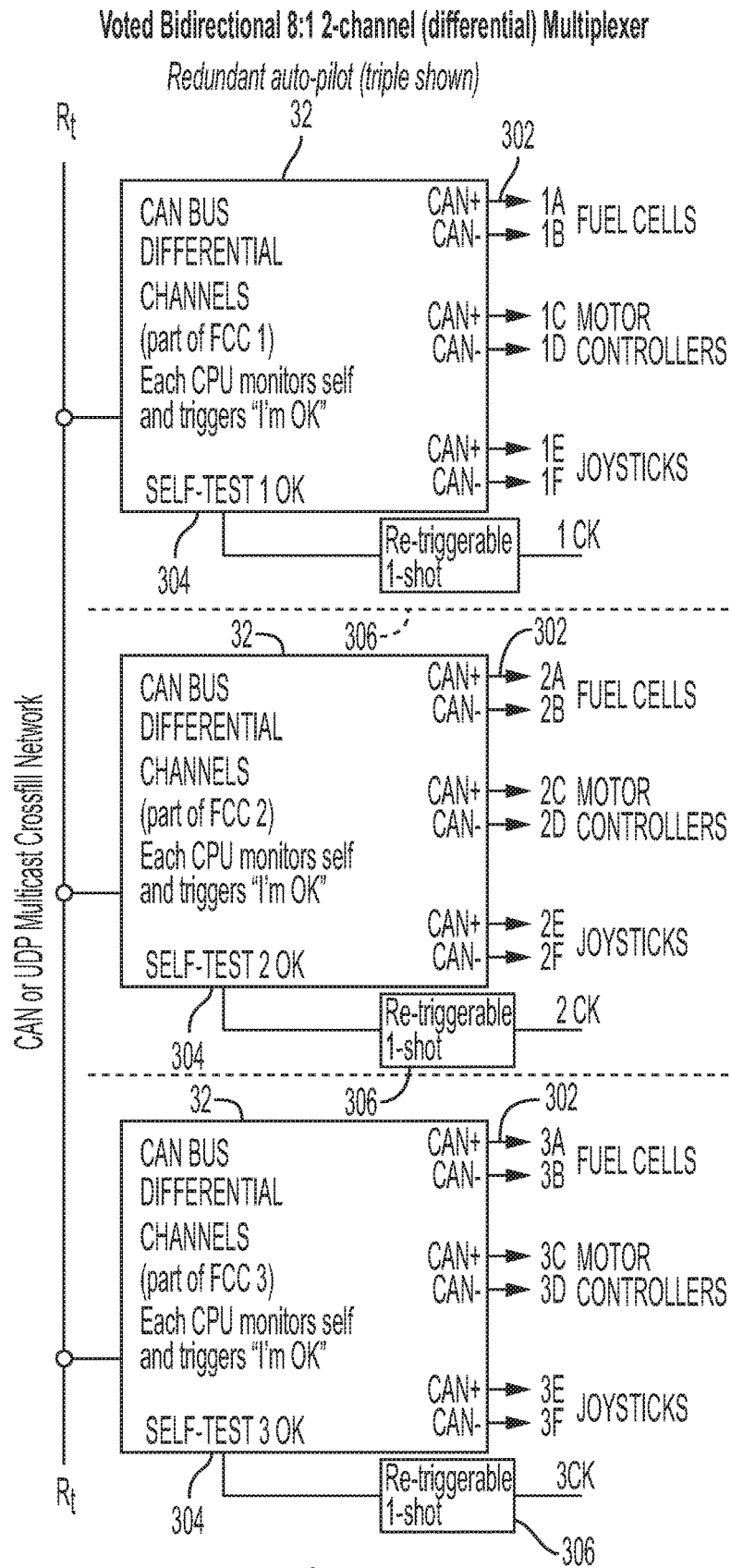
FIGS. 4A, 4B, 4C, and 4D depict an example voted bidirectional multiplexor electrical signal management.
Figure 4B:
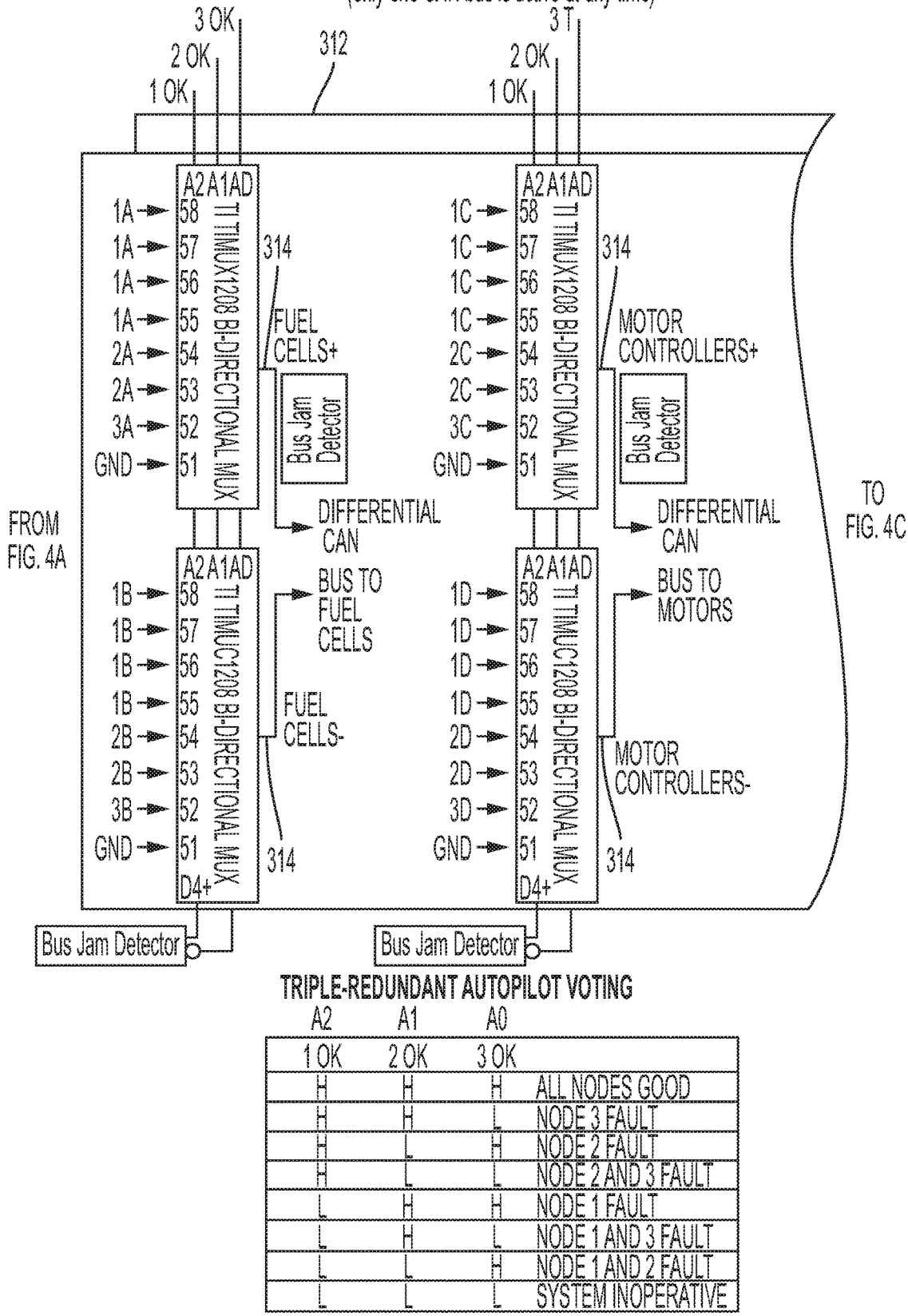
Figure 4C:
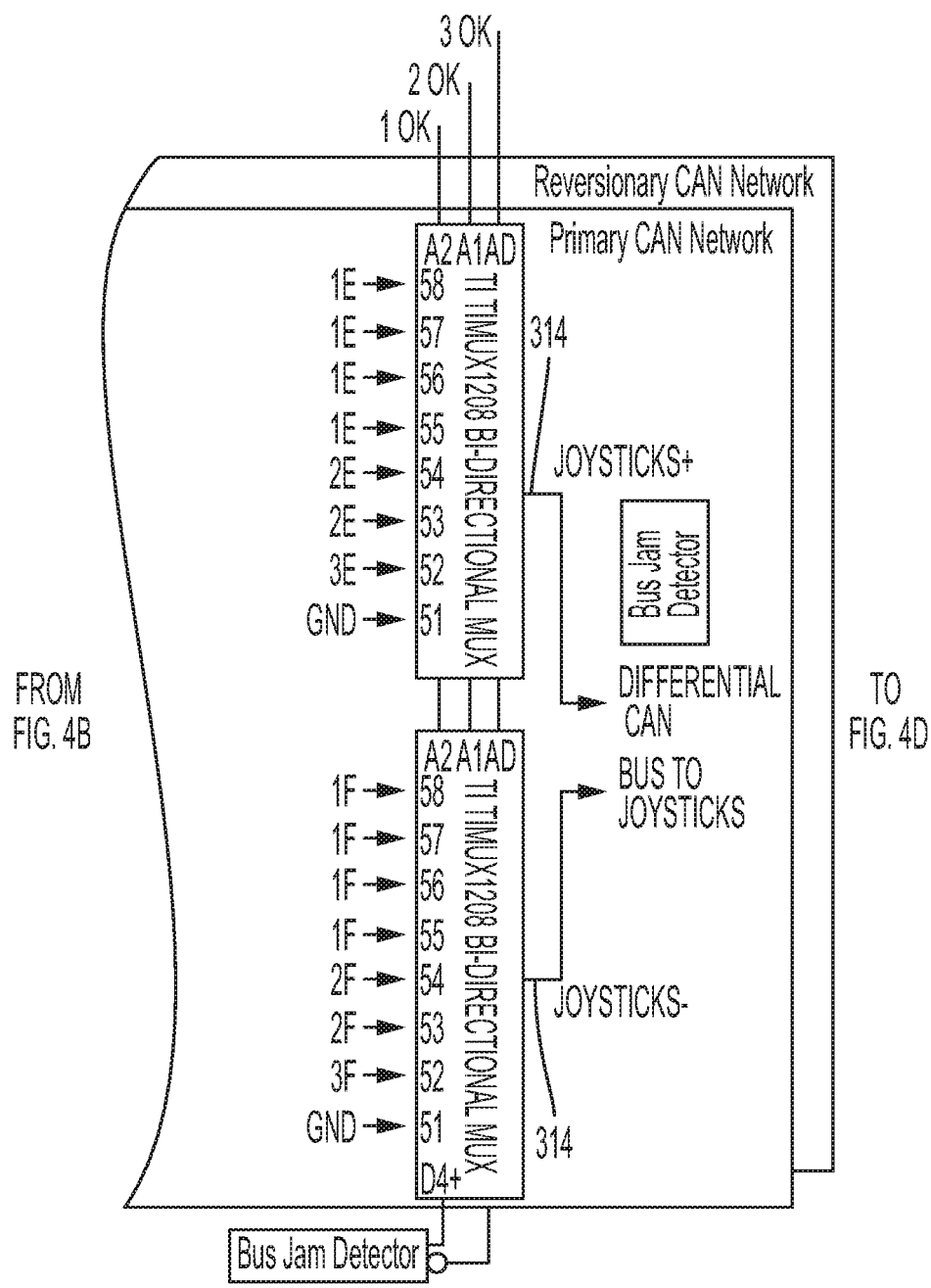
Figure 4D:
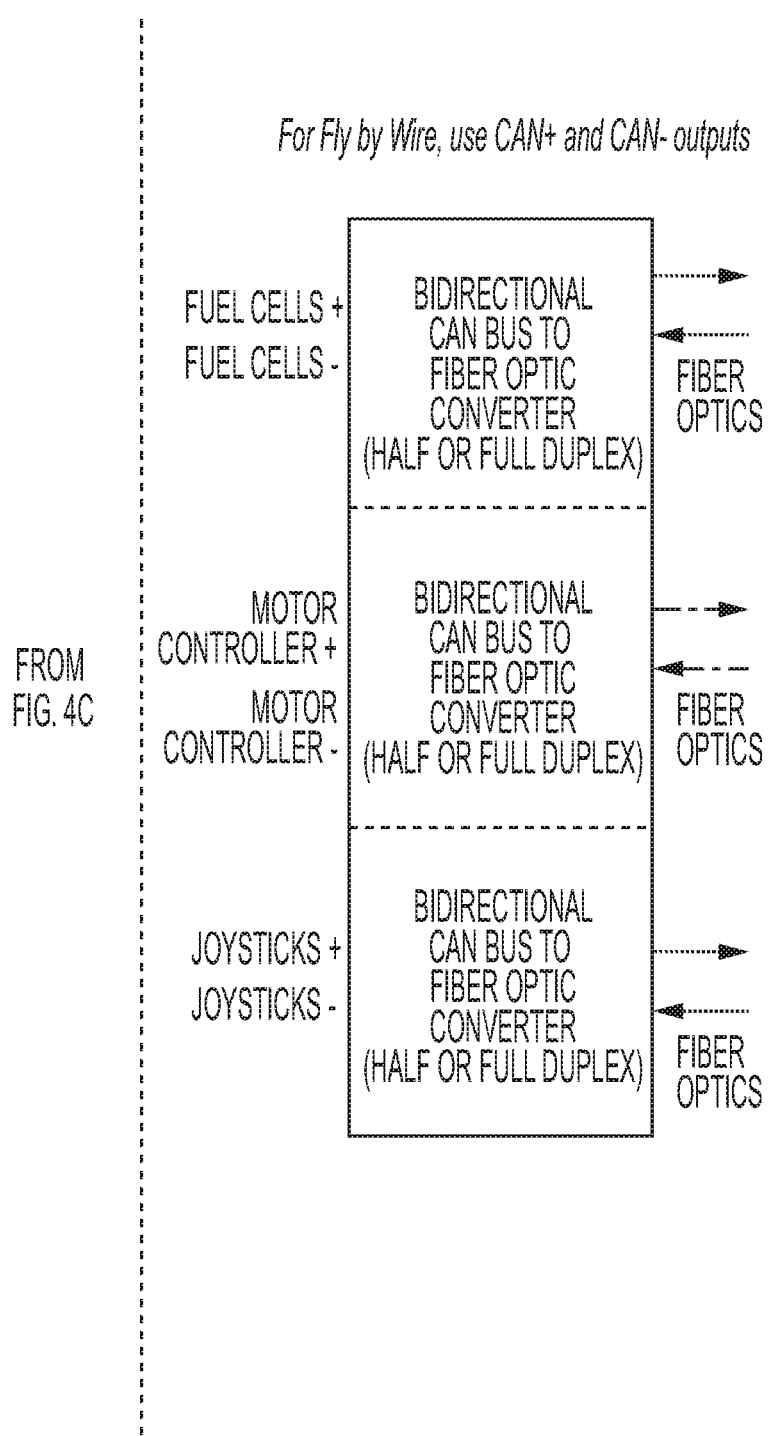

FIG. 3 depicts a more detailed example block diagram, showing the voting process that is implemented with the fault-tolerant, triple-redundant voting control and communications means to perform the qualitative decision process. Since there is no one concise 'right answer' in this real-time system, the autopilot computers 32 instead share flight plan data and the desired parameters for operating the flight by cross-filling the flight plan, and each measures its own state-space variables that define the current aircraft 1000 state, and the health of each Node. Each node independently produces a set of motor control outputs 314 (in serial CAN bus message format in the described embodiment), and each node assesses its own internal health status. The results of the health-status assessment are then used to automatically select which of the autopilots actually are in control of the motors of the multiple motors and propellers 29.

In an example embodiment, the voting process is guided by the following rules: 1) Each autopilot node (AP) 32 asserts "node ok" 304 when its internal health is good, at the start of each message. Messages occur each update period, and provide shared communications between AP's; 2) Each AP de-asserts "node ok" if it detects an internal failure, or its internal watchdog timer expires (indicating AP or software failure), or it fails background self-test; 3) Each AP's "node ok" signal must pulse at least once per time interval to retrigger a 1-shot 'watchdog' timer 306; 4) If the AP's health bit does not pulse, the watchdog times out and the AP is considered invalid; 5) Each AP connects to the other two AP's over a dual redundant, multi-transmitter bus 310 (this may be a CAN network, or an RS-422/423 serial network, or an Ethernet network, or similar means of allowing multiple nodes to communicate); 6) The AP's determine which is the primary AP based on which is communicating with the cockpit primary tablet; 7) The primary AP receives flight plan data or flight commands from the primary tablet; 8) The AP's then crossfill flight plan data and waypoint data between themselves using the dual redundant network 310 (this assures each autopilot (AP) knows the mission or command parameters as if it had received them from the tablet); 9) In the cockpit, the backup tablet receives a copy of the flight plan data or flight commands from its cross-filed AP; 10) Each AP then monitors aircraft 1000 state vs commanded state to ensure the primary AP is working, within an acceptable tolerance or guard-band range (where results are shared between AP's using the dual redundant network 310); 11) Motor output commands are issued using the PWM motor control serial signals 314, in this embodiment (other embodiments have also been described but are not dealt with in detail here) and outputs from each AP pass through the voter 312 before being presented to each motor controller 24; 12) If an AP de-asserts its health bit or fails to retrigger its watchdog timer, the AP is considered invalid and the voter 312 automatically selects a different AP to control the flight based on the voting table; 13) The new AP assumes control of vehicle state and issues motor commands to the voter 312 as before; 14) Each AP maintains a health-status state table for its companion AP's (if an AP fails to communicate, it is logged as inoperative, and the remaining AP's update their state table and will no longer accept or expect input from the failed or failing AP); 15) Qualitative analysis is also monitored by the AP's that are not presently in command or by an independent monitor node; 16) Each AP maintains its own state table plus 2 other state tables and an allowable deviation table; 17) The network master issues a new frame to the other AP's at a periodic rate, and then publishes its latest state data; 18) Each AP must publish its results to the other AP's within a programmable delay after seeing the message frame, or be declared invalid; and 19) If the message frame is not received after a programmable delay, node 2 assumes network master role and sends a message to node 1 to end its master role. Note that the redundant communication systems are provided in order to permit the system to survive a single fault with no degradation of system operations or safety. More than a single fault initiates emergency system implementation, wherein based on the number of faults and fault type, the emergency deceleration and descent system may be engaged to release an inter-rotor ballistic parachute.

Multi-way voter implemented using analog switch 312 monitors the state of 1.OK, 2.OK and 3.OK and uses those 3 signals to determine which serial signal set 302 to enable so that motor control messages 314 may pass between the controlling node and the motor controllers 24, fuel cell messages may pass between the controlling node and the fuel cells, and joystick messages may pass between the controlling node and the joysticks. This controller serial bus is typified by a CAN network in the preferred embodiment, although other serial communications may be used such as PWM pulse trains, RS-232, Ethernet, or a similar communications means. In an alternate embodiment, the PWM pulse train is employed; with the width of the PWM pulse on each channel being used to designate the percent of RPM that the motor controller 24 should achieve. This enables the controlling node to issue commands to each motor controller 24 on the network. Through voting and signal switching, the multiple (typically one per motor plus one each for any other servo systems) command stream outputs from the three autopilot computers can be voted to produce a single set of multiple command streams, using the system's knowledge of each autopilot's internal health and status.

FIGS. 4A, 4B, 4C, and 4D depict a voted bidirectional multiplexor electrical signal management that some example embodiments of the invention may employ. The system 100 provides a sensing devices or safety sensors that monitor the various subsystems, and including the at least one fuel cell module and the plurality of motor controllers, each configured to self-measure and report parameters using a Controller Area Network (CAN) bus to inform the one or more autopilot control units 32 or computer units (CPUs) as to a valve, pump or combination thereof to enable to increase or decrease of fuel supply or cooling using fluids wherein thermal energy is transferred from the coolant, wherein the one or more autopilot control units 32 comprise at least two redundant autopilot control units that command the plurality of motor controllers 24, the fuel supply subsystem, the at least one fuel cell module 18, and fluid control units with commands operating valves and pumps altering flows of fuel, air and coolant to different locations, and wherein the at least two redundant autopilot control units 32 communicate a voting process over a redundant network where the at least two redundant autopilot control units 32 with CPUs provide health status indicators (e.g. an "I'm OK" signal triggered periodically). The signals and analog voting circuit compute the overall health of e.g. fuel cell modules by determining from the individual health status indicators whether all nodes are good, a particular node is experiencing a fault, a series of fault are experienced, or the system is inoperative (or other similar indications based on aggregation of individual signals and cross check verification). Results of voting then trigger appropriate signals sent to control e.g. fuel cell modules 18 or motor controllers 24.

Figure 5:
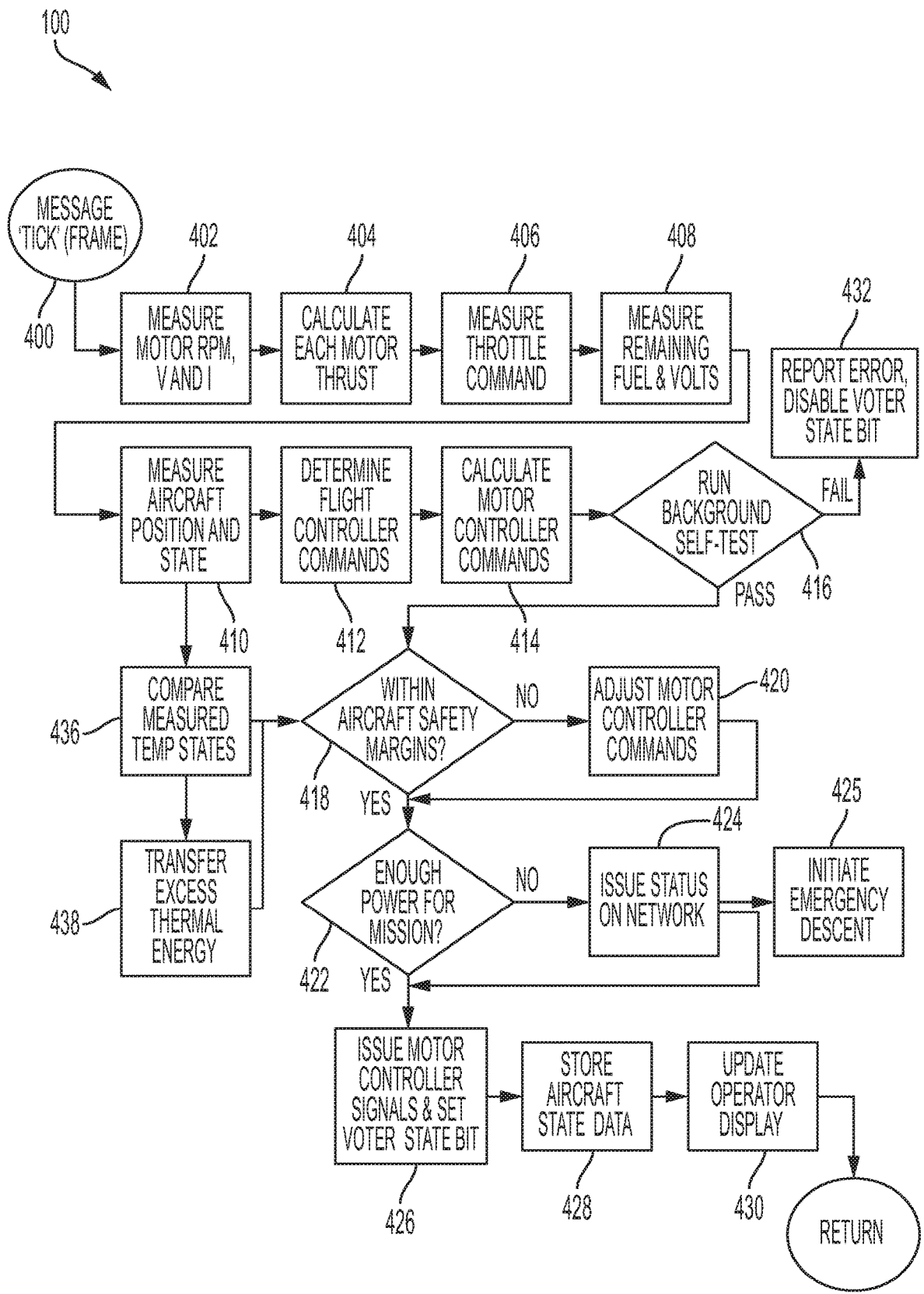
FIG. 5 depicts a flow chart that illustrates the procedure steps in accordance with one example embodiment of the present invention.

FIG. 5 depicts a flowchart that illustrates in simplified form a measurement-analysis-adjustment-control approach that some example embodiments of the invention may employ. The system enters the routine 400 periodically, at every "tick" of a periodic system frame as initiated by the controlling AP via an output message. The frequency at which this occurs is selected to be appropriate to the parameters being sensed and the flight dynamics of the vehicle, and in some cases the frequencies may be different for different measurements. For the sake of simplicity, though, the frequency is the same for all of them, and, for the sake of concreteness, an oversampling frequency of forty times per second or every 25 milliseconds, more or less, is applied.

At block 402, the system first takes measurements of various sensor outputs indicative of each motor's performance of the multiple motors and propellers 29, including propeller RPM, motor voltage, motor current and (if available) temperature or similar thermodynamic operating conditions. Such measurement data may be readily accessed through each motor controller's 24 serial data busses, and the illustrated embodiment selects among the various available measurement parameters that can be obtained in this manner.

With the motor data thus taken, the system performs various analyses, as at block 404, which may be used to calculate each motor's thrust and contribution to vehicle lift and attitude. Block 406 then measures the throttle command, by detecting where the tablet throttle command or throttle lever has been positioned by the operator and notes any change in commanded thrust from prior samples.

Block 408 measures the voltage, current drawn and estimated remaining fuel 30. This data is then used as part of the analysis of remaining flight duration for the trip or mission underway and is made available to the operator.

At block 410, the autopilot computer 32 gathers a representative group of aircraft 1000 measurements from other embedded inertial sensors and (optionally) other onboard sensors including air data sensors, and GPS data derived by receiving data from embedded GPS receivers. Such measurements may include air speed, vertical speed, pressure altitude, GPS altitude, GPS latitude and GPS longitude, outside-air temperature (OAT), pitch angle, bank angle, yaw angle, pitch rate, bank rate, yaw rate, longitudinal acceleration, lateral acceleration, and vertical acceleration. For some of the parameters, there are predetermined limits with which the system compares the measured values. This data may be used to determine thermodynamic operating conditions and is made available to the operator. These may be limits on the values themselves and/or limits in the amount of change since the last reading or from some average of the past few readings. Limits may be related to thermal references derived from thermodynamics, components, settings, parameters, and operating conditions. Block 412 then measures the tablet flight controller or sidearm controller command, by detecting where the tablet or sidearm units have been positioned by the operator in space and notes any change in commanded position from prior samples. If operating in pre-planned (UAV) mode, Block 412 assesses the next required step in the pre-planned mission previously loaded to the autopilot control unit 32.

Block 414 then assimilates all of the vehicle state data and commanded data from the operator and calculates the intended matrix of motor controller 24 adjustments necessary to accommodate the desired motions. Block 416 then executes the background health-status tests and passes the command matrix on to block 418. If the background health-status test fails, Block 416 reports the error, and disables the voter 312 output state bit at Block 432. If the test itself cannot be run, the voter 312 output state bit(s) will cease to pulse, and the external watchdog will declare the failure of that controller, allowing another to take over through the external voter 312 action.

Block 418 in turn examines the intended matrix of commands and assesses whether the intended actions are within the aircraft's 1000 safety margins. For example, if motor controller 3 is being commanded to output a certain current, is that current within the approved performance metrics for this aircraft 1000. If not, block 420 makes adjustments to the matrix of motor controller 24 commands and provides an indication to the Display to indicate that vehicle performance has been adjusted or constrained.

Similarly, Block 422 examines the intended matrix of commands, and assesses whether the electrical system and fuel tank 22 contain sufficient power to accomplish the mission with margins and without compromising the overall success of the mission. For example, if all motor controllers 24 are being commanded to output a higher current to increase altitude, is that current available and can this be done without compromising the overall success of the mission. If not, block 424 makes adjustments to the matrix of motor controller 24 commands and provides an indication to the Display to indicate that vehicle performance has been adjusted or constrained. Block 424 then issues network messages to indicate its actions and status to the other autopilot nodes.

If actions of the nodes are detected to not be capable of correcting a status of a number of nodes sufficient to prevent the aircraft 1000 from exceeding safe flight envelope parameters or maintaining flight stability, Block 425 then issues commands to the motor controllers 24 to initiate emergency procedures that may include emergency descent or inter-rotor ballistic airframe or aircraft parachute deployment, and monitors their responses for correctness. Otherwise, Block 426 then issues the commands to the motor controllers 24 and monitors their responses for correctness.

Block 428 then captures all of the available aircraft performance and state data, and determines whether it is time to store an update sample to a non-volatile data storage device, typically a flash memory device or other form of permanent data storage. Typically, samples are stored once per second, so the system need not perform the storage operation at every 100 millisecond sample opportunity.

Block 430 then provides any necessary updates to the operator Display, and returns to await the next tick, when the entire sequence is repeated.

Block 436 assimilates all of the vehicle state data, particularly thermodynamic operating conditions in the form of measured temperature states or measured thermal energy states retrieved from various temperature sensors and thermal energy sensors and commanded data from the operator, then calculates the adjustments necessary to improve management of thermal energy within the aircraft 1000. Block 438 executes the transfer of thermal energy between different vehicle systems to efficiently manage waste heat and maintain vehicle operating conditions, and vehicle state data is updated reflecting the resulting adjusted thermodynamic operating conditions. Block 418 in turn examines the intended matrix of commands and assesses whether the intended actions are within the aircraft's 1000 safety margins. If not, block 420 makes adjustments to the commands. Progressing back through the steps, Block 430 then provides any necessary updates to the operator Display, and returns to await the next tick, when the entire sequence is repeated.

When the flight is complete, the operator or his maintenance mechanic can then tap into the recorded data and display it or play it back in a variety of presentation formats. One approach would be for the onboard display apparatus to take the form of computers so programmed as to acquire the recorded data, determine the styles of display appropriate to the various parameters, provide the user a list of views among which to select for reviewing or playing back (simulating) the data, and displaying the data in accordance with those views. However, although the illustrated embodiment does not rely on ground apparatus to provide the display, this could also be accomplished by an off-board or ground display or remote server system. The system does so by utilizing a so-called client-server approach where the on-board apparatus (data server) prepares and provides web pages; the ground display apparatus requires only a standard web-browser client to provide the desired user interface.

In regard to stored or acquired flight data records, in addition to providing a browser-based communications mode, the on-board recording system also enables stored data from one or more flights to be read in other ways. For example, the on-board storage may also be examined and/or downloaded using a web server interface or transmitted to a ground station using tactical datalinks, commercial telecom (i.e. 4G, 5G or similar), Wi-Fi, or Satellite (SatCom) services such as Iridium. Typically, but not necessarily, the on-board storage contains the data in a comma-delimited or other simple file format easily read by employing standard techniques.

The present invention's approach to multirotor vehicle operation and control, coupled with its onboard equipment for measuring, analyzing, displaying and predicting motor and controller items that can be adjusted, and for calculating whether the commanded motion is safe and within the vehicle's capabilities, can significantly enhance the safety and utility of this novel aircraft design, and reduce the probability of a novice operator attempting to operate outside of the vehicle's normal operational limits. It therefore constitutes a significant advance in the art. Similarly, the ability of the vehicle to operate with redundant motor capacity, redundant fuel cell capability, and to be operated by a triple-redundant autopilot and the use of 'Fly By Light' techniques originated by the inventor, significantly enhances the safety and utility of this novel aircraft design, and protects the operator or payload from possibly catastrophic occurrences due to a system failure, motor failure, fuel cell failure, or external EMI or lightning interference. The design is such that any single failure of a motor, controller, or autopilot or tablet is or sidearm controller managed and circumvented, to ensure the safe continued operation and landing of the vehicle.

Figure 6:
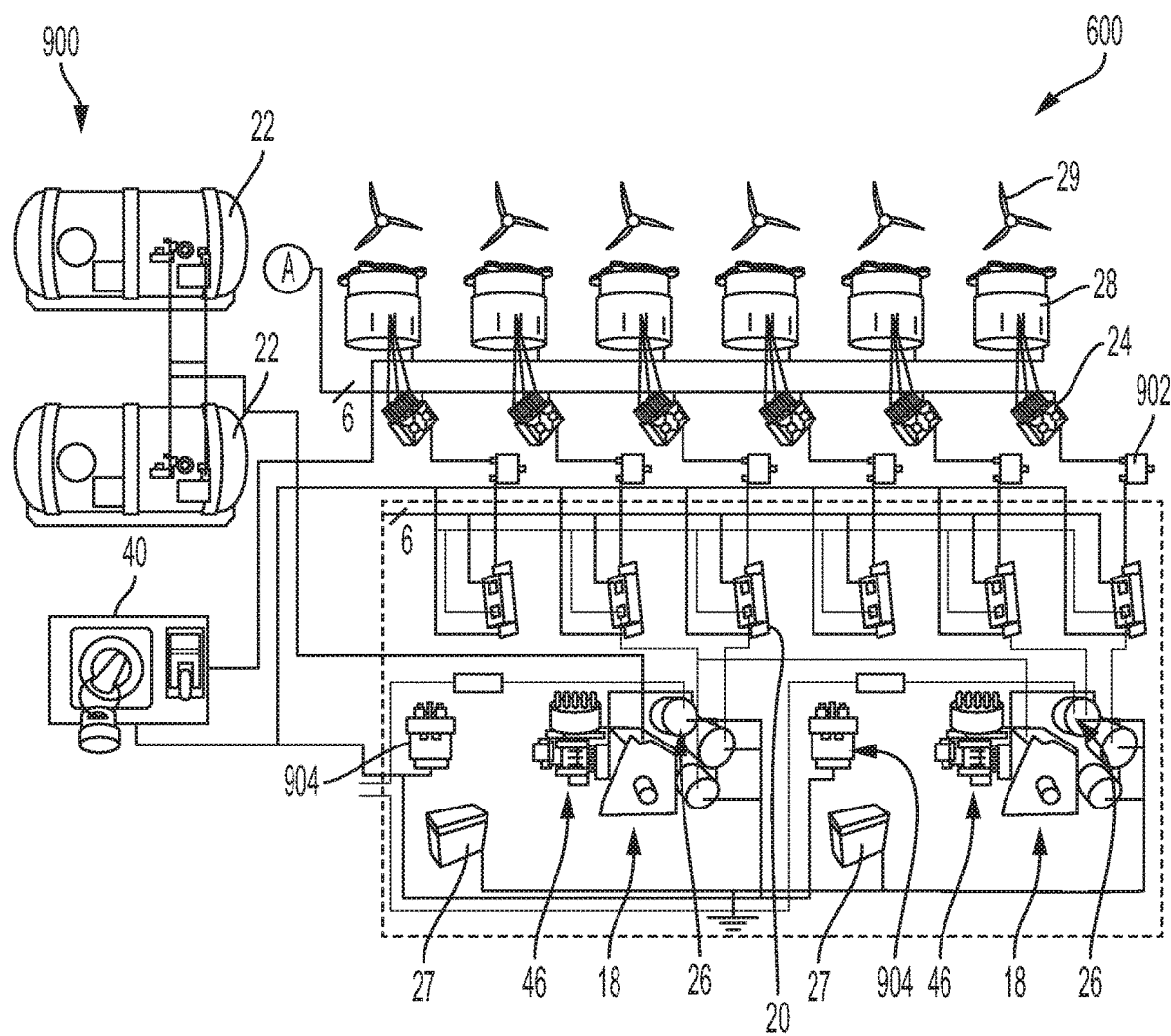
FIG. 6 depicts electrical and systems connectivity of various fuel cell, fuel supply, power generation, and motor control components of a system of the invention.

FIG. 6 depicts electrical and systems connectivity of various motor control components of a system of the invention, as well as an example fuel supply subsystem 900 for the multirotor aircraft 1000. The electrical connectivity includes six motor and propeller assemblies 28 (of a corresponding plurality of motors and propellers 29) and the electrical components needed to supply the motor and propeller combinations with power. A high current contactor 904 is engaged and disengaged under control of the vehicle key switch 40, which applies voltage to the starter/generator 26 to start the fuel cell modules 18. In accordance with an example embodiment of the present invention, after ignition, the fuel cell modules 18 (e.g., one or more hydrogen-powered fuel cells or hydrocarbon-fueled motors) create the electricity to power the six motor and propeller assemblies 28 (of multiple motors and propellers 29). A power distribution monitoring and control subsystem with circuit breaker 902 autonomously monitors and controls distribution of the generated electrical voltage and current from the fuel cell modules 18 to the plurality of motor controllers 24. As would be appreciated by one skilled in the art, the circuit breaker 902 is designed to protect each of the motor controllers 24 from damage resulting from an overload or short circuit. Additionally, the electrical connectivity and fuel supply subsystem 900 includes diodes or FETs 20, providing isolation between each electrical source and an electrical main bus and the fuel cell modules 18. The diodes or FETs 20 are also part of the fail-safe circuitry, in that they diode-OR the current from the two sources together into the electrical main bus. For example, if one of the pair of the fuel cell modules 18 fails, the diodes or FETs 20 allow the current provided by the now sole remaining current source to be equally shared and distributed to all motor controllers 24. Such events would clearly constitute a system failure, and the autopilot computers 32 would react accordingly to land the aircraft safely as soon as possible. Advantageously, the diodes or FETs 20 keep the system from losing half its motors by sharing the remaining current. Additionally, the diodes or FETs 20 are also individually enabled, so in the event that one motor fails or is degraded, the appropriate motor and propeller combinations 28 (of multiple motors and propellers 29—e.g. the counter-rotating pair) would be disabled. For example, the diodes or FETs 20 would disable the enable current for the appropriate motor and propeller combinations 28 (of multiple motors and propellers 29) to switch off that pair and avoid imbalanced thrust. In accordance with an example embodiment of the present invention, the six motor and propeller combinations 28 (of multiple motors and propellers 29) each include a motor and a propeller 29 and are connected to the motor controllers 24, that control the independent movement of the six motors of the six motor and propeller combinations 28. As would be appreciated by one skilled in the art, the electrical connectivity and fuel supply subsystem 900 may be implemented using 6, 8, 10, 12, 14, 16, or more independent motor controllers 24 and the motor and propeller assemblies 28 (of a plurality of motors and propellers 29).

Continuing with FIG. 6, the electrical connectivity and fuel supply subsystem 900 also depicts the redundant battery module system as well as components of the DC charging system. The electrical connectivity and fuel supply subsystem 900 includes the fuel tank 22, the avionics battery 27, the pumps (e.g. water or fuel pump) and cooling system 44, the supercharger 46, and a starter/alternator. The fuel cells 18 are fed by on-board fuel 30 tank 22 and use the fuel to produce a source of power for the motor and propeller combinations 28. As would be appreciated by one skilled in the art, the fuel cell modules 18 can include one or more hydrogen-powered fuel cells can be fueled by hydrogen or other suitable gaseous fuel 30, to drive or turn multiple motors and propellers 29.

Figure 7:
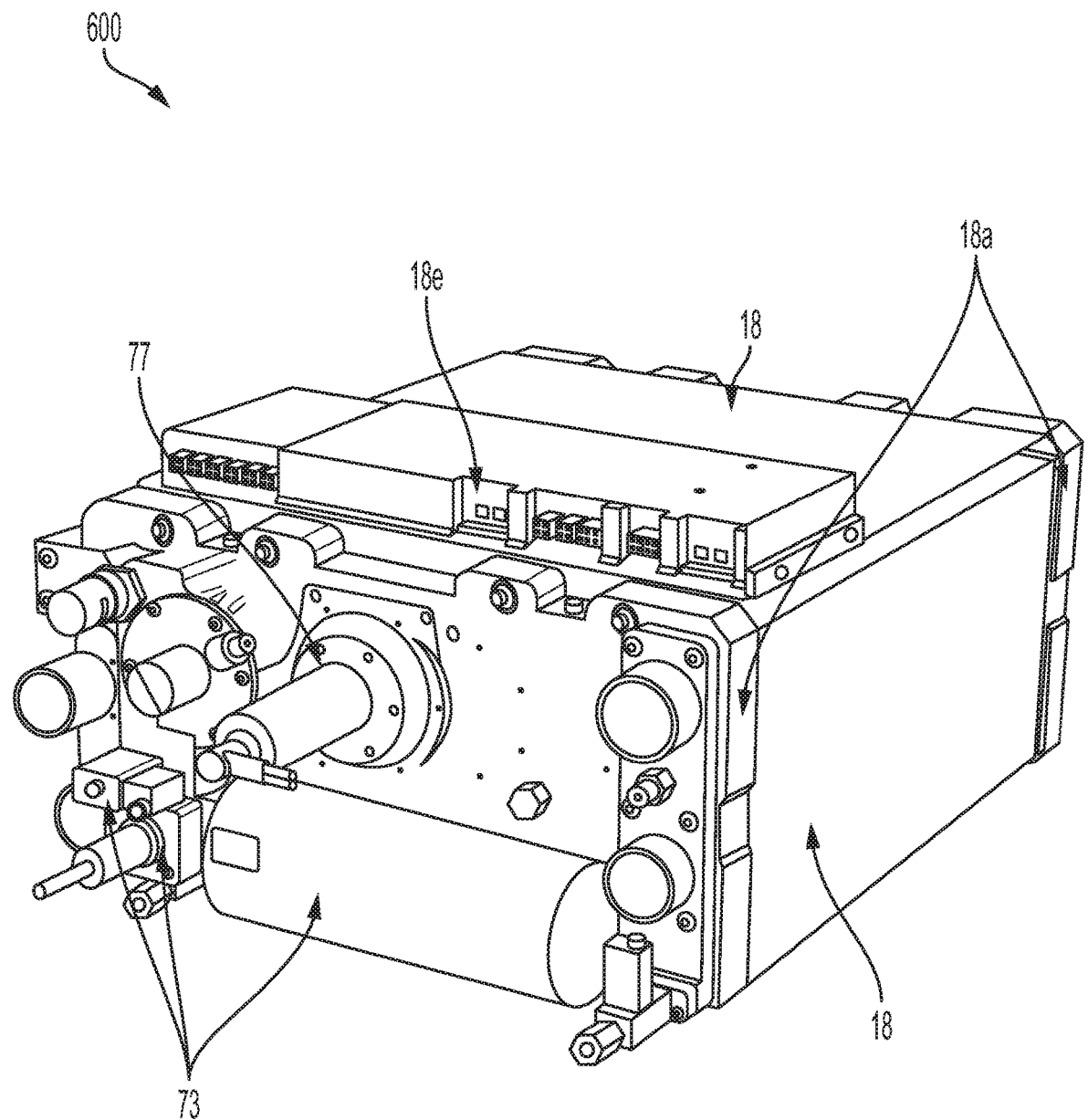
FIG. 7 depicts example configurations of fuel cells within the multirotor aircraft.
Figure 8:
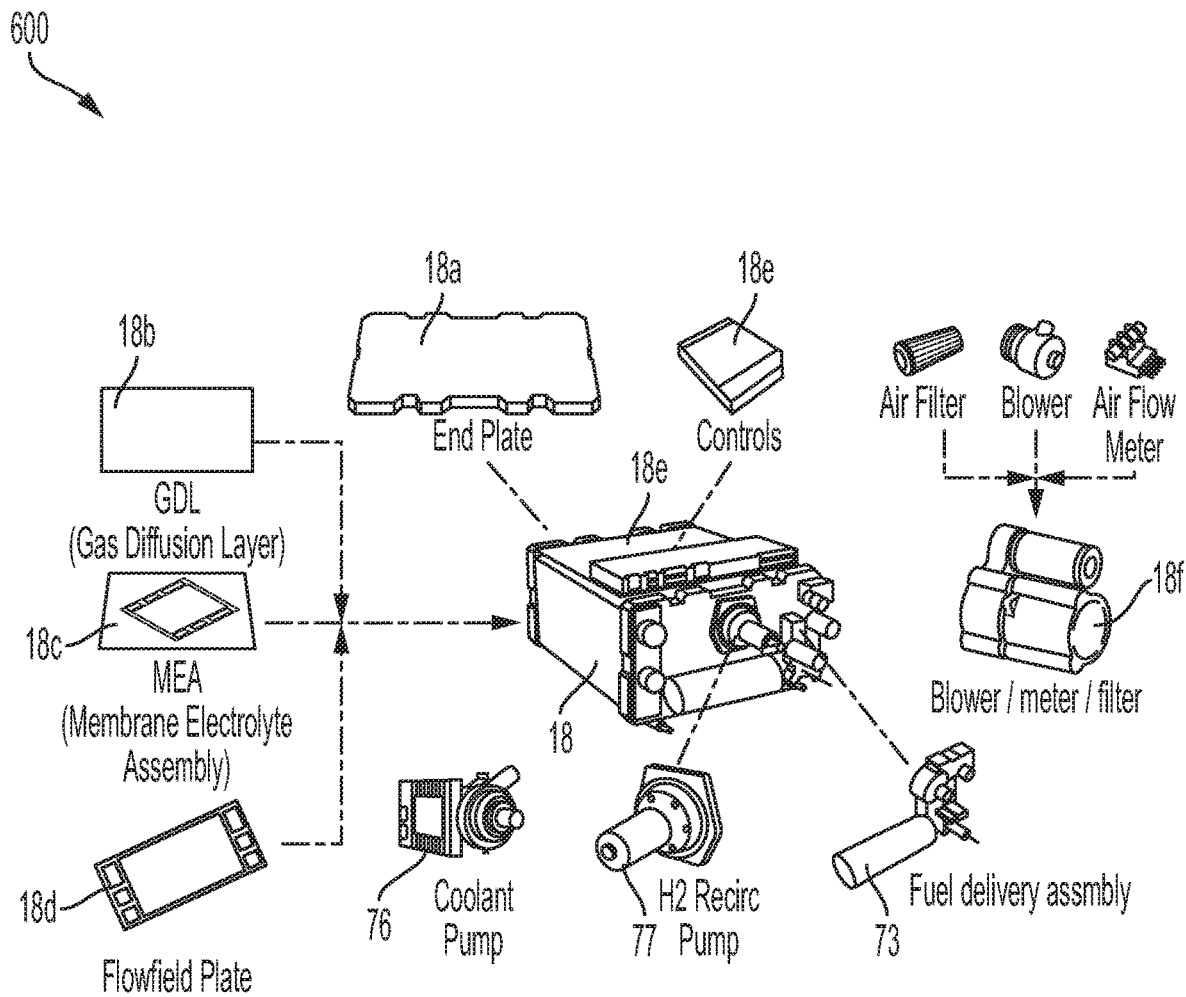
FIG. 8 depicts example subcomponents of fuel cells in at least one fuel cell module within the multirotor aircraft.
Figure 9:
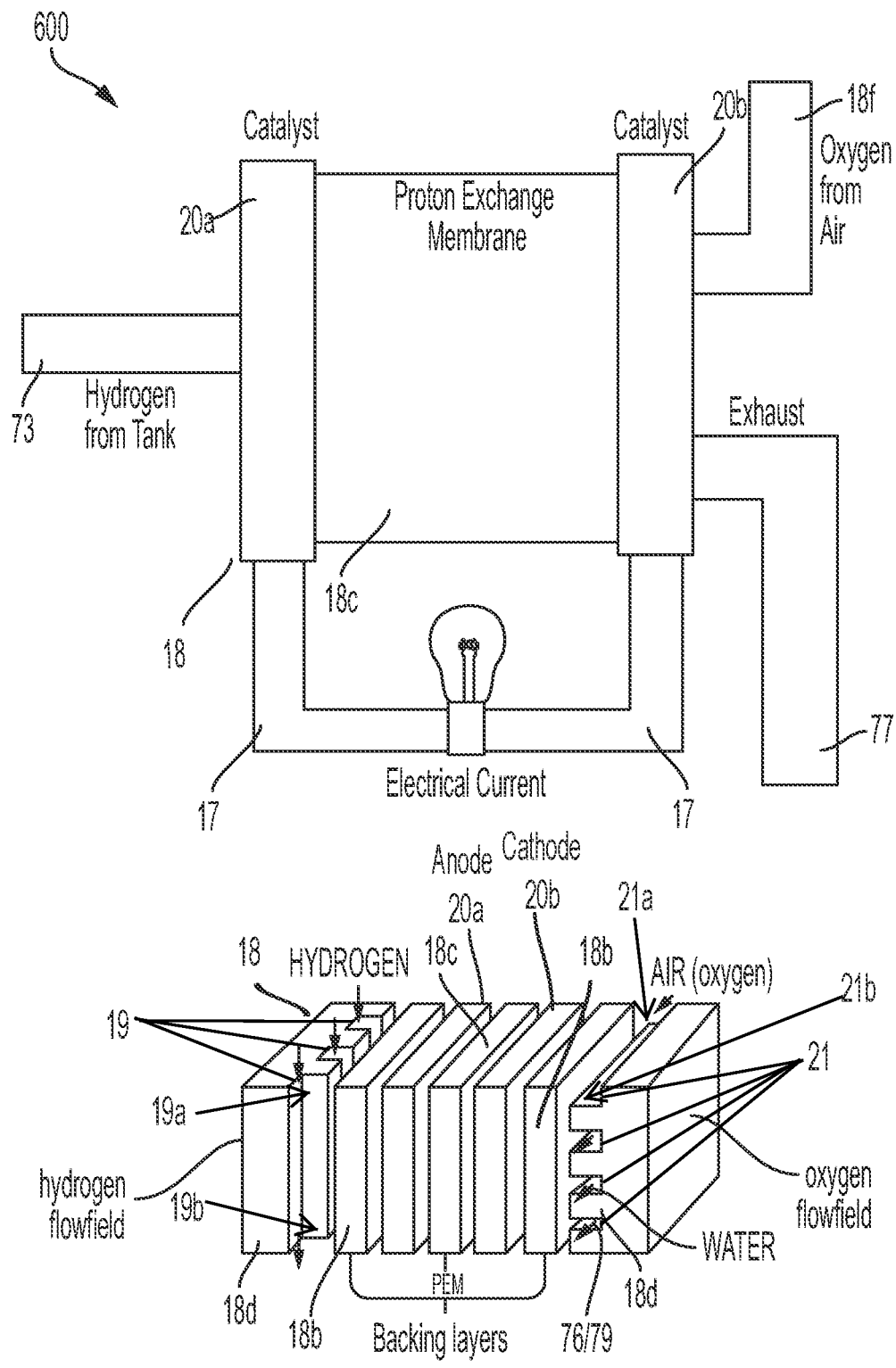
FIG. 9 depicts example internal subcomponents of fuel cells within the multirotor aircraft.

FIGS. 7, 8 and 9 depict example subcomponents of fuel cell modules 18 within the power generation subsystems 600 of the multirotor aircraft 1000. FIG. 7 depicts example configurations of fuel cells within the multirotor aircraft 1000, and FIG. 8 depicts example subcomponents of fuel cells in at least one fuel cell module 18 within the multirotor aircraft 1000. In one embodiment the one or more fuel cell modules 18 comprise an air filter 18*f,* blower 18*f,* airflow meter 18*f,* fuel delivery assembly 73, recirculation pump 77, coolant pump 76, fuel cell controls 18*e,* sensors, end plate 18*a,* at least one gas diffusion layer 18*b,* at least one membrane electrolyte assembly 18*c,* at least one flowfield plate 18*d,* coolant conduits 84, connections, a hydrogen inlet 82, a coolant inlet 78, a coolant outlet 79, one or more air-driven turbochargers 46 supplying air to the one or more fuel cell modules 18, and coolant conduits 84 connected to and in fluid communication with the one or more fuel cell modules 18 and transporting coolant 31. The one or more fuel cell modules 18 may further comprise one or more hydrogen-powered fuel cells, where each hydrogen-powered fuel cell is fueled by gaseous hydrogen ($GH_2$) or liquid hydrogen ($LH_2$) and wherein the one or more fuel cell modules 18 combines hydrogen from the fuel tank 22 with air to supply electrical voltage and current. Fuel cell vessels and piping are designed to the ASME Code and DOT Codes for the pressure and temperatures involved.

In one embodiment, an aviation fuel cell module 18 comprises a multi-function stack end plate that is configured for reduced part count, comprising an integrated manifold, an integrated wiring harnesses, integrated electronics and controls, wherein the stack end plate eliminates certain piping and fittings and allows easier part inspection and replacement, yielding improved reliability, significant mass, volume and noise reduction, and reduction in double wall protection. The integrated electronics and controls may operate as temperature sensors or thermal energy sensors for the fuel cell modules 18, and may also be integrated into the heat transfer infrastructure architecture of the fuel cell modules 18 such that the excess heat generated by operation may also be transferred away from the electronics and controls to promote more efficient operation and reduce overheating. The aviation fuel cell module 18 may be further configured of aerospace lightweight metallic fuel cell components, with a stack optimized for: reduced weight; increased volumetric power density; extreme vibration tolerance; improved performance and fuel efficiency; increased durability; and combinations thereof. In an example embodiment, a fuel cell module 18 may produce 120 kW of power, in a configuration with dimensions of 72×12×24 inches (L×H×W) and a mass of less than 120 kg, with a design life greater than 10,000 hours. The operation orientation of each module accommodates roll, pitch, and yaw, as well as reduction in double wall protection and shock & vibration system tolerance.

FIG. 9 further depicts example subcomponents inside the fuel cell modules 18 covered by an end plate 18*a,* demonstrating the configuration of hydrogen flowfield plates and oxygen flowfield plates 18*d,* anode and cathode volumes on each side of the proton exchange membrane 18*c* of the membrane electrolyte assembly with backing layers and catalysts 20*a,* 20*b,* as well as resulting hydrogen, oxygen, and coolant flow vectors 19, 21. Gaseous hydrogen fuel may enter via a delivery assembly 73, oxygen ($O_2$), in the form of compressed air (supplied by turbochargers or superchargers 46, blowers or local supply of compressed air or oxygen) may enter as output from an air filter/blower/meter 18*f,* and exhaust fluids can be removed via recirculation pump 77. In one embodiment, catalyst layers 20*a,* 20*b* may be adhered at the electrode/electrolyte interface. Liquid water may be formed at the cathode in the catalyst layer 20*b* at the electrode/electrolyte interface, which hinders fuel cell performance when not removed, where it hinders $O_2$ from getting to electrode/electrolyte interface, causing limitations in max current density. A Gas diffusion layer GDL 18*b* may be implemented to permit $H_2O$ to be removed without hindering gas transport. The GDL 18*b* may be porous to permit flow to the electrode/electrolyte interface & sufficient conductivity to carry the current generated and allow water vapor diffusion through the GDL 18*b* and convection out the gas outflow channels, thereby circulating electrolyte and vaporizing water, but not be liquid $H_2O$ permeable. A Gas diffusion layer GDL 18*b* may be electrically conductive to pass electrons between the conductors that make up the flow channels. A GDL 18*b* may comprise both a backing layer and mesoporous layer. Compressed $O_2$/air also flows through gas flow channels, diffuses through a GDL 18*b,* to a catalyst layer 20*b* where it then reacts with ions or protons coming through an electrolyte layer or assembly. Common electrolyte types include alkali, molten carbonate, phosphoric acid (liquid electrolytes), as well as proton exchange membrane (PEM 18*c*) and solid oxide (solids). Liquid electrolytes are held between the two electrodes by various means. A PEM 18*c* is held in place using membrane electrolyte assembly (MEA) 18*c.* A PEM 18*c* (PEMFC) most often uses a water-based, acidic polymer membrane as its electrolyte, with platinum-based electrodes.

In operation, $LH_2$ converted to $GH_2$ by extraction using one or more heat exchangers 57 or by change in pressure initiated by the system 100, and a compressed air/$O_2$ flow from turbochargers or superchargers 46 (or conventional fuel pumps and regulators or local storage of air or oxygen) by way of an air filter/blower/meter 18f, are both supplied to one or more fuel cell modules 18 that comprise one or more fuel cell stacks containing a plurality of hydrogen fuel cells. In each fuel cell of the plurality of hydrogen fuel cells $GH_2$ fuel from a delivery assembly 73 enters a first end 19a of a hydrogen flowfield plate 18d inflow at an inlet and is fed through flow channels in the hydrogen flowfield plate 18d that comprise a channel array 19 designed to distribute and channel hydrogen to an anode layer 20a, where excess $GH_2$ may be directed to bypass the rest of the fuel cell and exit a second end 19b of that flowfield plate 18d via $GH_2$ outflow at an outlet that may be further connected to and in fluid communication with fluid conduits, valves and recirculation pumps 77 to recycle the hydrogen for future fuel cell reactions (or may be vented as exhaust using an exhaust port 66). Similarly, in each fuel cell $O_2$ contained within or extracted from compressed air from a turbocharger or supercharger 46 enters a first end 21a of oxygen flowfield plate 18d inflow using an inlet and is fed through flow channels traversing the flowfield plate 18d in a direction at a perpendicular angle to the flow of $GH_2$ in the respective opposite flowfield plate 18d of the pair of plates in each fuel cell, through a channel array 21 designed to distribute and channel oxygen to a cathode layer 20b, where excess $O_2$ may be directed to bypass the rest of the fuel cell and exit a second end 21b of that flowfield plate 18d via $O_2$ and/or $H_2O$ outflow at an outlet that may be further connected to and in fluid communication with fluid conduits, valves and recirculation pumps 77 to recycle the oxygen for future fuel cell reactions (or may be vented as exhaust using an exhaust port 66). Each of the gases $GH_2$ and $O_2$ are diffused through two distinct GDLs 18b disposed on both sides of the fuel cell opposite each other (such that net flow is toward each other and the center of the fuel cell), separated by two layers of catalyst 20a, 20b further separated by plastic membrane such as a PEM 18c. An electro-catalyst, which may be a component of the electrodes at the interface between a backing layer and the plastic membrane catalyst, splits $GH_2$ molecules into hydrogen ions or protons and electrons using a reaction that may include an oxidation reaction. In one embodiment, at the anode of an anode layer 20a, a platinum catalyst causes the $H_2$ dihydrogen is split into H+ positively charged hydrogen ions (protons) and e− negatively charged electrons. The PEM 18c allows only the positively charged ions to pass through it to the cathode, such that protons attracted to the cathode pass through PEM 18c while electrons are restricted where the PEM electrolyte assembly (MEA) acts as a barrier for them. The negatively charged electrons instead travel along an external electrical circuit to the cathode, following a voltage drop, such that electrical current flows from anode side catalyst layer 20a to cathode side catalyst layer 20b creating electricity to power the aircraft 1000 components that is directed to storage or directly to a plurality of motor controllers 24 to operate a plurality of motor and propeller assemblies 28. At contact with the platinum electrode as the electrons pass through the GDL after being distributed by flowfield plate 18d, one or more current collectors 17 may be employed to facilitate flow of electrons into the external electrical circuit, which may be comprised of metallic or other suitable conductive media and directed to circumvent the MEA and arrive at the cathode layer. After traveling through the external electrical circuit electrons are deposited at the cathode layer 20b where electrons and hydrogen ions or protons with $O_2$ in the presence of a second catalyst layer to generate water and heat. Electrons combine with $O_2$ to produce $O_2$ ions and then hydrogen ions or protons arriving through the PEM 18c combine with the ions of $O_2$ to form $H_2O$. This $H_2O$ is then transported back across the cathode side catalyst layer 20b through a GDL into $O_2$ flow channels where it can be removed or otherwise convected away with air flow to exit a second end 21b of that flowfield plate 18d via $O_2$ and/or $H_2O$ outflow at an outlet that may be further connected to and in fluid communication with fluid conduits, valves, or pumps and may be vented as exhaust using an exhaust port 66 that may be used for other exhaust gases or fluids as well. Thus, the products of the fuel cells are only heat, water, and the electricity generated by the reactions. In other embodiments, additional layers may alternatively be implemented such as current collector plates or GDL compression plates.

Figure 10:
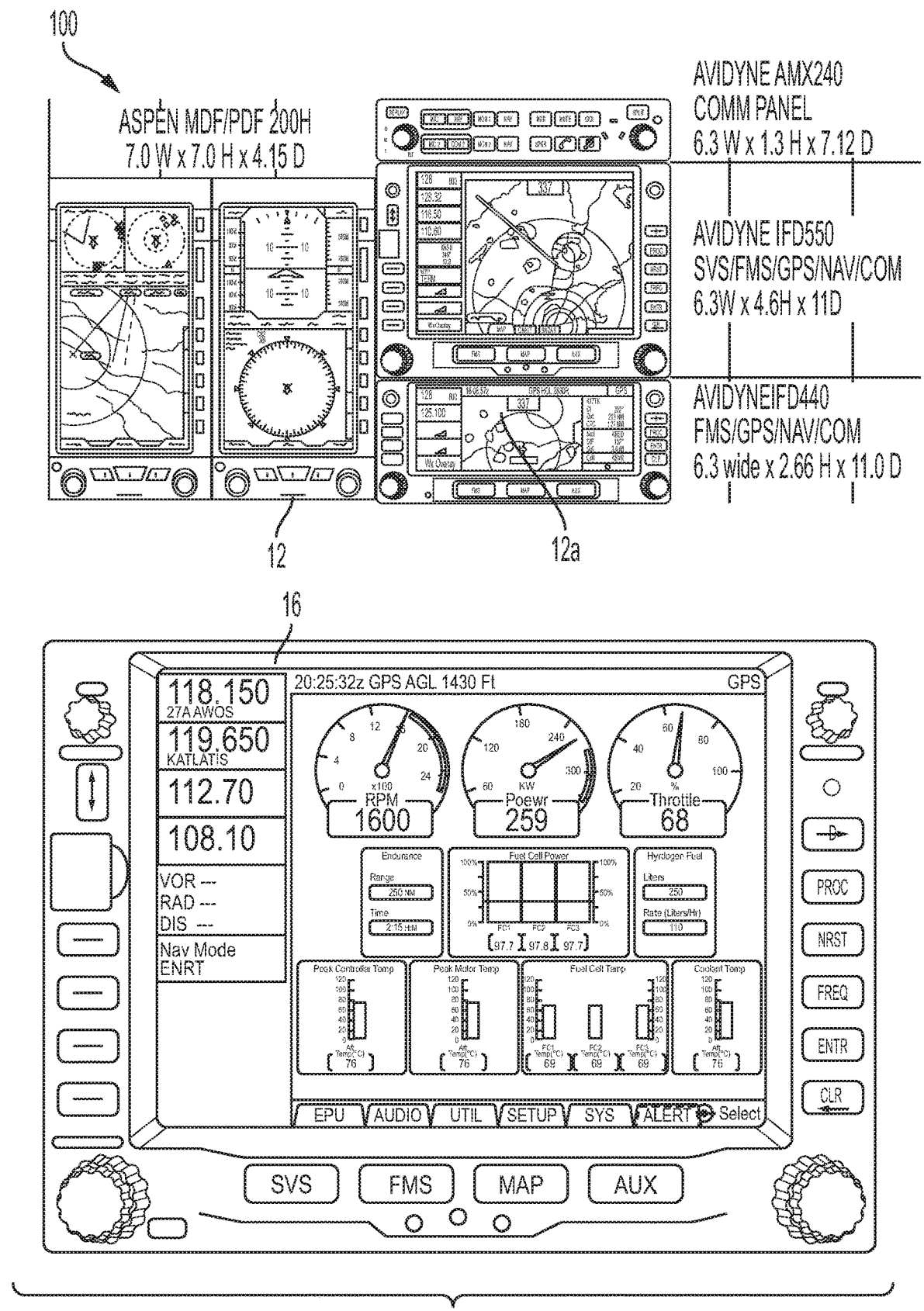
FIG. 10 depicts an example of control panels, gauges and sensor output for the multirotor aircraft.

FIG. 10 depicts one kind of display presentation 502 that can be provided to show fuel cell operating conditions including fuel remaining, fuel cell temperature and motor performance related to each of the respective fuel cell modules 18 (bottom) as well as weather data (in the right half) and highway in the sky data (in the left half). Also shown are the vehicle's GPS airspeed (upper left vertical bar) and GPS altitude (upper right vertical bar). Magnetic heading, bank and pitch are also displayed, to present the operator with a comprehensive, 3-dimensional representation of where the aircraft 1000 is, how it is being operated, and where it is headed. Other screens can be selected from a touch-sensitive row of buttons along the lower portion of the screen. Display presentation 504 is similar, but has added 'wickets' to guide the pilot along the flight path. The lower half of the screen illustrates nearby landing sites that can readily be reached by the vehicle with the amount of power on board. In an example embodiment directed to near implementation, FIG. 10 shows the use of available TSO'd (i.e. FAA approved) avionics units, adapted to this vehicle and mission. Subject to approval by FAA or international authorities, a simpler form of avionics (known as Simplified Vehicle Operations or SVO) may be introduced, where said display is notionally a software package installed and operating on a 'tablet' or simplified computer and display, similar to an Apple iPad®. The use of two identical units running identical display software allows the user to configure several different display presentations, and yet still have full capability in the event that one display should fail during a flight. This enhances the vehicle's overall safety and reliability.

Figure 11:
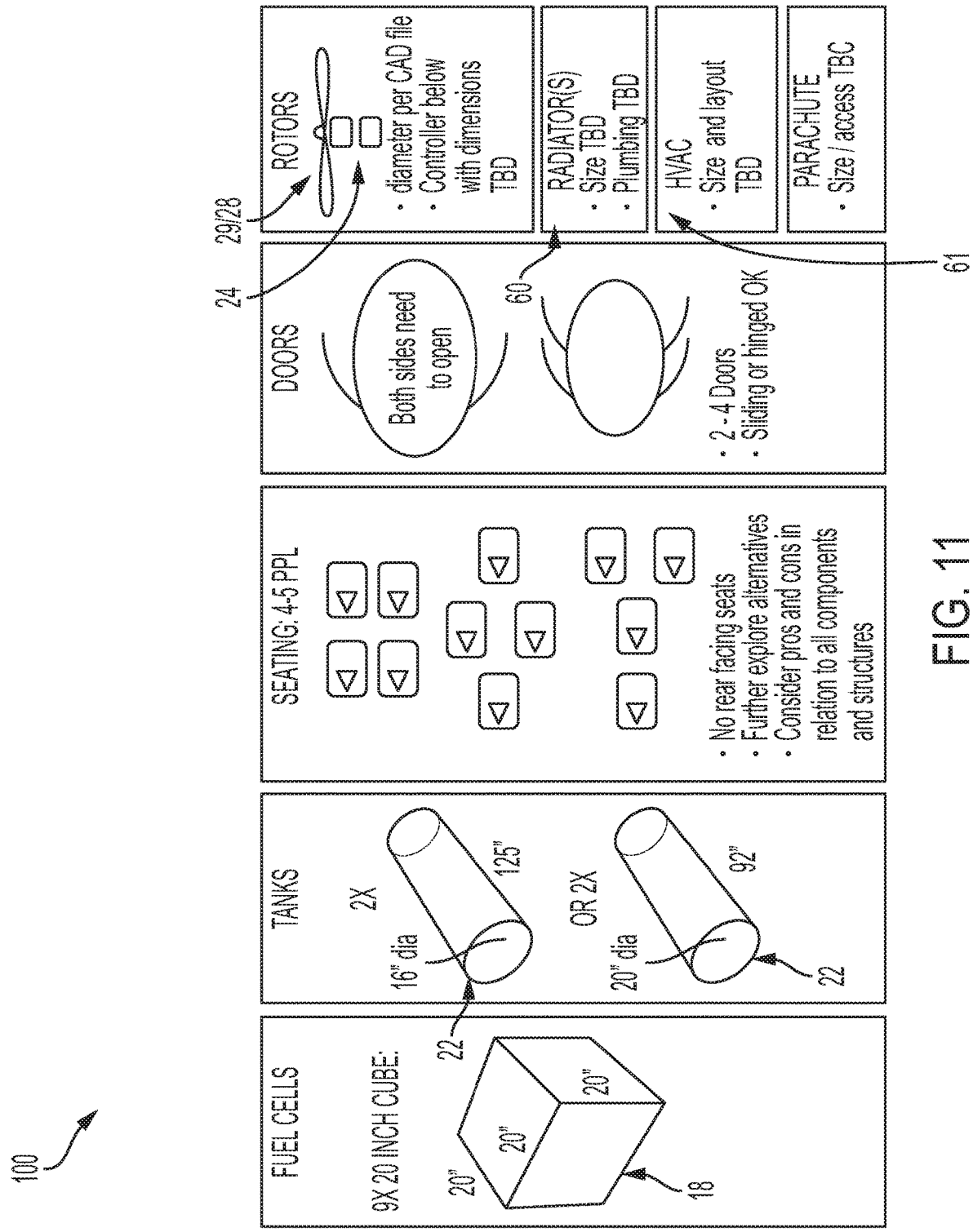
FIG. 11 depicts example space requirements for components of the fuel and power generation subsystems of the multirotor aircraft.

FIG. 11 depicts example space requirements for components of the fuel supply and power generation subsystems 600 of the multirotor aircraft 1000.

Figure 12:
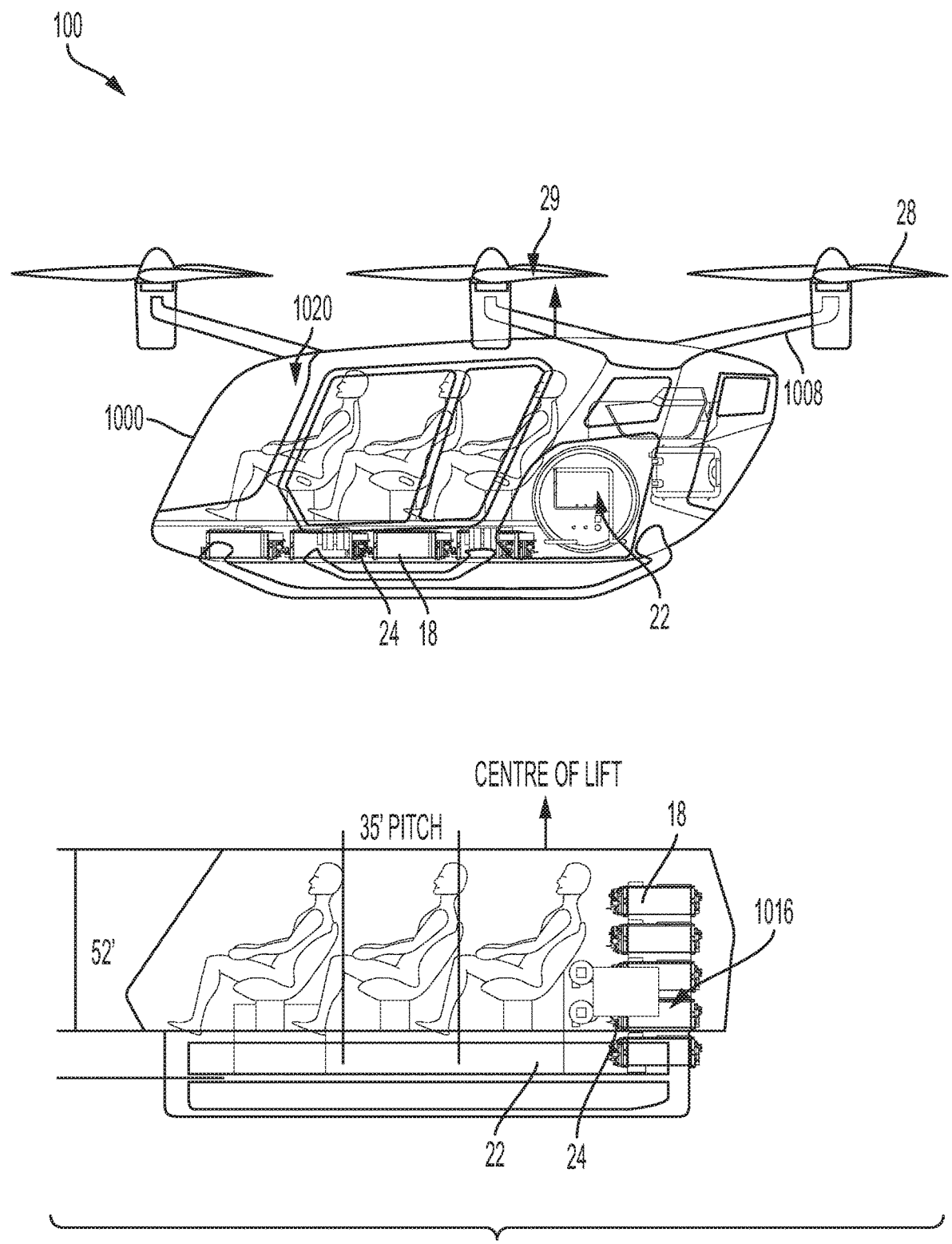
FIG. 12 depicts profile diagrams of the multirotor aircraft demonstrating example positions of fuel and power generation subsystems within the multirotor aircraft.

FIG. 12 depicts profile diagrams of the example multirotor aircraft 1000 demonstrating example positions of fuel supply and power generation subsystem 600s within the multirotor aircraft 1000.

Figure 13:
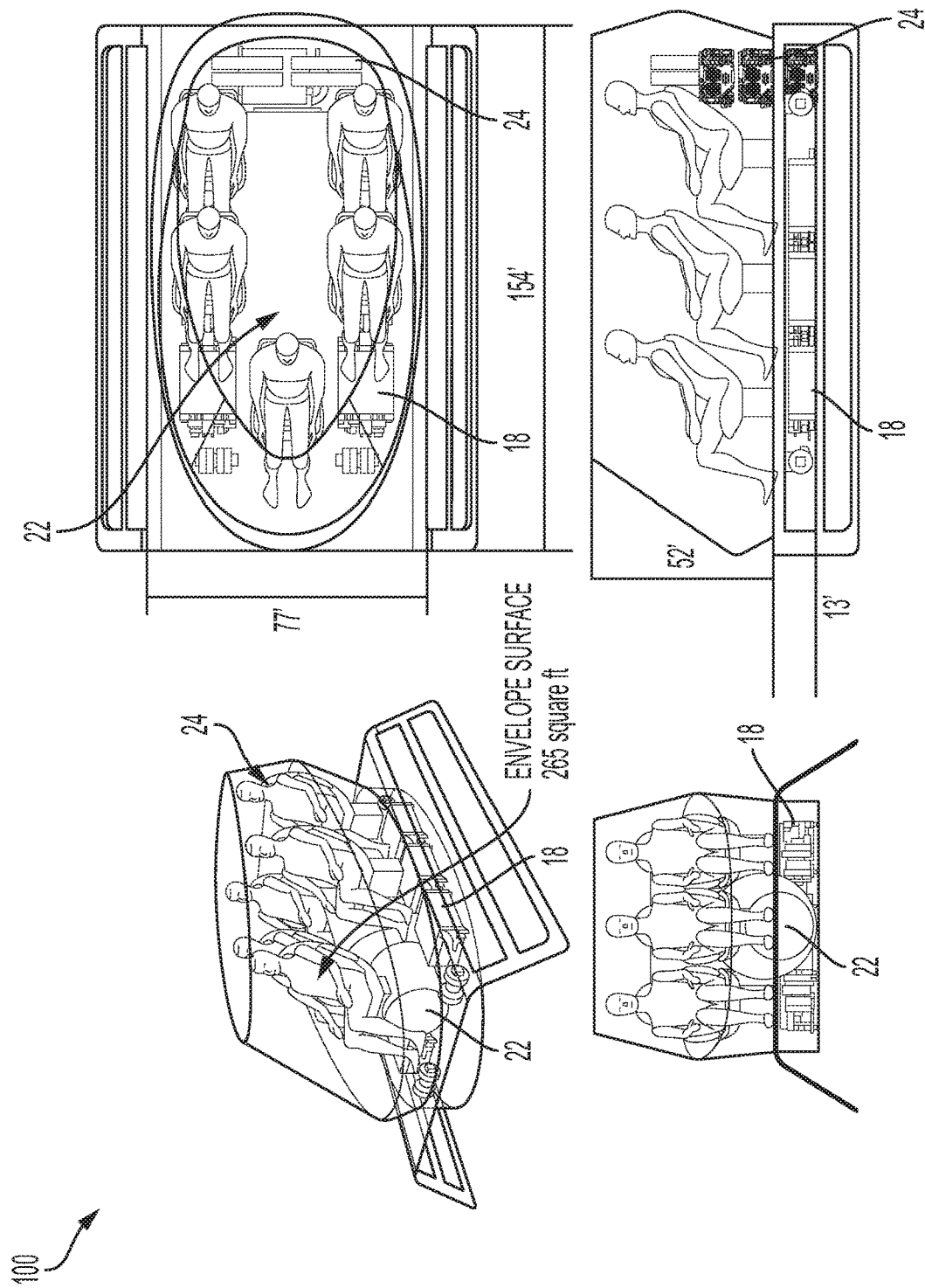
FIG. 13 depicts diagrams demonstrating alternative example positions of fuel supply and power generation subsystems within the multirotor aircraft.

FIG. 13 depicts diagrams demonstrating alternative example positions of fuel supply subsystem 900 and power generation subsystem 600s within the multirotor aircraft 1000.

Figure 14:
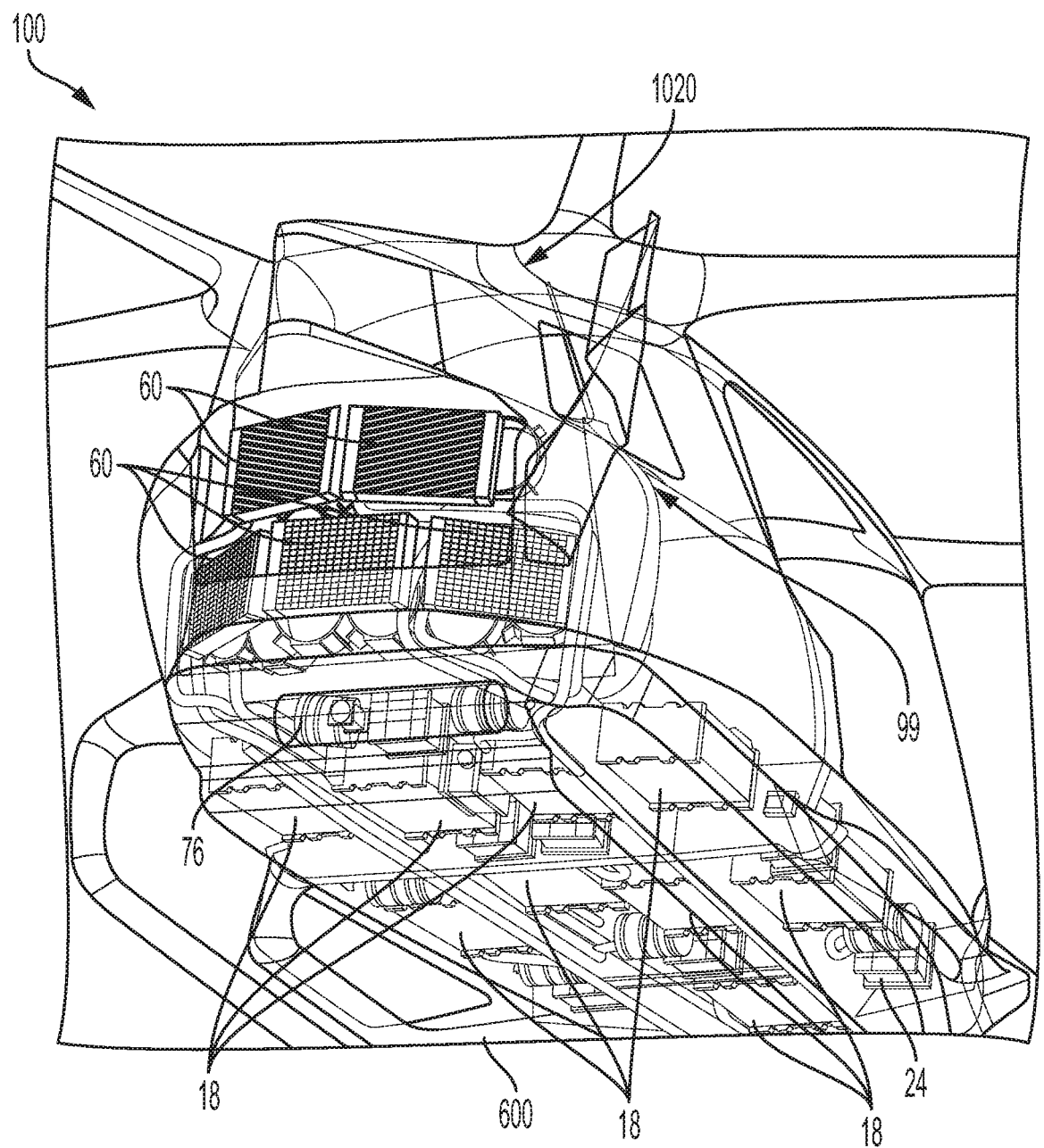
FIG. 14 depicts example diagrams of the configuration of power generation subsystem heat transfer and exchange components within the multirotor aircraft.

FIG. 14 depicts an example diagram of the configuration of power generation subsystem 600 heat transfer and heat exchange components within the multirotor aircraft 1000. In some embodiments, fuel tank 22, the avionics battery 27, various pumps and cooling system 44, supercharger 46, and radiators 60 may also be included, monitored, and controlled. Any fuel cell modules 18 are fed by on-board fuel tank 22 and use the fuel 30 to produce a source of power for the multirotor aircraft 1000. These components are configured and integrated to work together with 4D Flight Management. Power generation subsystem 600 may have various numbers of fuel cells based on the particular use configuration, for example a set of hydrogen fuel cells. Operation and control of the cells is enabled via CAN protocol or a similar databus or network or wireless or other communications means. Flight control algorithm will modulate and monitor the power delivered by fuel cells via CAN.

Figure 15:
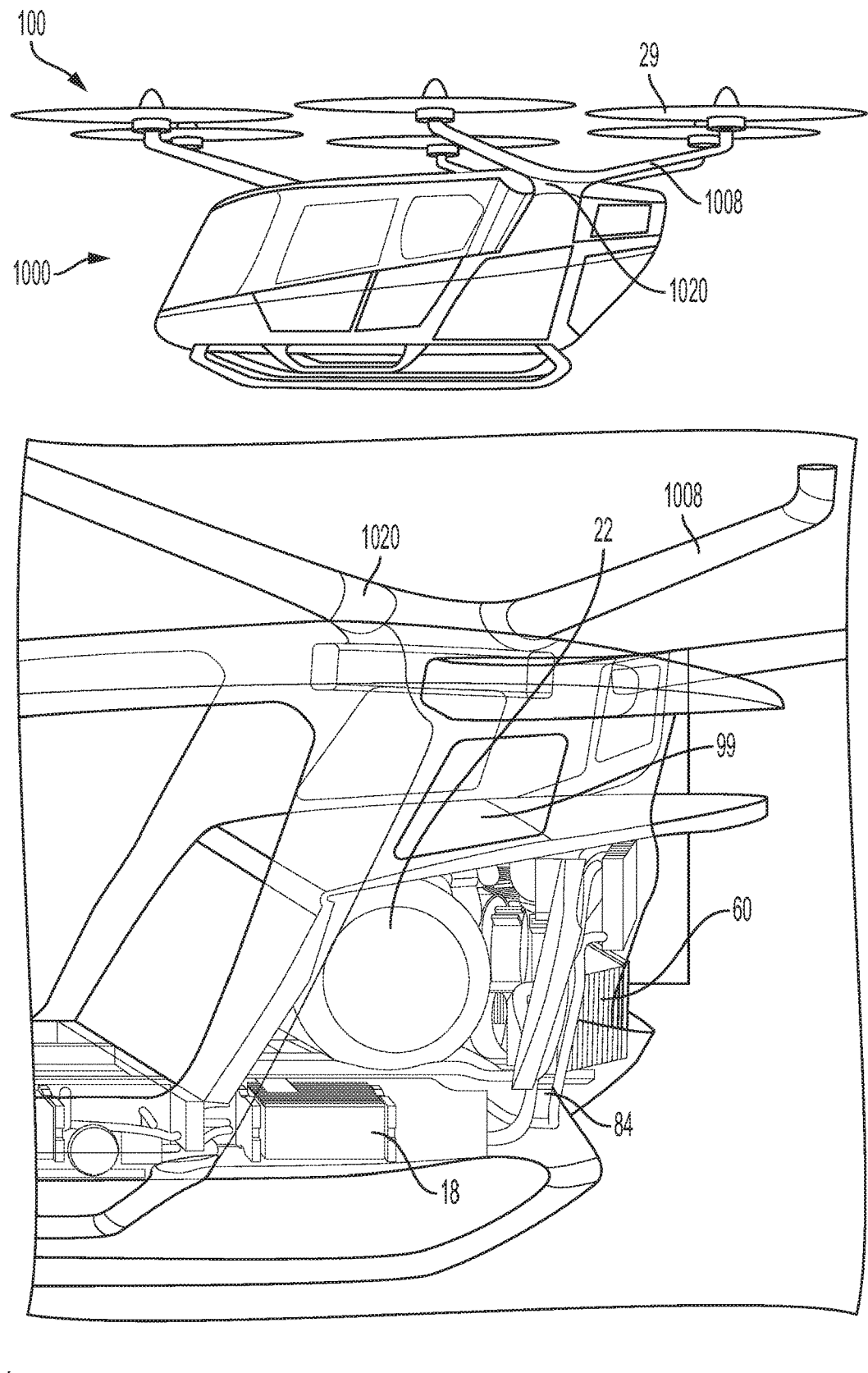
FIG. 15 depicts an example profile diagram of the fuel supply system components within the multirotor aircraft.

FIG. 15 depicts an example profile diagram of the fuel supply subsystem 900 components within the multirotor aircraft 1000 in relation to the power generation subsystem 600 components positioned on opposite the opposite side of the fire wall 99 from the internal temperature zone 52 comprising the cabin environment housing pilots and passengers.

Figure 16:
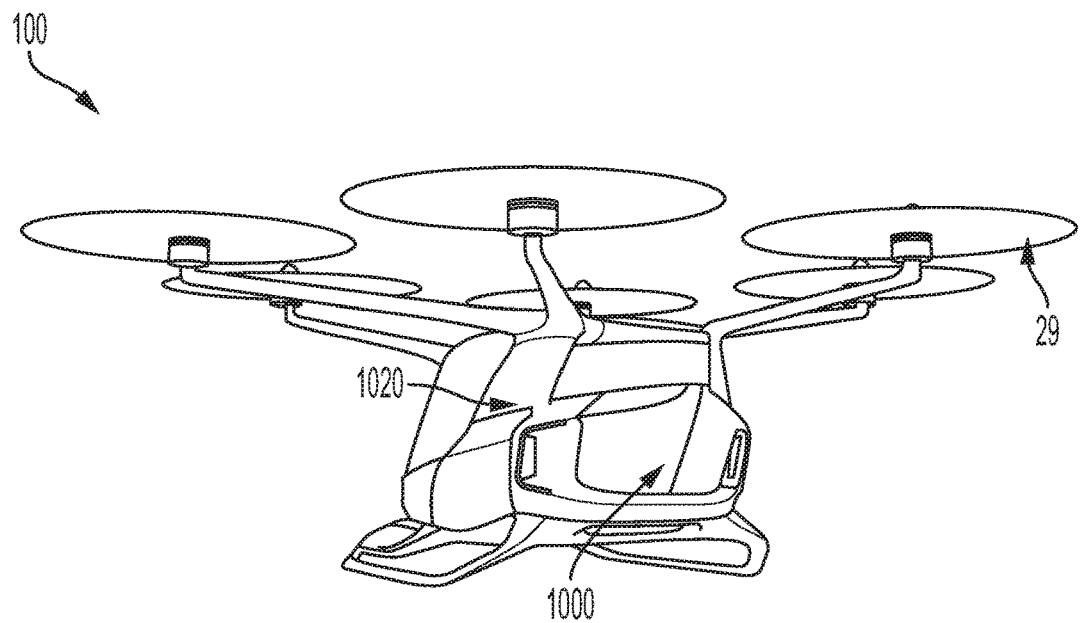
FIG. 16 depicts two views demonstrating the position and compartments housing the fuel supply and power generation subsystems; extending from the frame of the multirotor aircraft and spaces between the rotor diameters.
Figure 16:
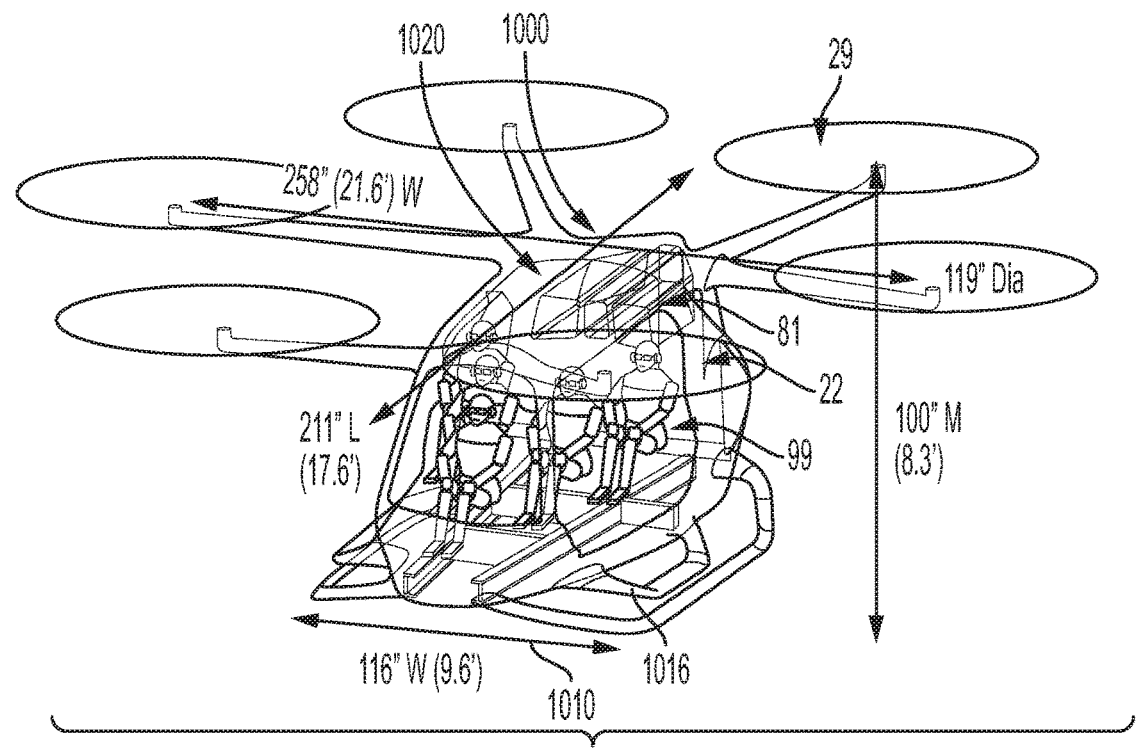

FIG. 16 depicts two views demonstrating the position of the array of propellers 29 extending from the frame of the multirotor aircraft airframe fuselage 1020 and elongates support arms 1008 with an approximately annular configuration.

Figure 17:
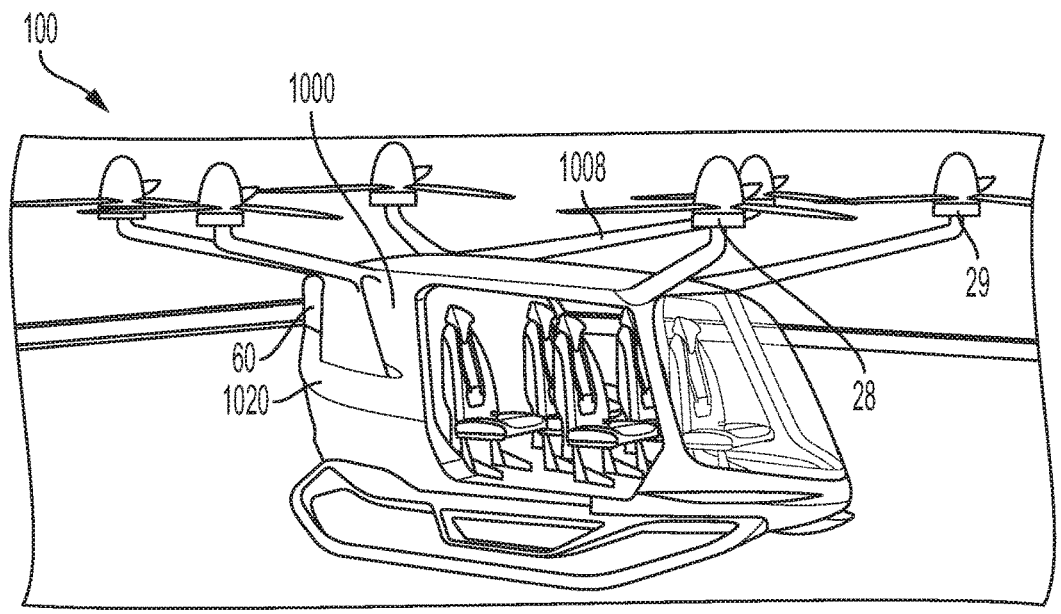
FIG. 17 depicts side and top views of a multirotor aircraft with six rotors cantilevered from the frame of the multirotor aircraft in accordance with an embodiment of the present invention, indicating the location and compartments housing the fuel supply and power generation subsystems.
Figure 17:
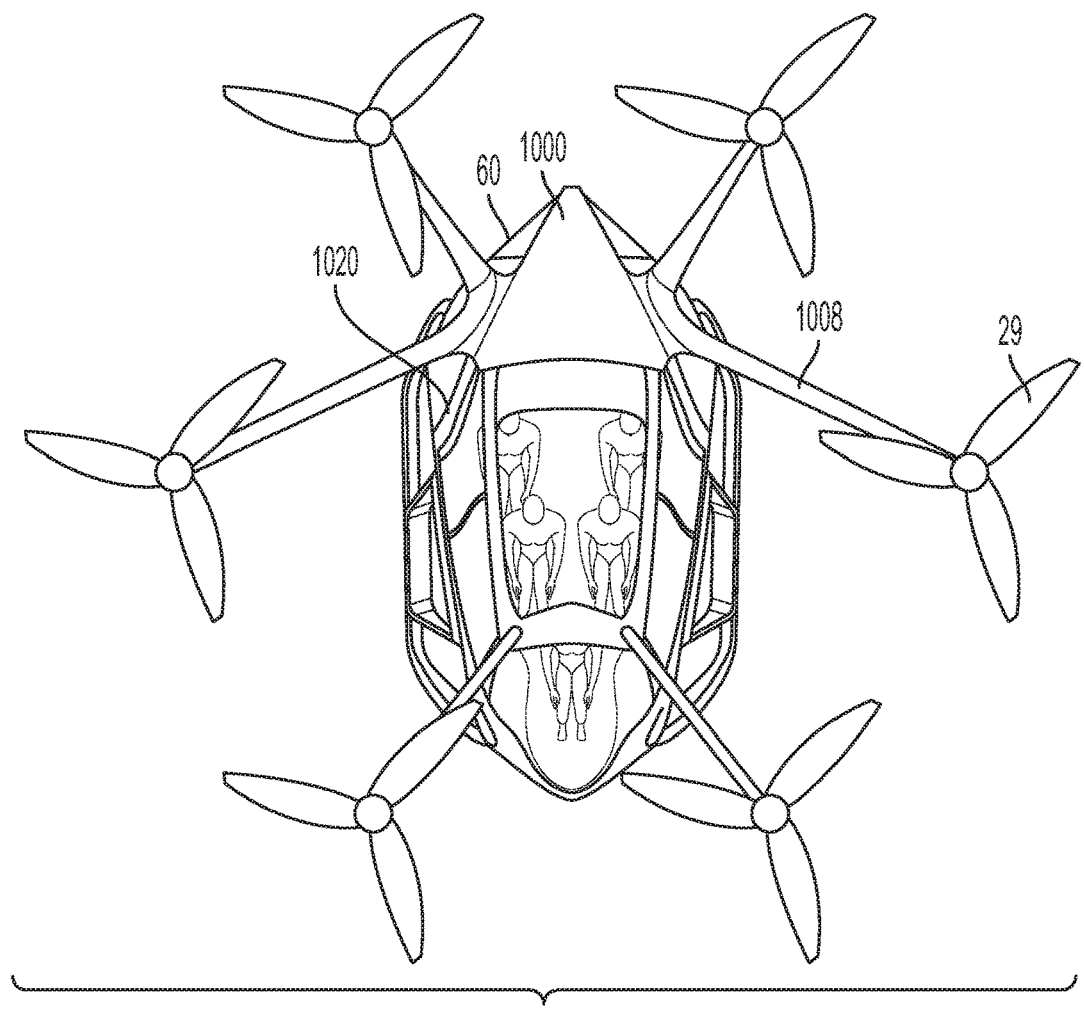

FIG. 17 depicts an example aircraft 1000 in accordance with an embodiment of the present invention including elongate support arms 1008 and an aircraft body 1020, and FIG. 17 shows another view of the aircraft 1000 shown in FIG. 16. In accordance with an example embodiment of the present invention, the multiple electric motors are supported by the elongate support arms 1008, and when the aircraft 1000 is elevated, the elongate support arms 1008 support (in suspension) the aircraft 1000 itself. FIG. 17 depicts side and top views of a multirotor aircraft 1000 with six rotors (propellers 29) cantilevered from the frame of the multirotor aircraft 1020 in accordance with an embodiment of the present invention, indicating the location of the airframe fuselage 1020, attached to which are the elongate support arms 1008 that support the plurality of motor and propeller assemblies 28 wherein the propellers 29 are clearly shown.

Figure 18:
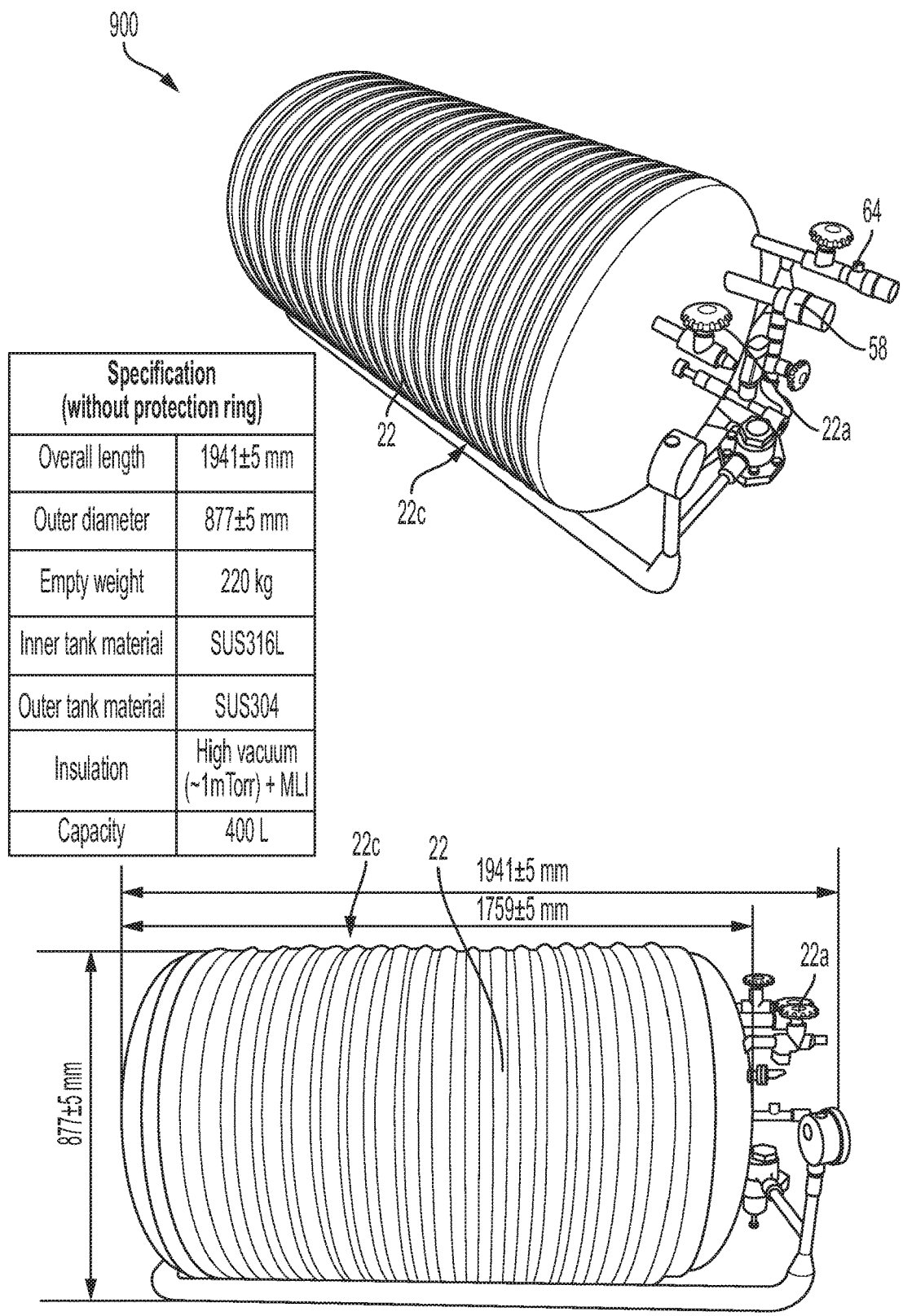
FIG. 18 depicts example subcomponents of fuel tanks and fuel supply subsystem within the multirotor aircraft.

FIG. 18 depicts example subcomponents of fuel tanks 22 and fuel supply subsystem 900 within the multirotor aircraft 1000, wherein the fuel tank 22 further comprises a carbon fiber epoxy shell or a stainless steel or other robust shell, a plastic or metallic liner, a metal interface, crash/drop protection, and is configured to use a working fluid of hydrogen as the fuel 30 with fuel lines 85, vessels and piping 85 designed to the ASME Code and DOT Codes for the pressure and temperatures involved. Generally, in a thermodynamic system, the working fluid is a liquid or gas that absorbs or transmits energy or actuates a machine or heat engine. In this invention, working fluids may include: fuel in liquid or gaseous state, coolant 31, pressurized or other air that may or may not be heated. The fuel tank 22 is designed to include venting 64 from the component/mechanical compartment to the external temperature zone 54 and is installed with a design that provides for 50 ft drop without rupture of the fuel tank 22. The head side of the fuel tank 22 comprises multiple valves 88 and instruments for operation of the fuel tank 22. In one embodiment the head side of the fuel tank 22 comprises mating part A including an $LH_2$ refueling port (Female part of a fuel transfer coupling 58); mating part B including a ⅜"B(VENT 64), ¼"(PT), ¼"(PG&PC), feed through, vacuum port, vacuum gauge, spare port, ¼" sensor (Liquid detection); and mating part C including at least one 1 inch union 86 (to interface with heat exchangers 57) as well as ½" safety valves 88. Liquid hydrogen storage subsystems and fuel tanks 22 may employ at least one a fuel transfer coupling 58 for charging; 1 bar vent 64 for charging; self-pressure build up unit; at least two safety relief valves 88; $GH_2$ heating components; vessels and piping that routed to a heat exchanger 57 or are otherwise in contact with fluid conduits for fuel cell coolant 31 water. The fuel tank 22 may also include a level sensor (High Capacitance) and meet regulatory requirements. Different example embodiments of the fuel tank 22 may include a carbon fiber epoxy shell or a stainless-steel shell material used to encapsulate the components of the fuel tank 22 to provide drop and crash protection. In another embodiment an $LH_2$ fuel tank 22 may comprise one or more inner tanks, an insulating wrap, a vacuum between inner and outer tank, and a much lower operating pressure, typically approximately 10 bar, or 140 psi (where $GH_2$ typically runs at a much higher pressure). The fuel tanks 22 may also be equipped with at least one protection ring to provide further drop and crash protection for connectors, regulators and similar components. In an example embodiment, the fuel supply subsystem 900 further comprises an $LH_2$ charging line used to fill the fuel tank 22 with liquid hydrogen ($LH_2$) to the stated amount and safely store it, where pressure sensors, pressure safety valves, pressure gauges, pressure regulators, and one or more pressure build units, monitor, regulate, and adjust the fuel tank 22 environment to maintain the fuel at the proper temperature and state to efficiently fuel the power generation subsystem 600 (with example fuel cell modules 18) that is supplied using an $LH_2$ discharge line, wherein the fuel is adjusted by additional means comprising the one or more heat exchangers 57. To maintain continuity of delivery of fuel during displacement, as well as managing fuel safety, volatile gases may be passed through a vaporizer 72 and one or more $GH_2$ vent 64 connections to be vented to the exterior environment. Additional components include at least one vacuum sensor and port, and a level sensor feed through, the fuel supply subsystem 900 further comprises various components including, but not limited to, pressure transmitters, level sensors, coolant circulation pumps, and pressure regulators solenoid valves, used to monitor, direct, reroute, and adjust the flow of coolant through the coolant conduits in the proper manner to supply the power generation subsystem 600 (with example fuel cell modules 18). In one embodiment, the fuel may be served by separate coolant (e.g. in fluid communication with heat exchangers 57) from the power generation subsystem 600 (with example fuel cell modules 18), and in another embodiment, the fuel supply subsystem 900 shares a cooling loop or circuit comprising coolant conduits transporting coolant with the power generation subsystem 600 (with example fuel cell modules 18), and in an additional embodiment, the fuel supply subsystem 900 may include fuel lines that serve as coolant conduits for various components including the power generation subsystem 600 (with example fuel cell modules 18), either via thermal conductive contact or indirect contact by e.g. the one or more heat exchangers 57.

Figure 19:
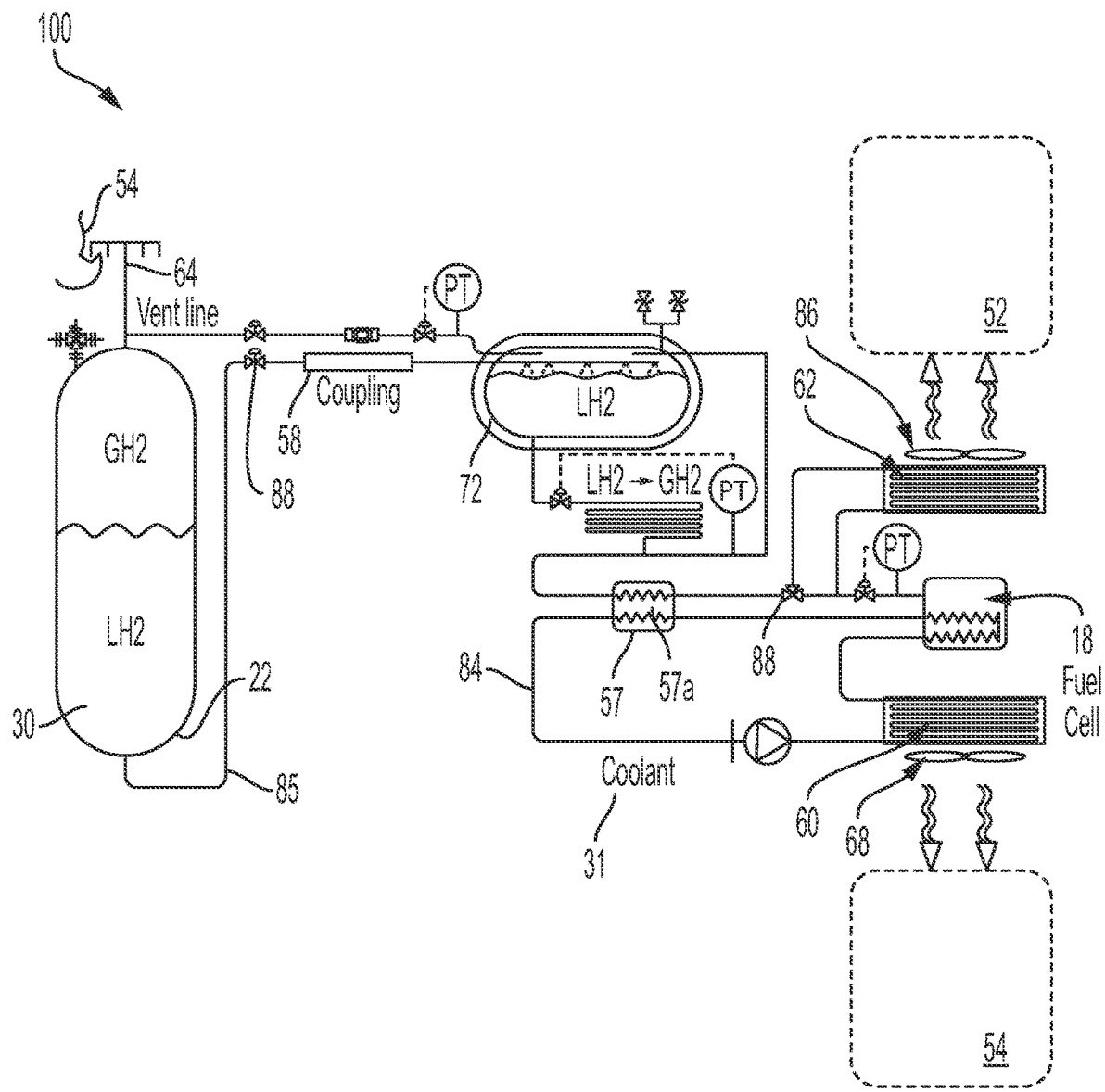
FIG. 19 depicts an example diagram of the fuel tank, fuel cell, radiator, heat exchanger and air conditioning components.

FIG. 19 depicts an example diagram of the fuel supply subsystem 900 including the fuel tank 22, fuel cell, radiator 60, heat exchanger 57 and air conditioning components, along with the most basic components of the power generation subsystem 600. The integrated system 100 fuel supply subsystem 900 further comprises the fuel tank 22 in fluid communication with one or more fuel cells, configured to store and transport a fuel selected from the group consisting of gaseous hydrogen ($GH_2$), liquid hydrogen ($LH_2$), or similar fluid fuels. The fuel supply subsystem 900 further comprises fuel lines, at least one fuel supply coupling, 58 refueling connections for charging, one or more vents 64, one or more valves 88, one or more pressure regulators, the vaporizer 72, unions 86 and the heat exchanger 57, each in fluid communication with the fuel tank 22, and wherein the one or more temperature sensing devices or thermal safety sensors monitor temperatures and concentrations of gases in the fuel supply subsystem 900, and also comprise one or more pressure gauges, one or more level sensors, one or more vacuum gauges, and one or more temperature sensors. The autopilot control unit 32 or a computer processor are further configured to operate components of the subsystems and compute, select and control, based on the temperature adjustment protocol, an amount and distribution of thermal energy transfer including: from the one or more sources comprising the power generation subsystem 600, to the one or more thermal energy destinations including: the internal temperature zone 52 (using HVAC subsystems 6), the external temperature zone 54 (using at least the at least one radiator 60 or the one or more exhaust ports 66), and the fuel supply subsystem 900 (using the thermal energy interface subsystem 56 comprising the heat exchangers 57 or a vaporizer 72). Distribution may occur from the one or more sources comprising the internal temperature zone 52, to the one or more thermal energy destinations comprising the fuel supply subsystem 900, using the HVAC subsystems; or from the external temperature zone 54, to the fuel supply subsystem 900, using one or more vents 64; and combinations thereof. FIG. 18 depicts the LH$_2$ 400L fuel tank 22 together with pressure build up unit, LH$_2$ Alt Port, refueling port, pressure gauge w/switch contact, pressure trans/level/vacuum gauge/pressure regulator, Vaporizer 72 for converting LH$_2$ to GH$_2$ and mating part A: LH$_2$ refueling port (female fuel transfer coupling 58); mating part B; 3/8" B (Vent 64); mating part C 1" union 86 (interface w/heat exchanger 57). Also depicted are the at least one radiator 60, coolant outlet, example fuel cell module 18, coolant inlet 78, air flow sensing and regulation, and coolant (cooling water circulation) pump 76. The thermal energy interface subsystem 56 depicted in FIG. 18 comprising the heat exchanger 57 or a vaporizer 72, configured to connect to a first fluid conduit in connection with and in fluid communication the fuel supply subsystem 900 comprising the fuel 30, and a second conduit in connection with and in fluid communication with the power generation subsystem 600 comprising the coolant 31, wherein thermal energy is transferred from the coolant 31, across a conducting interface 57a by conduction, and to the fuel 30, thereby warming the fuel 30 and cooling the coolant 31, and wherein the one or more temperature sensing devices or thermal energy sensing devices further comprises a fuel temperature sensor and a coolant temperature sensor.

Figure 20:
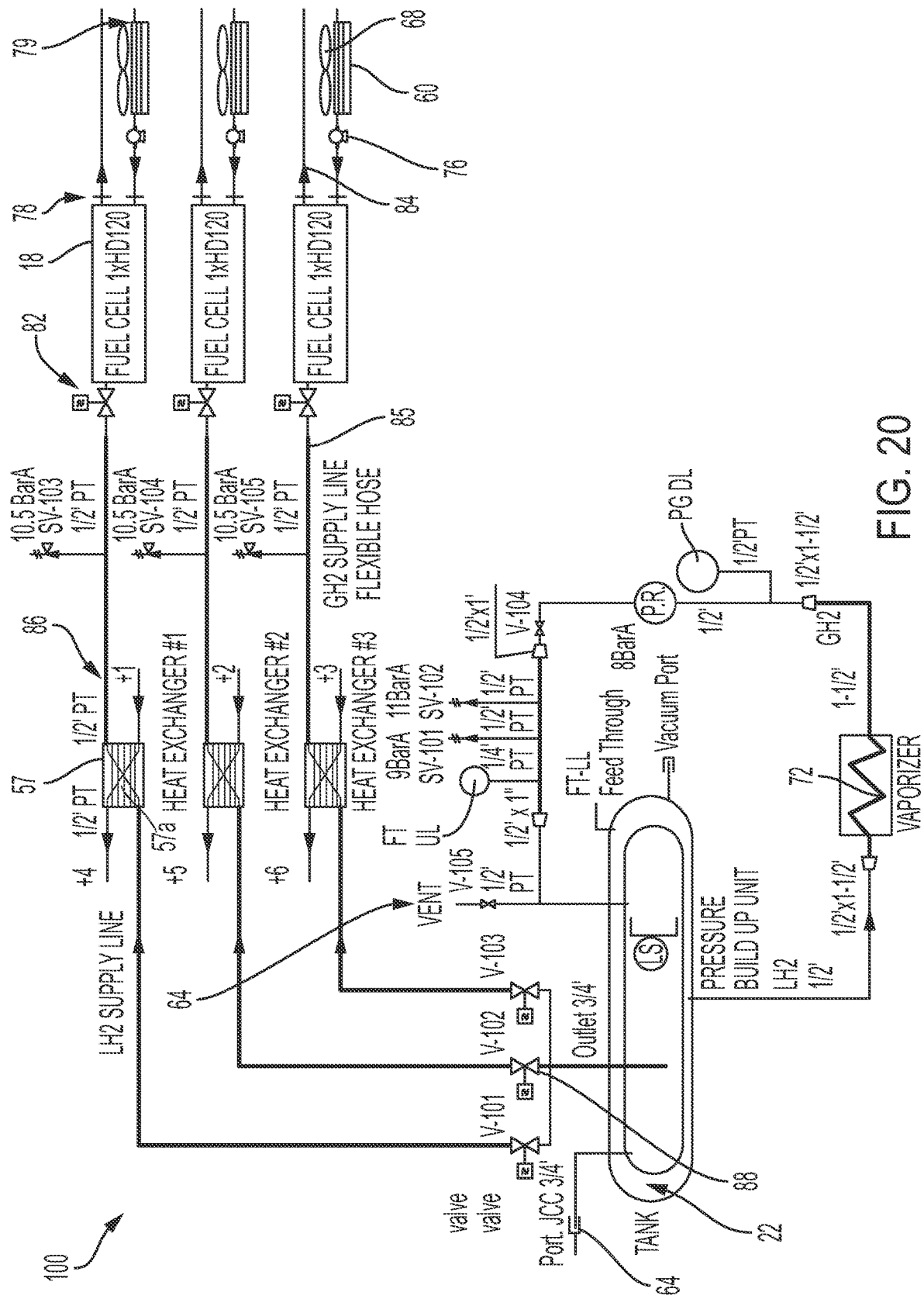
FIG. 20 depicts an example diagram of the fuel tank, fuel cell, radiator, heat exchanger and air conditioning components and interrelated conduits for heat transfer among components.

FIG. 20 depicts an example diagram of the fuel tank 22, fuel cell, radiator 60, heat exchanger 57 and air conditioning components and interrelated conduits for heat transfer among components. In one embodiment, the cooling system comprises five (5) heat exchangers 57 configured for fuel cell modules 18, motors, motor controllers 24, and electronics cooling by heat transfer. Heat exchangers 57 each comprise tubes, unions 86 (LH$_2$ Tank side), vacuum ports/feed through and vents 64. In various embodiments, one or more outlets from the inner vessel may be employed, and multiple inner vessels may be constructed inside the outer vessel. The vaporizer 72 may be interconnected by conduits 85, pipes 85 or tubes 85 to a heat exchanger 57, or may function as a heat exchanger 57 itself by contacting coolant conduits 84. In one embodiment, the heat exchangers 57 may further comprise lightweight aluminum heat exchangers 57a or compact fluid heat exchangers 57a that transfer energy/heat from one fluid to another more efficiently by implementing different principles related to thermal conductivity, thermodynamics and fluid dynamics. Such fluid heat exchangers 57 use the warm and/or hot fluid normally flowing inside a coolant conduit 84 and fuel lines 85. Heat energy is transferred by convection from the fluid (coolant 31) in the coolant conduit 84 as it flows through the system, wherein the moving fluid contacts the inner wall of the fluid conduit/coolant conduit 84 with a surface of a different temperature and the motion of molecules establishes a heat transfer per unit surface through convection. Then in thermal conduction heat spontaneously flows from a hotter fluid conduit/coolant conduit 84 to the cooler fuel flow tubes 85/fuel conduits 85/fuel lines 85 over the areas of physical contact 57a between the two components within the heat exchanger 57 body. Heat energy is then transferred by convection again from the inner wall of the inflow tubes 85/fuel conduits 85/fuel lines 85 to fluid in the fuel line 85 flowing by contacting the surface area of the inner wall of the fuel flow tubes 85/fuel conduits 85/fuel lines 85. Heat exchangers 57 may be of standard flow classifications including: parallel-flow; counter-flow; and cross-flow. Heat exchangers 57 may be shell and tube, plate, fin, spiral and combinations of said types. The heat exchanger 57 body, tubes, pipes, lines and conduits 57a may be comprised of one of copper, stainless steel, and alloys and combinations thereof, or other conductive material. The first open end a fluid heat exchanger 57 may be connected to, and in fluid communication with, a coolant conduit 84. The second open end is connected to, and in fluid communication with, a second coolant conduit 84 that transports fluids (coolant 31) to other subsystems including the power generation subsystem 600 (e.g. fuel cell modules 18), the external temperature zone 54, and in particular, the radiator 60. The third open end of the fluid heat exchanger 57 may be connected to, and in fluid communication with, inflow tubes 85/fuel conduits 85/fuel lines 85. The fourth open end of the fluid heat exchanger 57, is connected to, and in fluid communication with, inflow tubes 85/fuel conduits 85/fuel lines 85, such that the fluid heat exchanger 57 may replace a section of fluid conduits, coolant conduits 84, pipes, fuel lines 85 flowing into or out of the fuel supply subsystem 900, power generation subsystem 600, internal temperature zone 52, or external temperature zone 54, recapturing heat from fluids flowing through the exchanger 57 and transferring that heat to incoming fluids. Connection may be made using any known method of connecting pipes. The measuring of thermodynamic operating conditions comprises measuring a first temperature corresponding to one or more sources of thermal energy and assessing one or more additional temperatures corresponding to thermal references, and wherein the one or more thermal references comprise one or more references selected from the group consisting of operating parameters, warning parameters, equipment settings, occupant control settings, alternative components, alternative zones, temperature sensors, and external reference information. The one or more sources are selected from the group consisting of the power generation subsystem 600, the internal temperature zone 52, the external temperature zone 54, and the fuel supply subsystem 900. The one or more thermal energy destinations are selected from the group consisting of the power generation subsystem 600, the internal temperature zone 52, the external temperature zone 54, and the fuel supply subsystem 900. In one embodiment, the fuel cell control system 100 comprises 6 motors and 3 fuel cell modules 18; 1 fuel cell for each 2-motor pair. The fuel cell modules 18 are triple-modular redundant auto-pilot with monitor, Level A analysis of source code, and at least one cross-over switch in case of one fuel cell failure.

Figure 21:
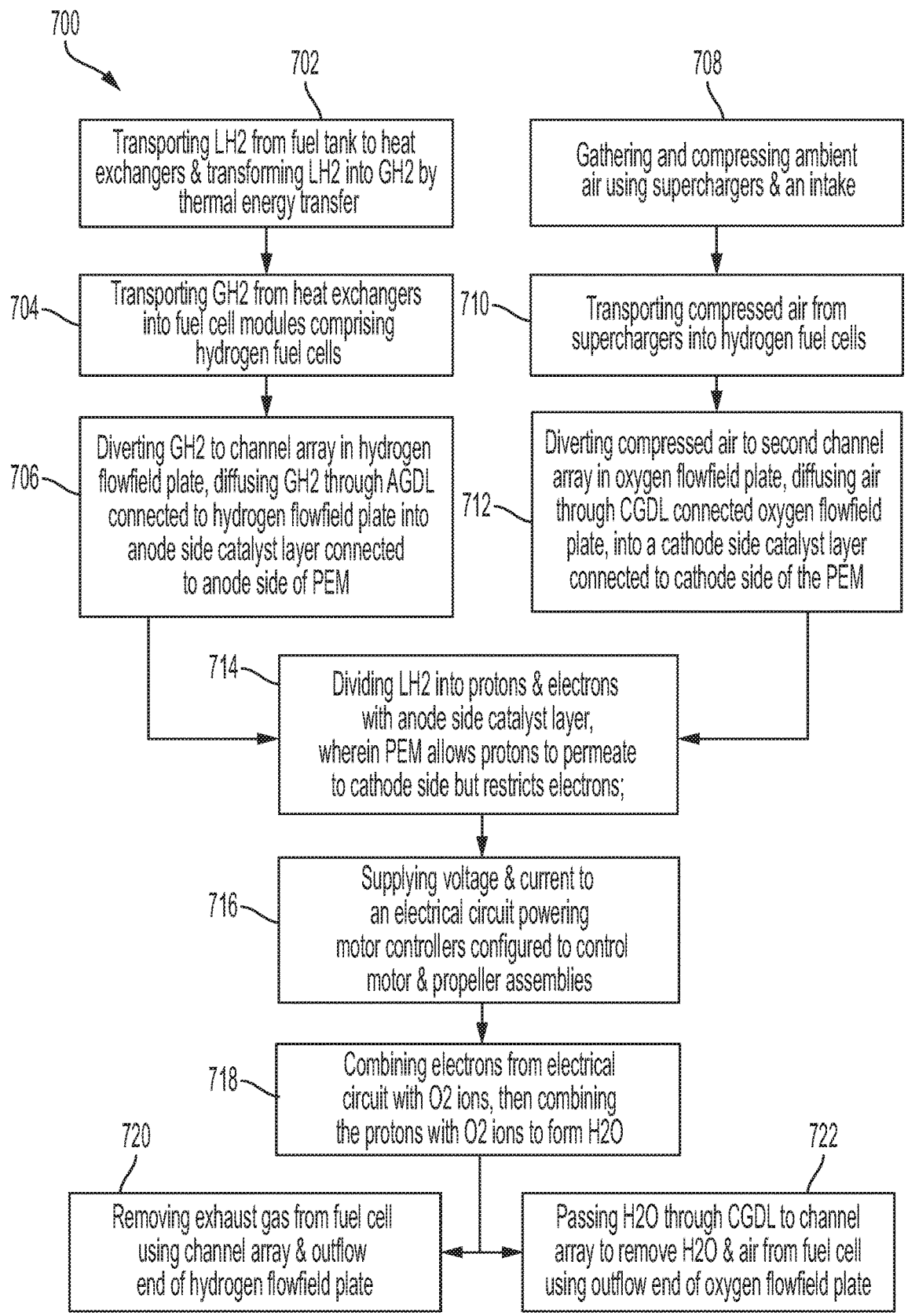
FIG. 21 depicts a flow chart that illustrates the present invention in accordance with one example embodiment.

FIG. 21 depicts a flow chart that illustrates the present invention in accordance with one example embodiment of a method 700 for operating lightweight, high power density, fault-tolerant fuel cell systems in a clean fuel multirotor aircraft 1000. The method 700 comprises: at Step 702 transporting liquid hydrogen ($LH_2$) fuel from a fuel tank 22 to one or more heat exchangers 57 in fluid communication with the fuel tank 22, and transforming the state of the $LH_2$ into gaseous hydrogen ($GH_2$) using the one or more heat exchangers 57 to perform thermal energy transfer to the $LH_2$; and Step 704 transporting the $GH_2$ from the one or more heat exchangers 57 into one or more fuel cell modules 18 comprising a plurality of hydrogen fuel cells in fluid communication with the one or more heat exchangers 57. The method steps further comprise at Step 706 diverting the $GH_2$ inside the plurality of hydrogen fuel cells into a first channel array embedded in an inflow end of a hydrogen flowfield plate 18d in each of the plurality of hydrogen fuel cells, forcing the $GH_2$ through the first channel array, diffusing the $GH_2$ through an anode backing layer comprising an anode Gas diffusion layer (AGDL) 18b in surface area contact with, and connected to, the first channel array of the hydrogen flowfield plate 18d, into an anode side catalyst layer connected to the AGDL and an anode side of a proton exchange membrane (PEM 18c) of a membrane electrolyte assembly (MEA) 18c. At Step 708 the system 100 performs gathering and compressing ambient air into compressed air using one or more turbochargers or superchargers 46 in fluid communication with an intake. The system 100 performs, at Step 710 transporting compressed air from the one or more turbochargers or superchargers 46 into the one or more fuel cell modules 18 comprising the plurality of hydrogen fuel cells in fluid communication with the one or more turbochargers or superchargers 46; and at Step 712 diverting compressed air inside the plurality of hydrogen fuel cells into a second channel array embedded in an inflow end of an oxygen flowfield plate 18d in each of the plurality of hydrogen fuel cells disposed opposite the hydrogen flowfield plate 18d, forcing the $GH_2$ through the second channel array, diffusing the compressed air through a cathode backing layer comprising a cathode gas diffusion layer (CGDL) 18b in surface area contact with, and connected to, the second channel array of the oxygen flowfield plate 18d, into a cathode side catalyst layer connected to the CGDL and a cathode side of the PEM 18c of the membrane electrolyte assembly. At Step 714 dividing the $LH_2$ into protons or hydrogen ions of positive charge and electrons of negative charge through contact with the anode side catalyst layer, wherein the PEM 18c allows protons to permeate from the anode side to the cathode side through charge attraction but restricts other particles comprising the electrons; at Step 716 supplying voltage and current to an electrical circuit powering a power generation subsystem comprising a plurality of motor controllers 24 configured to control a plurality of motor and propeller assemblies 28 in the multirotor aircraft; at Step 718 combining electrons returning from the electrical current of the electrical circuit with oxygen in the compressed air to form oxygen ions, then combining the protons with oxygen ions to form $H_2O$ molecules; at Step 720 passing the $H_2O$ molecules through the CGDL into the second channel array to remove the $H_2O$ and the compressed air from the fuel cell using the second channel array and an outflow end of the oxygen flowfield plate 18d; and at Step 722 removing exhaust gas from the fuel cell using the first channel array and an outflow end of the hydrogen flowfield plate 18d. Excess heat generated by the function of the fuel cells can be expelled with exhaust gas and/or $H_2O$, dissipated through use of one or more coolant filled radiators, or supplied by a working fluid in fluid conduits used by one or more heat exchangers 57 to extract $GH_2$ from $LH_2$ through thermal energy transfer that heats the $LH_2$ without direct interface between the two different fluids. In one example embodiment, $GH_2$ and oxygen molecules or air from the compressed air may pass through the fuel cells and fuel cell modules 18 and out a hydrogen outlet and oxygen outlet respectively, wherein each may be configured to be in fluid communication with additional fluid conduits recycling the fluids and directing the $GH_2$ and oxygen or air back into the fuel supply subsystem and external interface subsystem to be reused in subsequent reactions performed within the fuel cells and fuel cell modules 18 as the process steps of the invention are performed iteratively to produce electricity, heat and $H_2O$ vapor on an ongoing basis.

The executing thermal energy transfer from the power generation subsystem 600 to the one or more thermal energy destinations, using the autopilot control units 32 or computer processors, may comprise using a fluid in fluid communication with a component of the power generation subsystem 600 to transport heat or thermal energy to a different location corresponding to a thermal energy destination, thereby reducing the temperature or excess thermal energy of the one or more sources. To accomplish this the processor selects a source and thermal energy destination pair, and retrieves stored routing data for the pair, then activates, actuates, or adjusts the appropriate valves 88, regulators, conduits, and components to send a working fluid through the aircraft 1000 directing the flow of fluid from the source to the one or more thermal energy destinations. For example, if the temperature adjustment protocol indicates a fuel cell module 18 requires dissipation and transfer of waste heat, the processor may select the fuel supply subsystem 900 as a thermal energy destination, and the processor will actuate the coolant pump 76 and appropriate valves 88 in fluid communication with the coolant conduits 84 connected to and in fluid communication with that fuel cell module 18, so that coolant 31 is moved from the fuel cell module 18, through the coolant conduits 84 and piping 84 along a route that leads to a heat exchanger 57, and in turn similarly actuates pumps and valves 88 in the fuel lines 85, such that coolant 31 and fuel 30 flow through separate conduits of the processor activated heat exchanger 57 simultaneously and heat or thermal energy is transferred from the hotter coolant 31, across the conduits, walls and body of the heat exchanger 57, and into the colder fuel 30, thereby reducing the temperature of the fuel cell module 18 source and increasing the temperature of the fuel 30, or more generally the fuel supply subsystem 900. The executing thermal energy transfer from the one or more sources to the one or more thermal energy destinations may further comprise diverting fluid flow of the fuel 30 or the coolant 31 using valves 88 and coolant pumps 76, wherein the coolant 31 may comprise water and additives (such as anti-freeze). As the processors continue to measure the fuel cell module 18, processors may divert flow to other thermal energy destinations or reduce flow to the heat exchanger 57 or stop flow to the heat exchanger 57 and redirect the flow to a different thermal energy destination. Multiple processors may work together to perform different functions to accomplish energy transfer tasks. The integrated system 100 iteratively or continuously measures the components, zones and subsystems to constantly adjust energy transfer and temperature performance of the aircraft 1000 to meet design and operating condition parameters. Measuring, using one or more temperature sensing devices or thermal energy sensing devices, thermodynamic operating conditions in a multirotor aircraft 1000 comprising a first temperature corresponding to a source of thermal energy and one or more additional temperatures corresponding to thermal references further comprise measuring one or more selected from the group consisting of a fuel temperature, a fuel tank temperature, fuel cell or fuel cell module 18 temperatures, battery temperatures, motor controller temperatures, a coolant temperature or peak controller temperature, motor temperatures, or peak motor temperature or aggregated motor temperature, radiator 60 temperatures, a cabin temperature, and an outside-air temperature. The temperature adjustment protocols may be computed by the example method 700 and integrated system 100 using autopilot control units 32 or computer processor and an algorithm based on the comparison result. The selecting and controlling, based on the temperature adjustment protocol, of an amount and distribution of thermal energy transfer from the one or more sources further comprises ordering the one or more thermal energy destinations, selecting and controlling, based on the temperature adjustment protocol, an amount and distribution of thermal energy transfer from the one or more sources further comprises. The processor interrogates the system to determine the answer to a series of questions that determine subsequent calculations, computations, priorities, protocols, and allocations. For example, is power generation subsystem 600 hotter than interface set temperature? Is power generation subsystem 600 hotter than interface max temperature? Is power generation subsystem 600 hotter than external temperature zone 54? For example, if the temperature difference between the power generation subsystem 600 and the fuel supply subsystem 900 remains large, then transfer from the power generation subsystem 600 source to the fuel supply subsystem 900 thermal energy destination will be enacted. The external temperature zone 54 may further comprise an external temperature outlet, comprising an exhaust port 66 or a vent 64 that may be linked to one or more radiators 60 and one or more fans 68. A processor may set the exterior temperature zone as a thermal energy destination for a fuel cell module 18 source, but if the radiator 60 or coolant temperature begins to exceed normal or safe operating limit temperatures, the processor may then readjust the temperature distribution protocol and priorities, actuating additional coolant 31 flow to a heat exchanger 57 to add the fuel supply subsystem 900 as an additional thermal energy destination, thereby reducing the cooling load required of the radiator 60 and further reducing the temperature of the fuel cell module 18 source to bring that source to an improved operating temperature.

The thermal interface of the thermal energy/temperature exchange subsystem is important for interconnecting multiple subsystems and components located far apart on the aircraft 1000 and facilitating the use of working fluids to transport heat and thermal energy for transfer to various destinations. The thermal interface further comprises one or more heat exchangers 57 configured to transfer heat or thermal energy from the coolant 31 supplied by coolant conduits 84 in fluid communication with the one or more heat exchangers 57, across heat exchanger 57 walls 57*a* and heat exchanger 57 surfaces 57*a*, to the fuel 30 supplied by fuel lines 85 in fluid communication with the one or more heat exchangers 57, using thermodynamics including conduction, wherein the coolant 31 and the fuel 30 remain physically isolated from one another.

After executing thermal energy transfer from the one or more sources to the one or more thermal energy destinations, the example method repeats measuring, using one or more temperature sensing devices or thermal energy sensing devices, thermodynamic operating conditions in a multirotor aircraft 1000 comprising power generation, fuel supply and related subsystems, and then performs comparing, computing, selecting and controlling, and executing steps data for the one or more fuel cells and the one or more motor control units to iteratively manage operating conditions in the multirotor aircraft 1000.

The methods 700 and systems 100 described herein are not limited to a particular aircraft 1000 or hardware or software configuration, and may find applicability in many aircraft or operating environments. For example, the algorithms described herein can be implemented in hardware or software, or a combination thereof. The methods 700 and systems 100 can be implemented in one or more computer programs, where a computer program can be understood to include one or more processor executable instructions. The computer program(s) can execute on one or more programmable processors and can be stored on one or more storage medium readable by the processor (including volatile and non-volatile memory and/or storage elements), one or more input devices, and/or one or more output devices. The processor thus can access one or more input devices to obtain input data and can access one or more output devices to communicate output data. The input and/or output devices can include one or more of the following: a mission control tablet computer 36, mission planning software 34 program, throttle pedal, sidearm controller, yoke or control wheel, or other motion-indicating device capable of being accessed by a processor, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

As provided herein, the processor(s) can thus in some embodiments be embedded in three identical devices that can be operated independently in a networked or communicating environment, where the network can include, for example, a Local Area Network (LAN) such as Ethernet, or serial networks such as RS232 or CAN. The network(s) can be wired, wireless RF, fiber optic or broadband, or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices to perform the necessary algorithms and determine the appropriate vehicle commands, and if implemented in three units, the three units can vote among themselves to arrive at a 2 out of 3 consensus for the actions to be taken. As would be appreciated by one skilled in the art, the voting can also be carried out using another number of units (e.g., one two, three, four, five, six, etc.). For example, the voting can use other system-state information to break any ties that may occur when an even number of units disagree, thus having the system arrive at a consensus that provides an acceptable level of safety for operations.

The device(s) or computer systems that integrate with the processor(s) for displaying presentations can include, for example, a personal computer with display, a workstation (e.g., Sun, HP), a personal digital assistant (PDA) or tablet such as an iPad, or another device capable of communicating with a processor(s) that can operate as provided herein.

Accordingly, the devices provided herein are not exhaustive and are provided for illustration and not limitation.

References to "a processor" or "the processor" can be understood to include one or more processors that can communicate in a stand-alone and/or a distributed environment(s), and thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. References to a network, unless provided otherwise, can include one or more networks, intranets and/or the internet.

Although the methods and systems have been described relative to specific embodiments thereof, they are not so limited. For example, the methods and systems may be applied to a variety of multirotor vehicles having 6, 8, 10, 12, 14, 16, or more independent motor controllers 24 and motors, thus providing differing amounts of lift and thus payload and operational capabilities. The system may be operated under an operator's control, or it may be operated via network or datalink from the ground. The vehicle may be operated solely with the onboard battery cell 27 storage capacity, or it may have its capacity augmented by an onboard motor-generator or other recharging source, or it may even be operated at the end of a tether or umbilical cable for the purposes of providing energy to the craft. Many modifications and variations may become apparent in light of the above teachings and many additional changes in the details, materials, and arrangement of parts, herein described and illustrated, may be made by those skilled in the art.

What is claimed is:

1. A lightweight, high power density, fault-tolerant, fuel cell module for a full-scale, clean fuel aircraft, the fuel cell module comprising:

a plurality of hydrogen fuel cells in fluid communication with one or more heat exchangers and one or more oxygen delivery mechanisms comprising turbochargers or superchargers, blowers, compressors, or local air or oxygen supply or combinations thereof, each hydrogen fuel cell of the plurality of hydrogen fuel cells comprising:

a hydrogen flowfield plate, disposed in each hydrogen fuel cell, and comprising a first channel array configured to divert gaseous hydrogen ($GH_2$) inside each hydrogen fuel cell through an anode backing layer connected thereto and comprising an anode gas diffusion layer (AGDL) connected to an anode side catalyst layer that is further connected to an anode side of a proton exchange membrane (PEM), the anode side catalyst layer configured to contact the $GH_2$ and divide the $GH_2$ into protons and electrons;

an oxygen flowfield plate, disposed in each hydrogen fuel cell, and comprising a second channel array configured to divert compressed air inside each hydrogen fuel cell through a cathode backing layer connected thereto and comprising a cathode gas diffusion layer (CGDL) connected to a cathode side catalyst layer that is further connected to a cathode side of the PEM, wherein the PEM comprises a polymer and is configured to allow protons to permeate from the anode side to the cathode side but restricts the electrons;

an electrical circuit configured to collect electrons from the anode side catalyst layer and supply voltage and current to aircraft components, wherein electrons returning from the electrical circuit combine with oxygen in the compressed air to form oxygen ions, then the protons combine with oxygen ions to form $H_2O$ molecules;

an outflow end of the oxygen flowfield plate configured to use the second channel array to remove the $H_2O$ molecules and the compressed air from each hydrogen fuel cell; and an outflow end of the hydrogen flowfield plate configured to use the first channel array to remove exhaust gas from each hydrogen fuel cell, thereby disposing subcomponents inside each of the plurality of hydrogen fuel cells with flow vectors enabling the plurality of hydrogen fuel cells to be assembled into one or more fuel cell stacks aligned within the fuel cell module forming a modularly combinable fault-tolerant unit of reduced part count and producing a ratio of electric power produced by the fuel cell module to fuel cell module weight of at least one kilowatt per kilogram adapted for a full-scale, clean fuel, aircraft;

wherein the one or more heat exchangers are in fluid communication with a fuel tank configured to store and transport liquid hydrogen ($LH_2$) as a fuel, and the one or more heat exchangers are further configured to extract gaseous hydrogen ($GH_2$) from $LH_2$ using thermal energy transfer or to increase a temperature of already extracted gaseous hydrogen ($GH_2$); and wherein the one or more heat exchangers transfer heat or thermal energy across heat exchanger walls and heat exchanger surfaces to the fuel supplied by fuel lines in fluid communication with the one or more heat exchangers and the fuel tank, using thermodynamic processes including conduction, wherein a working fluid and the fuel remain physically isolated from one another.

2. The fuel cell module of claim 1, wherein the fuel cell module further comprises a module housing, a fuel delivery assembly, a recirculation pump, a coolant pump, fuel cell controls, sensors, an end plate, coolant conduits, connections, a hydrogen inlet, a coolant inlet, an air inlet, a hydrogen outlet, an air outlet, a coolant outlet, and coolant conduits connected to and in fluid communication with the fuel cell module and transporting coolant.

3. The fuel cell module of claim 1, wherein the one or more oxygen delivery mechanisms comprising turbochargers or superchargers are in fluid communication with an intake and are configured to gather and compress ambient air into compressed air that is supplied to an air inlet and an inflow end of the oxygen flowfield plate of each hydrogen fuel cell of the plurality of hydrogen fuel cells, and wherein the one or more oxygen delivery mechanisms comprising one or more of turbochargers, superchargers, blowers, compressors, local air or oxygen supply, or combinations thereof and the fuel cell module are in fluid communication with one or more air filters and airflow meters to meter and control the compressed air at each air inlet to match inlet oxygen requirements of the fuel cell module based on a level of power being generated, atmospheric pressure and temperature.

4. The fuel cell module of claim 1, wherein the oxygen flowfield plate is disposed within each hydrogen fuel cell of the plurality of hydrogen fuel cells opposite the hydrogen flowfield plate with the PEM intervening between the oxygen flowfield plate and the hydrogen flowfield plate.

5. The fuel cell module of claim 1, wherein the electrical circuit comprises an electrical collector disposed within each hydrogen fuel cell supplying voltage and current to the electrical circuit powering aircraft components comprising a power distribution monitoring and control subsystem comprising a plurality of motor controllers configured to control a plurality of motor and propeller assemblies in the clean fuel aircraft.

* * * * *